(12) United States Patent
Todorokihara

(10) Patent No.: US 12,276,673 B2
(45) Date of Patent: Apr. 15, 2025

(54) VIBRATION RECTIFICATION ERROR CORRECTION DEVICE, SENSOR MODULE, AND VIBRATION RECTIFICATION ERROR CORRECTION METHOD

(71) Applicant: SEIKO EPSON CORPORATION, Tokyo (JP)

(72) Inventor: Masayoshi Todorokihara, Suwa (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/626,482

(22) Filed: Apr. 4, 2024

(65) Prior Publication Data

US 2024/0255542 A1 Aug. 1, 2024

Related U.S. Application Data

(63) Continuation of application No. 17/562,054, filed on Dec. 27, 2021, now Pat. No. 11,988,685.

(30) Foreign Application Priority Data

Dec. 28, 2020 (JP) .................................. 2020-219505

(51) Int. Cl.
*G01P 15/00* (2006.01)
(52) U.S. Cl.
CPC ................................... *G01P 15/00* (2013.01)
(58) Field of Classification Search
CPC ........ G01P 15/00; G01P 15/097; G01P 1/023; G01P 2015/0828; G01P 21/00
See application file for complete search history.

(56) References Cited

U.S. PATENT DOCUMENTS

| 6,047,029 | A | 4/2000 | Eriksson et al. |
| 6,147,633 | A | 11/2000 | Ukawa et al. |
| 7,755,529 | B2 | 7/2010 | Hasegawa et al. |
| 2006/0220745 | A1 | 10/2006 | Takekawa |
| 2009/0167393 | A1 | 7/2009 | Kurokawa |
| 2019/0324052 | A1 | 10/2019 | Sato et al. |
| 2019/0331491 | A1 | 10/2019 | Todorokihara |

FOREIGN PATENT DOCUMENTS

| JP | 4592470 B2 | 12/2010 |
| JP | 2019-190897 A | 10/2019 |

*Primary Examiner* — Lee E Rodak
*Assistant Examiner* — Sangkyung Lee
(74) *Attorney, Agent, or Firm* — Harness, Dickey & Pierce, P.L.C.

(57) ABSTRACT

A vibration rectification error correction device includes a reference signal generation circuit that outputs a reference signal, a first frequency delta-sigma modulation circuit that performs frequency delta-sigma modulation on the reference signal by using a first measured signal to generate a first frequency delta-sigma modulated signal, a first filter, a second filter that operates in synchronization with the reference signal, and a first timing control circuit that controls a timing of outputting an input signal in synchronization with the first timing signal, in which the first filter and the first timing control circuit are provided on a signal path from an output of the first frequency delta-sigma modulation circuit to an input of the second filter.

9 Claims, 28 Drawing Sheets

VIBRATION RECTIFICATION ERROR CORRECTION DEVICE, SENSOR MODULE, AND VIBRATION RECTIFICATION ERROR CORRECTION METHOD

The present application is a continuation of U.S. patent application Ser. No. 17/562,054 filed Dec. 27, 2021, which is based on, and claims priority from JP Application Serial Number 2020-219505, filed Dec. 28, 2020, the disclosures of which are hereby incorporated by reference herein in their entireties.

BACKGROUND

1. Technical Field

The present disclosure relates to a vibration rectification error correction device, a sensor module, and a vibration rectification error correction method.

2. Related Art

JP-A-2019-190897 describes a sensor module having a configuration in which a first low-pass filter is operated in synchronization with an output signal of a physical quantity sensor, and a second low-pass filter in a subsequent stage performs resampling in synchronization with a reference clock. According to this sensor module, non-linearity occurs in the input and the output of the entire low-pass filter, and the vibration rectification error caused by this non-linearity is adjusted so as to be in the opposite phase to the vibration rectification error caused by the cantilever resonance of the physical quantity sensor. Therefore, it is possible to cancel each other's vibration rectification errors and reduce the vibration rectification errors that appear in the final output.

In the sensor module described in JP-A-2019-190897, since the vibration rectification error caused by the non-linearity of the input and the output of the entire low-pass filter is corrected by adjusting the group delay amount of the first low-pass filter, the group delay amount of the entire low-pass filter after adjustment changes according to the characteristics of the physical quantity sensor.

SUMMARY

A vibration rectification error correction device according to an aspect of the present disclosure includes a reference signal generation circuit that outputs a reference signal, a first frequency delta-sigma modulation circuit that performs frequency delta-sigma modulation on the reference signal by using a first measured signal to generate a first frequency delta-sigma modulated signal, a first filter, a second filter that operates in synchronization with the reference signal, and a first timing control circuit that generates a first timing signal obtained by delaying the first measured signal based on a count value of the number of pulses of the reference signal and controls a timing of outputting an input signal in synchronization with the first timing signal, in which the first filter and the first timing control circuit are provided on a signal path from an output of the first frequency delta-sigma modulation circuit to an input of the second filter.

A sensor module according to another aspect of the present disclosure includes the vibration rectification error correction device according to one aspect, and a physical quantity sensor, in which the first measured signal is a signal based on an output signal of the physical quantity sensor.

A sensor module according to still another aspect of the present disclosure includes the vibration rectification error correction device according to one aspect, a first physical quantity sensor, and a second physical quantity sensor, in which the first measured signal is a signal based on an output signal of the first physical quantity sensor, and the second measured signal is a signal based on an output signal of the second physical quantity sensor.

A vibration rectification error correction method according to still another aspect of the present disclosure includes performing frequency delta-sigma modulation on a reference signal by using a measured signal to generate a frequency delta-sigma modulated signal, generating a timing signal obtained by delaying the measured signal based on a count value of the number of pulses of the reference signal and controlling a timing of outputting a signal based on the frequency delta-sigma modulated signal in synchronization with the timing signal, performing a first filtering process on a signal based on the signal of which an output timing is controlled in synchronization with the timing signal, and performing a second filtering process on a signal based on the signal obtained by the first filtering process in synchronization with the reference signal.

A vibration rectification error correction method according to still another aspect of the present disclosure includes performing frequency delta-sigma modulation on a reference signal by using a measured signal to generate a frequency delta-sigma modulated signal, performing a first filtering process on a signal based on the frequency delta-sigma modulated signal in synchronization with the measured signal, generating a timing signal obtained by delaying the measured signal based on a count value of the number of pulses of the reference signal and controlling a timing of outputting a signal based on the signal obtained by the first filtering process in synchronization with the timing signal, and performing a second filtering process on a signal based on the signal of which an output timing is controlled in synchronization with the reference signal.

DESCRIPTION OF EXEMPLARY EMBODIMENTS

Hereinafter, an exemplary embodiment of the present disclosure will be described in detail with reference to the drawings. The embodiments described below do not unduly limit the contents of the present disclosure described in the aspects. In addition, not all of the configurations described below are essential constituent requirements of the present disclosure.

1. First Embodiment 1-1. Structure of Sensor Module

First, an example of a structure of a sensor module according to the present embodiment will be described.

Figure 1:
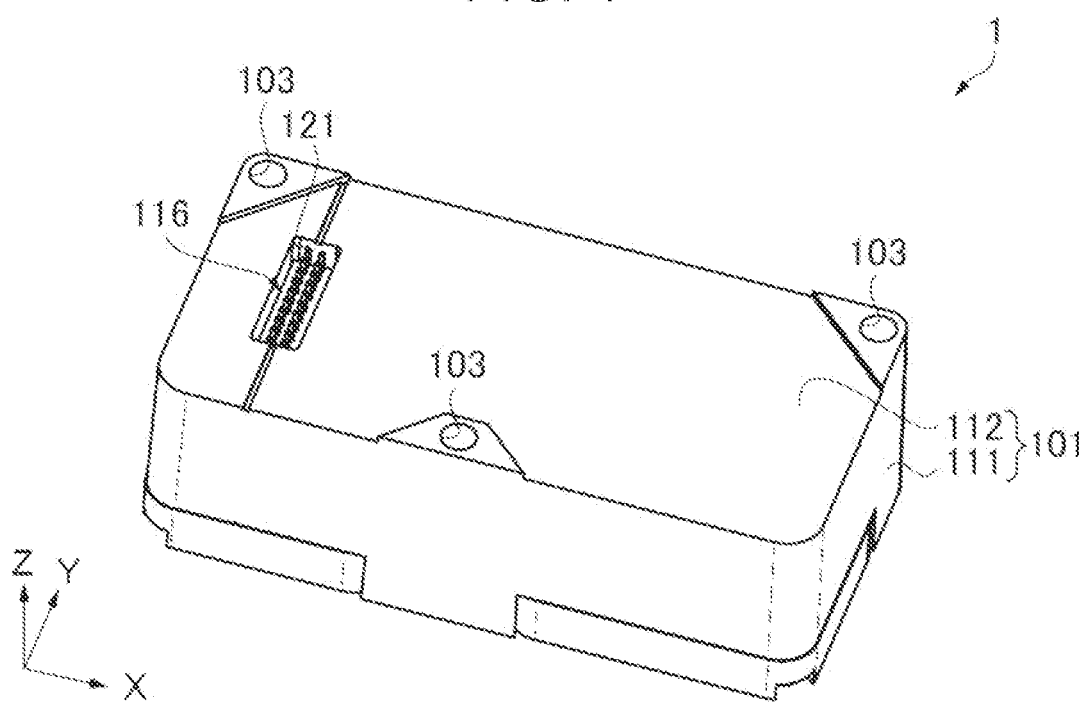
FIG. 1 is a perspective view of a sensor module.

FIG. 1 is a perspective view of a sensor module 1 when viewed from a mounting target surface side to which the sensor module 1 is fixed. In the following description, a direction along a long side of the sensor module 1 that forms a rectangle in a plan view will be described as an X-axis direction, a direction orthogonal to the X-axis direction in a plan view will be described as a Y-axis direction, and a thickness direction of the sensor module 1 will be described as a Z-axis direction.

The sensor module 1 is a rectangular parallelepiped having a rectangular planar shape, and has a long side along the X-axis direction and a short side along the Y-axis direction orthogonal to the X-axis direction. Screw holes 103 are formed at two locations near each end portion of one long side and at one location in a central portion of the other long side. Each of the screw holes 103 at three locations is used in a state of being fixed to a mounting target surface of a mounting target body of a structure such as a building, a bulletin board, or various devices via a fixing screw.

As illustrated in FIG. 1, an opening portion 121 is provided at a front surface of the sensor module 1 viewed from the mounting target surface side. A plug-type connector 116 is disposed inside the opening portion 121. The connector 116 has a plurality of pins arranged in two rows, and in each row, the plurality of pins are arranged in the Y-axis direction. A socket-type connector (not illustrated) is coupled to the connector 116 from the mounting target body, and an electric signal such as a drive voltage of the sensor module 1 and detection data is transmitted and received.

Figure 2:
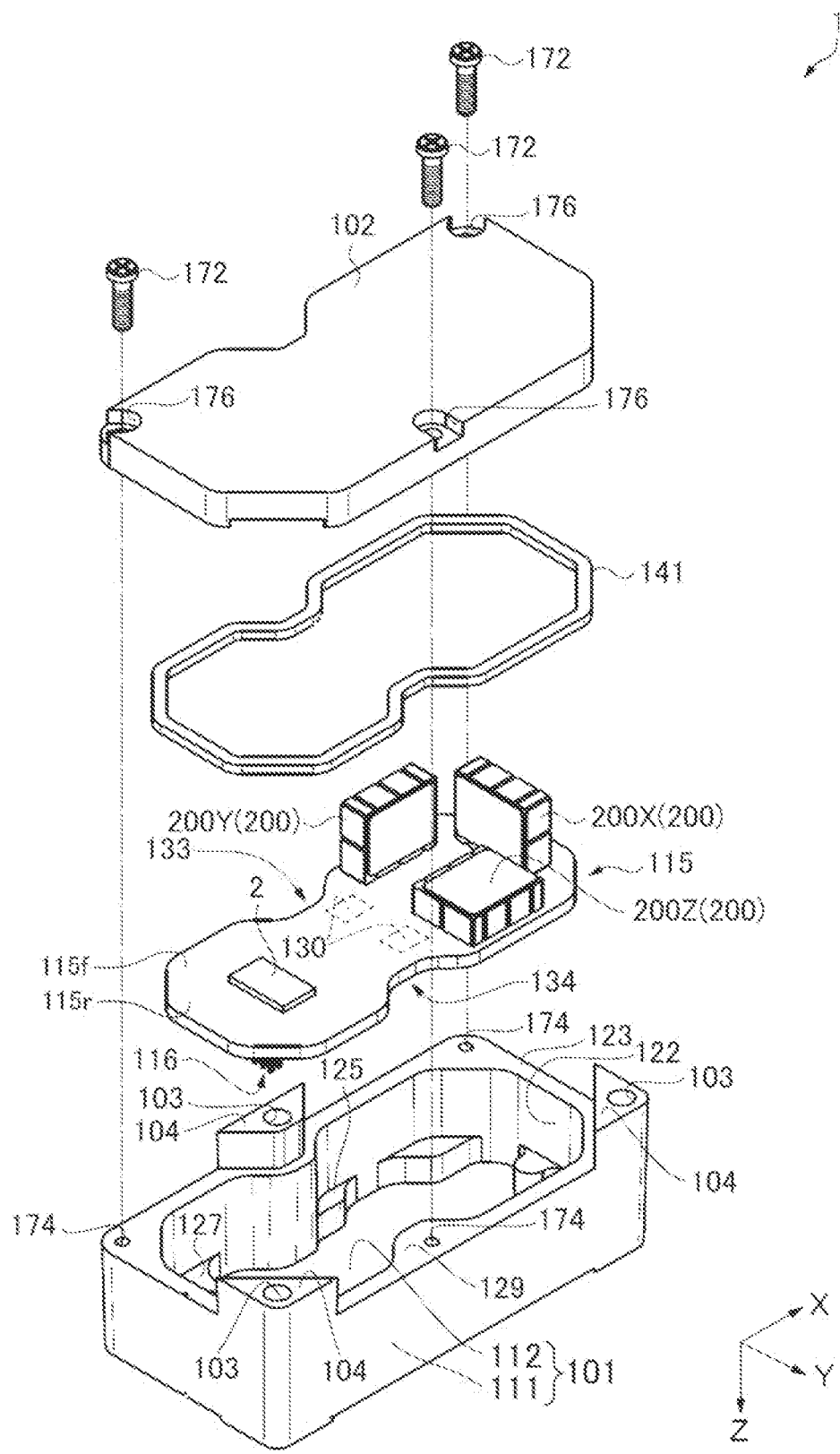
FIG. 2 is an exploded perspective view of the sensor module.

FIG. 2 is an exploded perspective view of the sensor module 1. As illustrated in FIG. 2, the sensor module 1 includes a container 101, a lid 102, a sealing member 141, a circuit substrate 115, and the like. More specifically, in the sensor module 1, the circuit substrate 115 is attached to the inside of the container 101 with a fixing member 130 interposed, and an opening of the container 101 is covered with the lid 102 via the sealing member 141 having buffering properties.

For example, the container 101 is an accommodation container for the circuit substrate 115 made of aluminum and formed into a box shape having an internal space. Similar to an overall shape of the sensor module 1 described above, an outer shape of the container 101 is a rectangular parallelepiped having a substantially rectangular planar shape, and fixed protrusions 104 are provided at two locations near both end portions of one long side and at one location in a central portion of the other long side. The screw hole 103 is formed in each of the fixed protrusions 104.

The container 101 is a box shape whose outer shape is a rectangular parallelepiped and opened on one side. The inside of the container 101 is an internal space surrounded by a bottom wall 112 and a side wall 111. In other words, the container 101 has a box shape in which one surface facing the bottom wall 112 is an opening surface 123. The container 101 is disposed so that an outer edge of the circuit substrate 115 is disposed along an inner surface 122 of the side wall 111, and the lid 102 is fixed thereto so as to cover the opening. On the opening surface 123, the fixed protrusions 104 are erected at two locations near both end portions of one long side of the container 101 and at one location in the central portion of the other long side. An upper surface of the fixed protrusion 104, that is, a surface exposed in the −Z direction protrudes from the upper surface of the container 101.

In addition, the internal space of the container 101 is provided with a protrusion 129 that protrudes from the side wall 111 toward the internal space from the bottom wall 112 to the opening surface 123 at the central portion of one long side facing the fixed protrusion 104 provided in the central portion of the other long side. A female screw 174 is provided on an upper surface of the protrusion 129. The lid 102 is fixed to the container 101 via the sealing member 141 with a screw 172 and the female screw 174 inserted through a through-hole 176. The protrusion 129 and the fixed protrusion 104 are provided at positions facing constricted portions 133 and 134 of the circuit substrate 115 described later.

In the internal space of the container 101, a first pedestal 127 and a second pedestal 125 are provided that protrude from the bottom wall 112 toward the opening surface 123 in a stepped manner. The first pedestal 127 is provided at a position facing a disposition region of the plug-type connector 116 attached to the circuit substrate 115. The first pedestal 127 is provided with the opening portion 121 illustrated in FIG. 1, and a plug-type connector 116 is inserted into the opening portion 121. The first pedestal 127 functions as a pedestal for fixing the circuit substrate 115 to the container 101.

The second 125 is located on a side opposite to the first pedestal 127 with respect to the fixed protrusion 104 and the protrusion 129 located in the central portion of the long side, and is provided in the vicinity of the fixed protrusion 104 and the protrusion 129. The second pedestal 125 functions as a pedestal for fixing the circuit substrate 115 to the container 101 on the side opposite to the first pedestal 127 with respect to the fixed protrusion 104 and the protrusion 129.

The outer shape of the container 101 is described as a box-shaped rectangular parallelepiped having the substantially rectangular planar shape with no lid, and is not limited thereto. The planar shape of the outer shape of the container 101 may be a square, a hexagon, an octagon, or the like. In addition, in the planar shape of the outer shape of the container 101, the corners of the polygonal apex portion may be chamfered, and furthermore, any one of the sides may be a planar shape made of a curve. In addition, the planar shape inside the container 101 is not limited to the shape described above, and may be another shape. Furthermore, the planar shape of the outer shape and the inside of the container 101 may be similar or may not be similar to each other.

The circuit substrate 115 is a multilayer substrate in which a plurality of through-holes and the like are formed. For example, a glass epoxy substrate, a composite substrate, a ceramic substrate, or the like is used.

The circuit substrate 115 includes a second surface 115r on the bottom wall 112 side, and a first surface 115f that has a front-rear relationship with the second surface 115r. On the first surface 115f of the circuit substrate 115, a vibration rectification error correction device 2, three physical quantity sensors 200, other electronic components (not illustrated), and the like are mounted. In addition, the connector 116 is mounted on the second surface 115r of the circuit substrate 115. Although illustration and description thereof are omitted, the circuit substrate 115 may be provided with other wirings, terminal electrodes, and the like.

The circuit substrate 115 is provided with the constricted portions 133 and 134 in which the outer edge of the circuit substrate 115 is constricted in the central portion in the X-axis direction along the long side of the container 101 in a plan view. The constricted portions 133 and 134 are provided on both sides in the Y-axis direction of the circuit substrate 115 in a plan view, and are constricted from the outer edge of the circuit substrate 115 toward the center. In addition, the constricted portions 133 and 134 are provided to face the protrusion 129 and the fixed protrusion 104 of the container 101.

The circuit substrate 115 is inserted into the internal space of the container 101 with the second surface 115r facing the first pedestal 127 and the second pedestal 125. The circuit substrate 115 is supported by the container 101 by the first pedestal 127 and the second pedestal 125.

Each of the three physical quantity sensors 200 is a frequency change type sensor in which the frequency of the output signal changes according to an applied physical quantity. Of the three physical quantity sensors 200, a physical quantity sensor 200X detects a physical quantity in the X-axis direction, a physical quantity sensor 200Y detects a physical quantity in the Y-axis direction, and a physical quantity sensor 200Z detects a physical quantity in the Z-axis direction. Specifically, the physical quantity sensor 200X is erected so that the front and rear surfaces of a package face in the X-axis direction and the side surface faces the first surface 115f of the circuit substrate 115. The physical quantity sensor 200X outputs a signal corresponding to the detected physical quantity in the X-axis direction. The physical quantity sensor 200Y is erected so that the front and rear surfaces of a package face the Y-axis direction and the side surface faces the first surface 115f of the circuit substrate 115. The physical quantity sensor 200Y outputs a signal corresponding to the detected physical quantity in the Y-axis direction. The physical quantity sensor 200Z is provided so that the front and rear surfaces of a package face the Z-axis direction, that is, the front and rear surfaces of the package face the first surface 115f of the circuit substrate 115. The physical quantity sensor 200Z outputs a signal corresponding to the detected physical quantity in the Z-axis direction.

The vibration rectification error correction device 2 is electrically coupled to the physical quantity sensor 200X, 200Y, and 200Z via wiring and electronic components (not illustrated). Further, the vibration rectification error correction device 2 generates physical quantity data in which a vibration rectification error is reduced based on the output signals of the physical quantity sensor 200X, 200Y, and 200Z.

1-2. Structure of Physical Quantity Sensor

Next, an example of a structure of the physical quantity sensor 200 will be described by taking the case where the physical quantity sensor 200 is an acceleration sensor as an example. The three physical quantity sensors 200 illustrated in FIG. 2, that is, the physical quantity sensors 200X, 200Y, and 200Z may have the same structure to one another.

Figure 3:
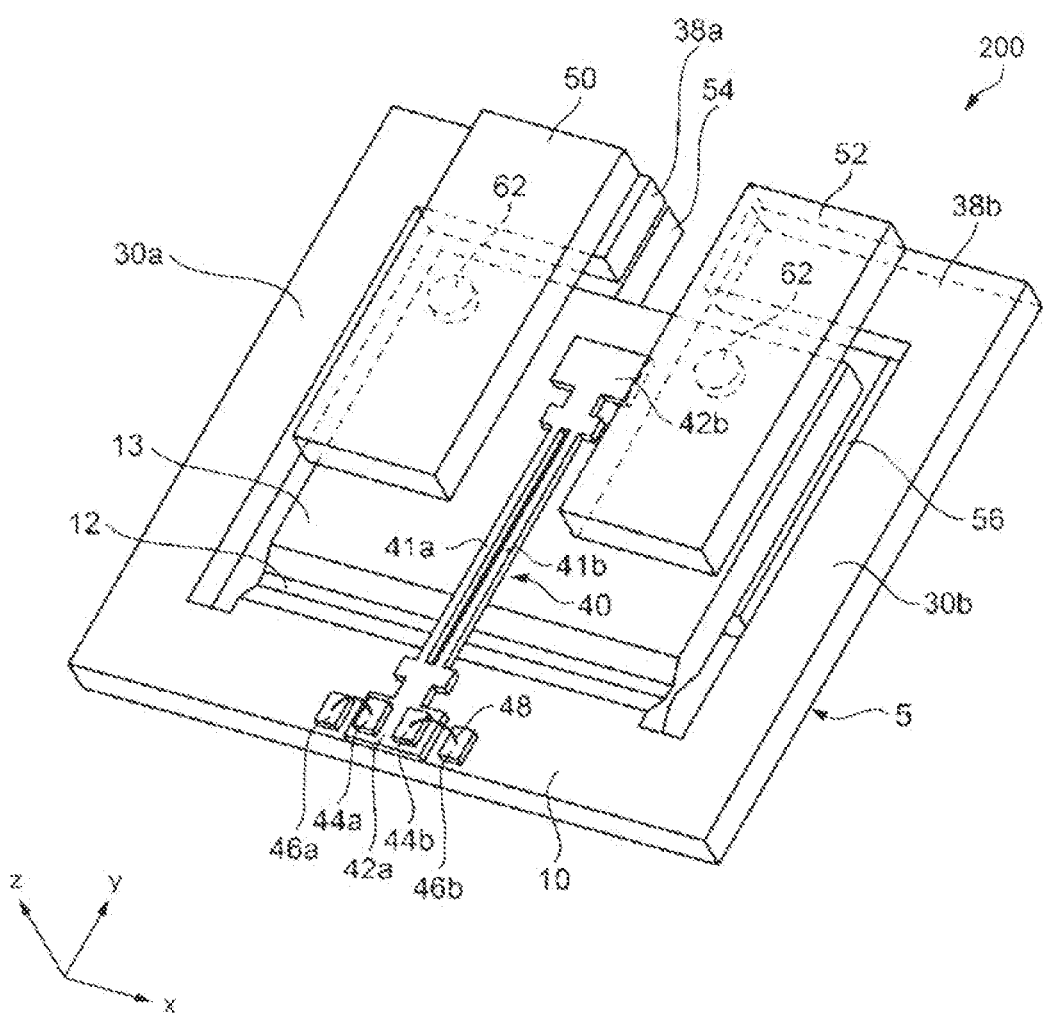
FIG. 3 is a perspective view of a physical quantity sensor.
Figure 4:
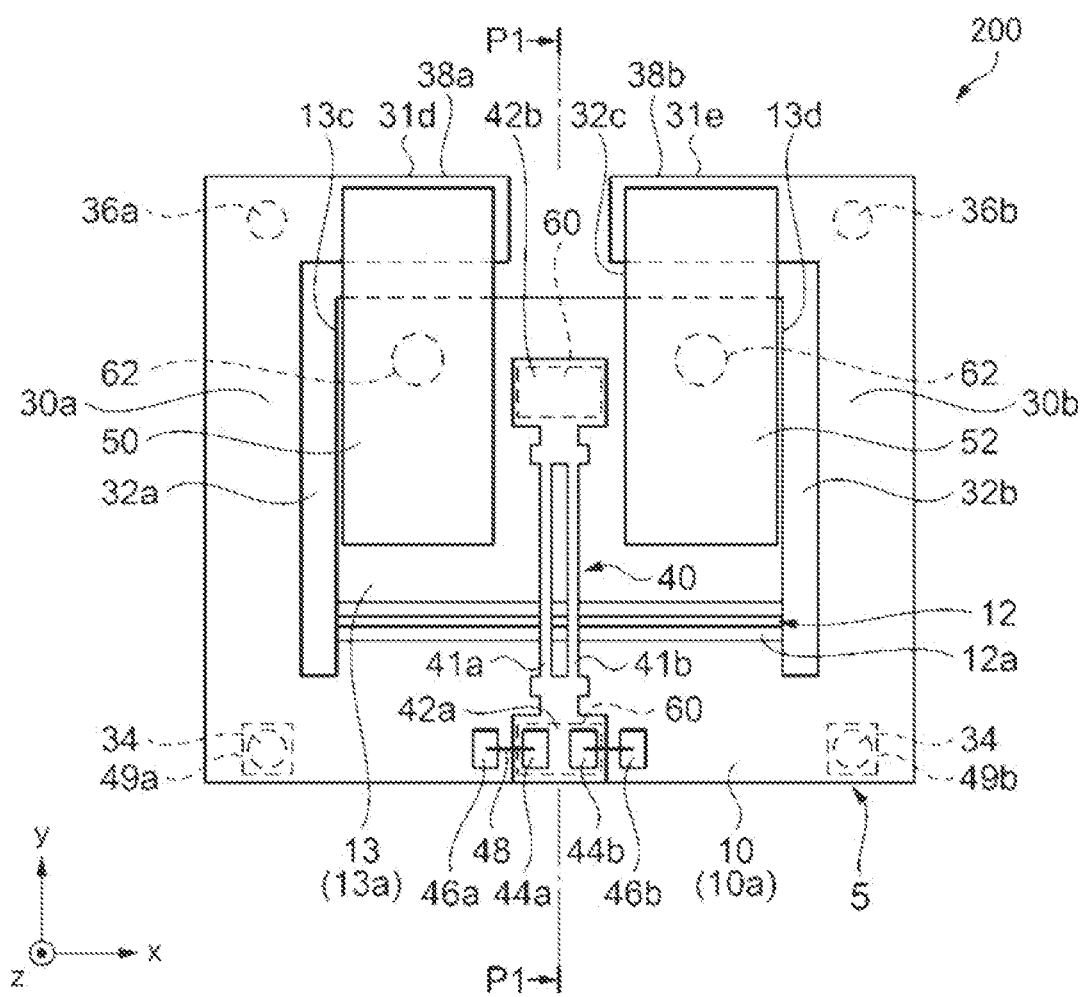
FIG. 4 is a plan view of the physical quantity sensor.
Figure 5:
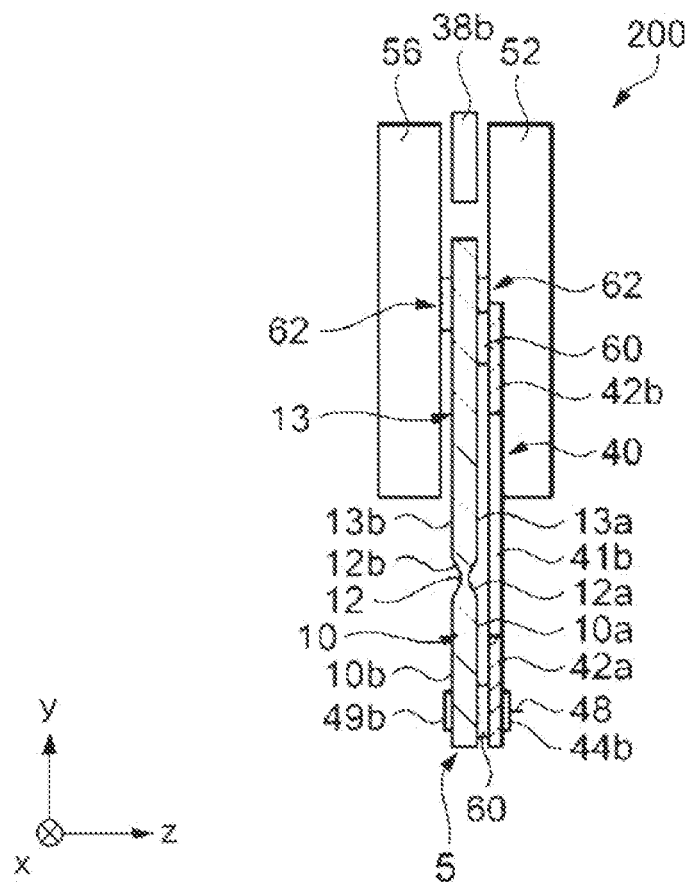
FIG. 5 is a cross-sectional view taken along line P1-P1 in FIG. 4.

FIG. 3 is a perspective view of the physical quantity sensor 200, FIG. 4 is a plan view of the physical quantity sensor 200, and FIG. 5 is a cross-sectional view taken along line P1-P1 of FIG. 4. FIGS. 3 to 5 illustrate only the inside of the package of the physical quantity sensor 200. In the subsequent drawings, for convenience of description, the x axis, the y axis, and the z axis are illustrated as three axes orthogonal to each other. In addition, in the following description, for convenience of description, a plan view when viewed from the z-axis direction as a thickness direction of extension portions 38a and 38b is simply referred to as "plan view".

As illustrated in FIGS. 3 to 5, the physical quantity sensor 200 includes a substrate portion 5 and four weights 50, 52, 54, and 56.

The substrate portion 5 is provided with a plate-like base portion 10 having principal surfaces 10a and 10b extending in the x-axis direction and facing opposite to each other, a joining portion 12 extending from the base portion 10 in the y-axis direction, a movable portion 13 extending in a rectangular shape from the joining portion 12 in a direction opposite to the base portion 10, two support portions 30a and 30b extending along an outer edge of the movable portion 13 from both ends of the base portion 10 in the x-axis direction, and a physical quantity detection element 40 spanned from the base portion 10 to the movable portion 13 and joined to the base portion 10 and the movable portion 13.

In the two support portions 30a and 30b, the support portion 30a is provided with a bonding portion 36a extending along the y axis with the movable portion 13 and a gap 32a therebetween and fixing the support portion 30a, and the extension portion 38a extending along the x axis with the movable portion 13 and a gap 32c therebetween. In other words, the support portion 30a is provided with the extension portion 38a extending along the y axis with the movable portion 13 and the gap 32a therebetween and extending along the x axis with the movable portion 13 and the gap 32c therebetween, and the bonding portion 36a is provided from the support portion 30a to the extension portion 38a. In addition, the support portion 30b is provided with a bonding portion 36b extending along the y axis with the movable portion 13 and a gap 32b therebetween and fixing the support portion 30b, and the extension portion 38b extending along the x axis with the movable portion 13 and the gap 32c therebetween. In other words, the support portion 30b is provided with the extension portion 38b extending along the y axis with the movable portion 13 and the gap 32b therebetween and extending along the x axis with the movable portion 13 and the gap 32c therebetween, and the bonding portion 36b is provided from the support portion 30b to the extension portion 38b.

The bonding portions 36a and 36b provided on the support portions 30a and 30b are for mounting the substrate portion 5 of the physical quantity sensor 200 on an external member such as a package. In addition, the base portion 10, the joining portion 12, the movable portion 13, the support portions 30a and 30b, and the extension portions 38a and 38b may be formed integrally.

The movable portion 13 is surrounded by the support portions 30a and 30b and the base portion 10, and is coupled to the base portion 10 via the joining portion 12 and is cantilevered. The movable portion 13 includes the principal surfaces 13a and 13b facing opposite to each other, a side surface 13c along the support portion 30a, and a side surface 13d along the support portion 30b. The principal surface 13a is a surface facing the same side as the principal surface 10a of the base portion 10, and the principal surface 13b is a surface facing the same side as the principal surface 10b of the base portion 10.

The joining portion 12 is provided between the base portion 10 and the movable portion 13 and couples the base portion 10 to the movable portion 13. The joining portion 12 is formed to have a smaller thickness than those of the base portion 10 and the movable portion 13. The joining portion 12 has grooves 12a and 12b. The grooves 12a and 12b are formed along the X axis. In the joining portion 12, when the movable portion 13 is displaced with respect to the base portion 10, the grooves 12a and 12b function as fulcrums, that is, intermediate hinges. Such a joining portion 12 and the movable portion 13 function as cantilever.

In addition, the physical quantity detection element 40 is fixed to a surface from the principal surface 10a of the base portion 10 to the principal surface 13a of the movable portion 13 by a bonding agent 60. The fixed positions of the physical quantity detection element 40 are two locations of the central positions in the x-axis direction of the principal surface 10a and the principal surface 13a, respectively.

The physical quantity detection element 40 includes a base portion 42a fixed to the principal surface 10a of the base portion 10 with a bonding agent 60, a base portion 42b fixed to the principal surface 13a of the movable portion 13 with a bonding agent 60, and vibration beams 41a and 41b for detecting a physical quantity between the base portion 42a and the base portion 42b. In this case, the shapes of the vibration beams 41a and 41b are prismatic shapes, and when an AC voltage drive signal is applied to excitation electrodes (not illustrated) provided on the vibration beams 41a and 41b, flexural vibration is caused to be separated from or close to each other along the x axis. That is, the physical quantity detection element 40 is a tuning fork type vibrator element.

On the base portion 42a of the physical quantity detection element 40, lead electrodes 44a and 44b are provided. These lead electrodes 44a and 44b are electrically coupled to excitation electrodes (not illustrated) provided on the vibration beams 41a and 41b. The lead electrodes 44a and 44b are electrically coupled to connection terminals 46a and 46b provided on the principal surface 10a of the base portion 10 by metal wires 48. The connection terminals 46a and 46b are electrically coupled to external connection terminals 49a and 49b by wiring (not illustrated). The external connection terminals 49a and 49b are provided on the principal surface 10b side of the base portion 10 that is a surface side on which the physical quantity sensor 200 is mounted on a package or the like so as to overlap a package bonding portion 34 in a plan view. The package bonding portion 34 is for mounting the substrate portion 5 of the physical quantity sensor 200 on an external member such as a package, and is provided at two locations on end portions at both end sides of the base portion 10 in the x-axis direction.

The physical quantity detection element 40 is formed by patterning a quartz crystal substrate cut out at a predetermined angle from a quartz crystal ore or the like by a photolithography technique and an etching technique. In this case, the physical quantity detection element 40 is preferably made of the same material as the base portion 10 and the movable portion 13 in consideration of reducing a difference between the linear expansion coefficient between the base portion 10 and the movable portion 13.

The weights 50, 52, 54, and 56 are rectangular in a plan view, and are provided on the movable portion 13. The weights 50 and 52 are fixed to the principal surface 13a of the movable portion 13 by a bonding member 62, and the weights 54 and 56 are fixed to the principal surface 13b of the movable portion 13 by the bonding member 62. Here, in the weight 50 fixed to the principal surface 13a, the directions of one side as a rectangular edge side and the side surface 13c of the movable portion 13 are aligned, and the directions of the other side and the side surface 31d of the extension portion 38a are aligned in a plan view. By aligning the directions in this manner, the weight 50 is disposed on the side surface 13c side of the movable portion 13, and the weight 50 and the extension portion 38a are disposed so as to overlap each other in a plan view. Similarly, in the weight 52 fixed to the principal surface 13a, the directions of one side as a rectangular edge side and the side surface 13d side of the movable portion 13 are aligned, and the directions of the other side and the side surface 31e of the extension portion 38b are aligned in a plan view. As a result, the weight 52 is disposed on the side surface 13d of the movable portion 13, and the weight 52 and the extension portion 38b are disposed so as to overlap each other in a plan view. In the weight 54 fixed to the principal surface 13b, the directions of one side of a rectangle and the side surface 13c side of the movable portion 13 are aligned, and the directions of the other side and the side surface 31d of the extension portion 38a are aligned in a plan view. As a result, the weight 54 is disposed on the side surface 13c of the movable portion 13, and the weight 54 and the extension portion 38a are disposed so as to overlap each other in a plan view. Similarly, in the weight 56 fixed to the principal surface 13b, the directions of one side of a rectangle and the side surface 13d side of the movable portion 13 are aligned, and the directions of the other side and the side surface 31e of the extension portion 38b are aligned in a plan view. As a result, the weight 56 is disposed on the side surface 13d of the movable portion 13, and the weight 56 and the extension portion 38b are disposed so as to overlap each other in a plan view.

In the weights 50, 52, 54, and 56 disposed in this manner, the weights 50 and 52 are disposed symmetrically with respect to the physical quantity detection element 40, and the weights 54 and 56 are disposed so as to overlap the weights 50 and 52, respectively, in a plan view. These weights 50, 52, 54, and 56 are fixed to the movable portion 13 by bonding members 62 provided at the positions of the center of gravity of the weights 50, 52, 54, and 56, respectively. In addition, the weights 50 and 54 and the extension portion 38a and the weights 52 and 56 and the extension portion 38b overlap each other respectively, in a plan view. Therefore, when an excessive physical quantity is applied, the weights 50, 52, 54, and 56 abut on the extension portions 38a and 38b, and the displacement amounts of the weights 50, 52, 54, and 56 can be suppressed.

The bonding member 62 is made of a silicone resin thermosetting adhesive or the like. The bonding member 62 is applied to the principal surface 13a and the principal surface 13b of the movable portion 13 at two locations, respectively, and the weights 50, 52, 54, and 56 are placed thereon. Thereafter, the weights 50, 52, 54, and 56 are fixed to the movable portion 13 by being cured by heating. Bonding surfaces of the weights 50, 52, 54, and 56 facing the principal surface 13a and the principal surface 13b of the movable portion 13 are rough surfaces. As a result, when the weights 50, 52, 54, and 56 are fixed to the movable portion 13, a bonding area on the bonding surface is increased, and the bonding strength can be improved.

Figure 6:
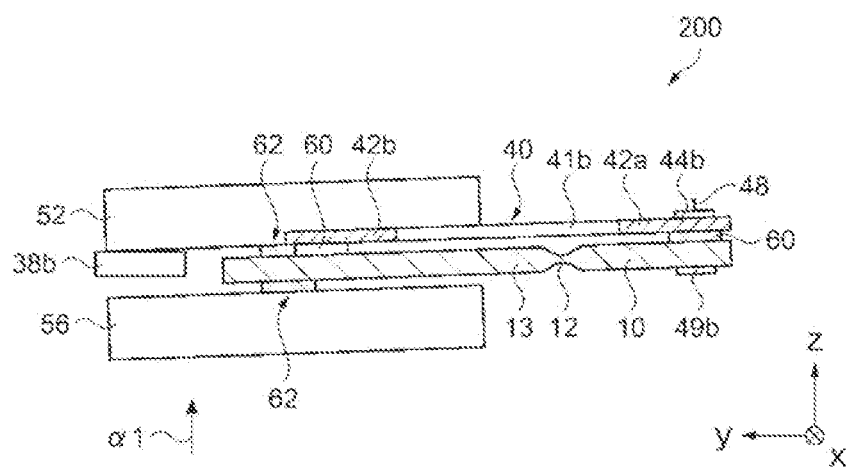
FIG. 6 is an explanatory diagram of an operation of the physical quantity sensor.

As illustrated in FIG. 6, when the acceleration in the +Z direction represented by the arrow al is applied to the physical quantity sensor 200 configured as described above, a force acts on the movable portion 13 in the −Z direction, and the movable portion 13 is displaced in the −Z direction with the joining portion 12 as a fulcrum. As a result, a force in a direction where the base portion 42a and the base portion 42b are separated from each other along the Y axis is applied to the physical quantity detection element 40, and tensile stress is generated in the vibration beams 41a and 41b. Therefore, the frequency at which the vibration beams 41a and 41b vibrate increases.

Figure 7:
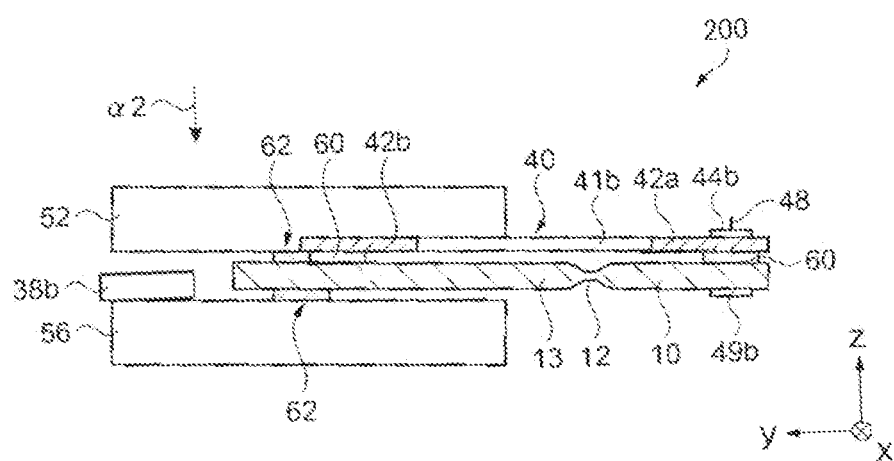
FIG. 7 is an explanatory diagram of an operation of the physical quantity sensor.

On the other hand, as illustrated in FIG. 7, when acceleration in the −Z direction represented by the arrow β2 is applied to the physical quantity sensor 200, a force acts on the movable portion 13 in the +Z direction, and the movable portion 13 is displaced in the +Z direction with the joining portion 12 as a fulcrum. As a result, a force in a direction where the base portion 42a and the base portion 42b approach each other along the Y axis is applied to the physical quantity detection element 40, and compressive stress is generated in the vibration beams 41a and 41b. Therefore, the frequency at which the vibration beams 41a and 41b vibrate decreases.

When the frequency at which the vibration beams 41a and 41b vibrate changes according to the acceleration, the frequency of signals output from the external connection terminals 49a and 49b of the physical quantity sensor 200 changes. The sensor module 1 can calculate the value of the acceleration applied to the physical quantity sensor 200 based on the change in the frequency of the output signal of the physical quantity sensor 200.

In order to increase the detection accuracy of acceleration which is a physical quantity, the joining portion 12 that connects the base portion 10 as a fixed portion and the movable portion 13 is preferably a quartz crystal that is a member having a high Q value. For example, the base portion 10, the support portions 30a and 30b, and the movable portion 13 may be formed of a quartz crystal plate, and the grooves 12a and 12b of the joining portion 12 may be formed by half etching from both surfaces of the quartz crystal plate.

1-3. Functional Configuration of Sensor Module

Figure 8:
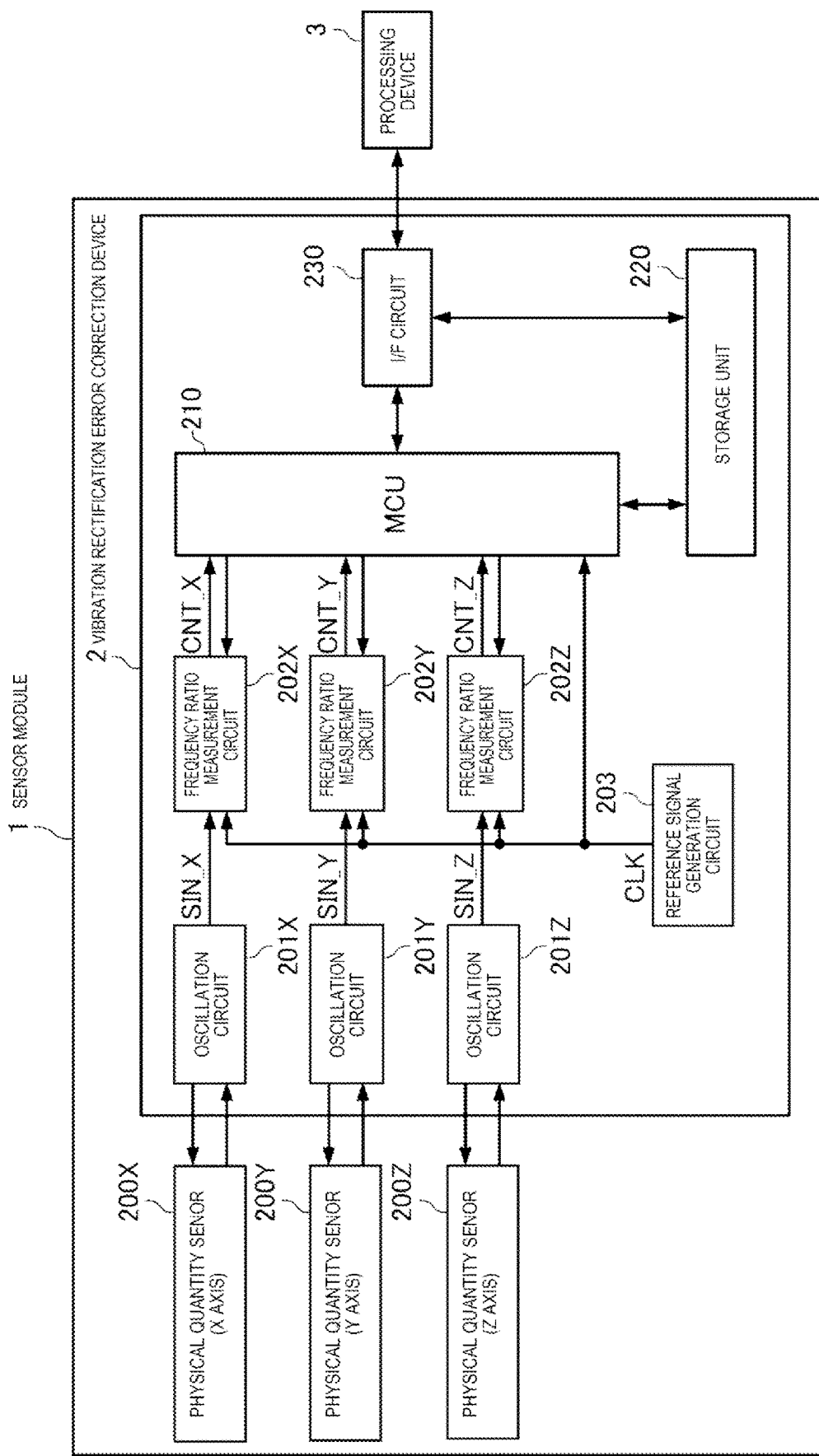
FIG. 8 is a functional block diagram of the sensor module.

FIG. 8 is a functional block diagram of the sensor module 1. As described above, the sensor module 1 includes the physical quantity sensor 200X, 200Y, and 200Z, and the vibration rectification error correction device 2.

The vibration rectification error correction device 2 includes oscillation circuits 201X, 201Y, and 201Z, frequency ratio measurement circuits 202X, 202Y, and 202Z, a micro-control unit 210, a storage unit 220, and an interface circuit 230.

The oscillation circuit 201X amplifies the output signal of the physical quantity sensor 200X to generate a drive signal, and applies the drive signal to the physical quantity sensor 200x. Due to the drive signal, the vibration beams 41a and 41b of the physical quantity sensor 200X vibrate at a frequency corresponding to the acceleration in the X-axis direction, and a signal of the frequency is output from the physical quantity sensor 200X. Further, the oscillation circuit 201X outputs a measured signal SIN_X, which is a rectangular wave signal obtained by amplifying the output signal of the physical quantity sensor 200X, to the frequency ratio measurement circuit 202X. The measured signal SIN_X is a signal based on the output signal of the physical quantity sensor 200X. The physical quantity sensor 200X is an example of the "first physical quantity sensor", and the measured signal SIN_X is an example of the "first measured signal".

Similarly, the oscillation circuit 201Y amplifies the output signal of the physical quantity sensor 200Y to generate a drive signal, and applies the drive signal to the physical quantity sensor 200Y. Due to the drive signal, the vibration beams 41a and 41b of the physical quantity sensor 200Y vibrate at a frequency corresponding to the acceleration in the Y-axis direction, and a signal of the frequency is output from the physical quantity sensor 200Y. Further, the oscillation circuit 201Y outputs a measured signal SIN_Y, which is a rectangular wave signal obtained by amplifying the output signal of the physical quantity sensor 200Y, to the frequency ratio measurement circuit 202Y. The measured signal SIN_Y is a signal based on the output signal of the physical quantity sensor 200Y. The physical quantity sensor 200Y is an example of the "second physical quantity sensor", and the measured signal SIN_Y is an example of the "second measured signal".

Similarly, the oscillation circuit 201Z amplifies the output signal of the physical quantity sensor 200Z to generate a drive signal, and applies the drive signal to the physical quantity sensor 200Z. Due to the drive signal, the vibration beams 41a and 41b of the physical quantity sensor 200Z vibrate at a frequency corresponding to the acceleration in the Z-axis direction, and a signal of the frequency is output from the physical quantity sensor 200Z. Further, the oscillation circuit 201Z outputs a measured signal SIN_Z, which is a rectangular wave signal obtained by amplifying the output signal of the physical quantity sensor 200Z, to the frequency ratio measurement circuit 202Z. The measured signal SIN_Z is a signal based on the output signal of the physical quantity sensor 200Z.

The reference signal generation circuit 203 generates and outputs a reference signal CLK having a constant frequency. In the present embodiment, the frequency of the reference signal CLK is higher than the frequencies of the measured signals SIN_X, SIN_Y, and SIN_Z. The reference signal CLK preferably has high frequency accuracy, and the reference signal generation circuit 203 may be, for example, a temperature compensated crystal oscillator.

The frequency ratio measurement circuit 202X counts the number of pulses of the reference signal CLK included in a predetermined period of the measured signal SIN_X, which is a signal based on the signal output from the oscillation circuit 201X, and outputs a count value CNT_X. The count value CNT_X is a reciprocal count value corresponding to the frequency ratio of the measured signal SIN_X and the reference signal CLK.

The frequency ratio measurement circuit 202Y counts the number of pulses of the reference signal CLK included in a predetermined period of the measured signal SIN_Y output from the oscillation circuit 201Y, and outputs a count value CNT_Y. The count value CNT_Y is a reciprocal count value corresponding to the frequency ratio of the measured signal SIN_Y and the reference signal CLK.

The frequency ratio measurement circuit 202Z counts the number of pulses of the reference signal CLK included in a predetermined period of the measured signal SIN_Z output from the oscillation circuit 201Z, and outputs a count value CNT_Z. The count value CNT_Z is a reciprocal count value corresponding to the frequency ratio of the measured signal SIN_Z and the reference signal CLK.

The storage unit 220 stores programs and data, and may include a volatile memory such as SRAM or DRAM. SRAM is an abbreviation for static random access memory, and DRAM is an abbreviation for dynamic random access memory.

In addition, the storage unit 220 may include a non-volatile memory such as a semiconductor memory such as EEPROM or flash memory, a magnetic storage device such as a hard disk device, or an optical storage device such as an optical disk device. EEPROM is an abbreviation for electrically erasable programmable read only memory.

The micro-control unit 210 operates in synchronization with the reference signal CLK, and performs predetermined arithmetic processing and control processing by executing a program (not illustrated) stored in the storage unit 220. For example, the micro-control unit 210 measures the physical quantities detected by the physical quantity sensors 200X, 200Y, and 200Z, respectively based on the count value CNT_X output from the frequency ratio measurement circuit 202X, the count value CNT_Y output from the frequency ratio measurement circuit 202Y, and the count value CNT_Z output from the frequency ratio measurement circuit 202Z. Specifically, the micro-control unit 210 converts the count value CNT_X, the count value CNT_Y, and the count value CNT_Z into a measurement value of the physical quantity in the X-axis direction, a measurement value of the physical quantity in the Y-axis direction, and a measurement value of the physical quantity in the Z-axis direction, respectively. For example, the storage unit 220 stores table information that defines the correspondence relationship between the count value and the measurement value of the physical quantity, or information on the relational expression between the count value and the measurement value of the physical quantity, and the micro-control unit 210 may convert each count value into a measurement value of a physical quantity with reference to the information.

The micro-control unit 210 may transmit the measurement value of the physical quantity in the X-axis direction, the measurement value of the physical quantity in the Y-axis direction, and the measurement value of the physical quantity in the Z-axis direction to a processing device 3 via the interface circuit 230. Alternatively, the micro-control unit 210 may write the measurement value of the physical quantity in the X-axis direction, the measurement value of the physical quantity in the Y-axis direction, and the measurement value of the physical quantity in the Z-axis direction to the storage unit 220, respectively, and the processing device 3 may read out each measurement value via the interface circuit 230.

Since the configuration and operation of the frequency ratio measurement circuits 202X, 202Y, and 202Z are the same, any one of the frequency ratio measurement circuits 202X, 202Y, and 202Z will be referred to as a frequency ratio measurement circuit 202 hereafter. Further, any one of the measured signals SIN_X, SIN_Y, and SIN_Z input to the frequency ratio measurement circuit 202 is referred to as a measured signal SIN, and any one of the count values CNT_X, CNT_Y, and CNT_Z output from the frequency ratio measurement circuit 202 is referred to as a count value CNT.

1-4. Vibration Rectification Error

A vibration rectification error corresponds to the DC offset generated during rectification due to the non-linearity of the response of the sensor module 1 to vibration, and is observed as an abnormal shift of the output offset of the sensor module 1. The vibration rectification error causes a serious measurement error in an application such as an inclinometer using the sensor module 1 in which the DC output of the sensor module 1 is a measurement target as it is. There are three main mechanisms that cause a vibration rectification error: 1. due to asymmetric rails, 2. due to non-linearity of scale factors, and 3. due to structural resonance of the physical quantity sensor 200.

1. Vibration Rectification Error Due to Asymmetric Rails

When the sensitivity axis of the physical quantity sensor 200 is in the direction of gravitational acceleration, the measurement value of the sensor module 1 has an offset corresponding to the gravitational acceleration of 1 g=9.8 m/s$^2$. For example, if the dynamic range of the physical quantity sensor 200 is 2 g, vibration can be measured up to 1 g without clipping. If vibration exceeding 1 g is applied in this state, clipping occurs asymmetrically, and therefore the measurement value includes a vibration rectification error.

When the dynamic range is as wide as 15 g, for example, clipping is rarely a problem in a normal usage environment. On the other hand, the physical quantity sensor 200 has a built-in physical protection mechanism for the purpose of preventing damage to the physical quantity detection element 40, and when the vibration level exceeds a certain threshold value, the protection mechanism works, and therefore clipping occurs. In order to prevent clipping, it is necessary to devise an attachment for installing the sensor module 1 and take measures such as damping the vibration of a resonance frequency band.

2. Vibration Rectification Error Due to Non-Linearity of Scale Factors

Figure 9:
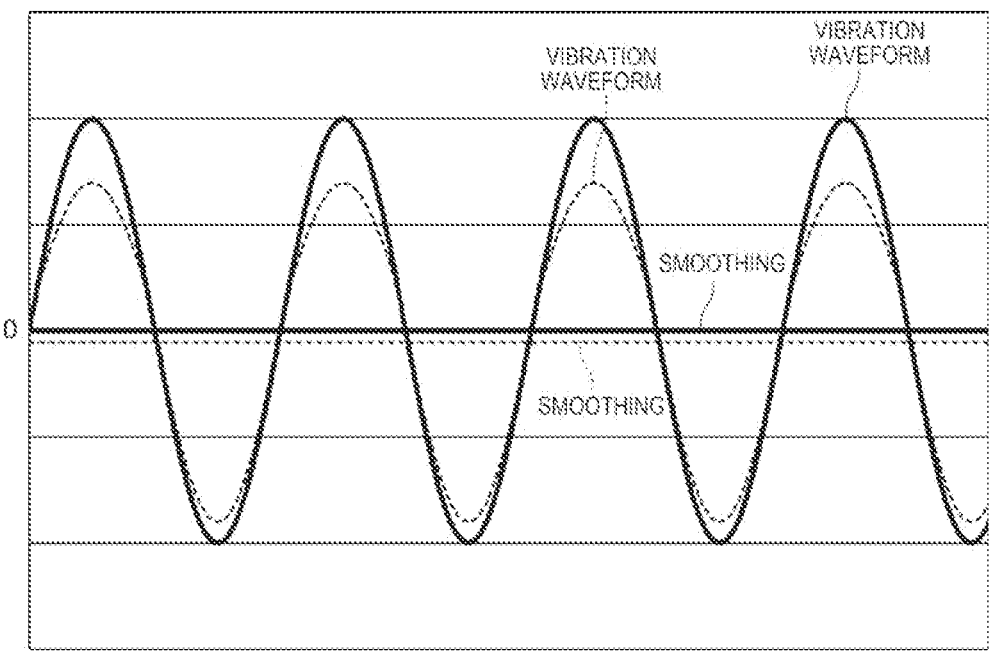
FIG. 9 is a diagram illustrating in principle that a vibration rectification error occurs due to output waveform distortion.

FIG. 9 is a diagram illustrating in principle that a vibration rectification error occurs due to output waveform distortion. In FIG. 9, the solid line indicates a sinusoidal vibration waveform and a smoothed waveform of the vibration waveform, and the broken line indicates an asymmetrical vibration waveform above and below the center of vibration and a smoothed waveform of the vibration waveform. The smoothed waveform indicated by the solid line is 0, while the smoothed waveform indicated by the broken line has a negative value, and an offset occurs during smoothing.

The physical quantity sensor 200 is a frequency change type sensor, and the count value CNT corresponding to the frequency ratio of the measured signal SIN and the reference signal CLK is a reciprocal count value. The relationship between the acceleration applied to the physical quantity sensor 200 and the reciprocal count value has non-linearity. The broken line in FIG. 10 indicates the non-linearity between the applied acceleration and the reciprocal count value. The broken line in FIG. 11 indicates the non-linearity between applied the acceleration and the oscillation frequency of the physical quantity sensor 200. The broken line in FIG. 12 indicates the non-linearity between the oscillation frequency of the physical quantity sensor 200 and the reciprocal count value. The broken line in FIG. 10 is obtained by combining the broken line in FIG. 11 and the broken line in FIG. 12.

Figure 10:
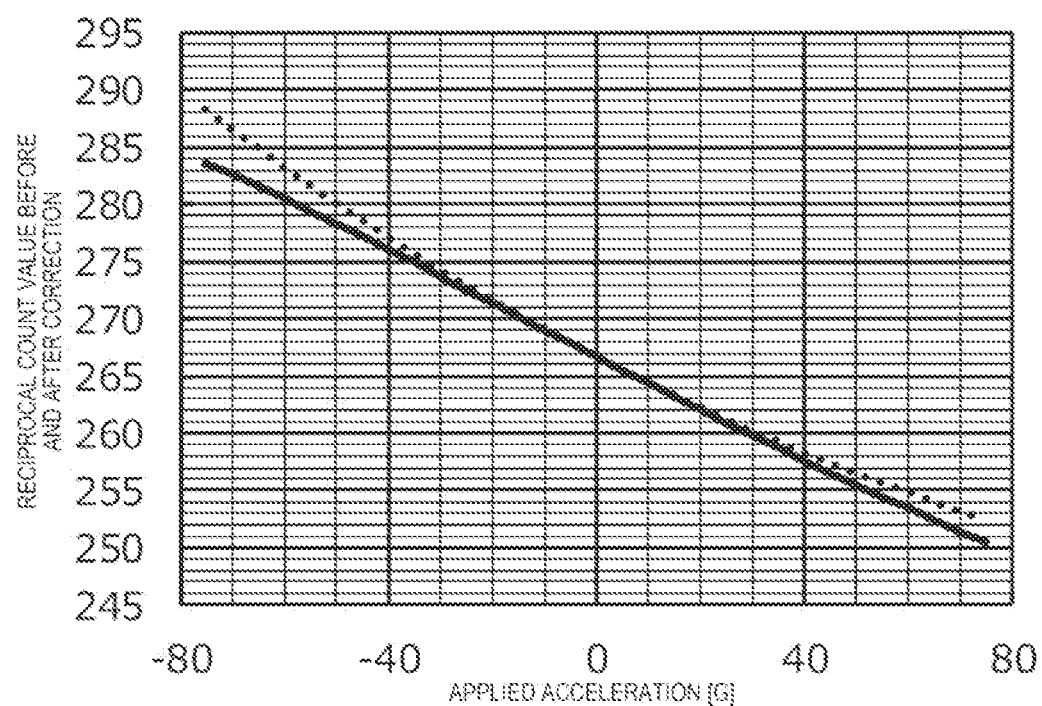
FIG. 10 is a diagram illustrating the non-linearity between applied acceleration and a reciprocal count value.
Figure 11:
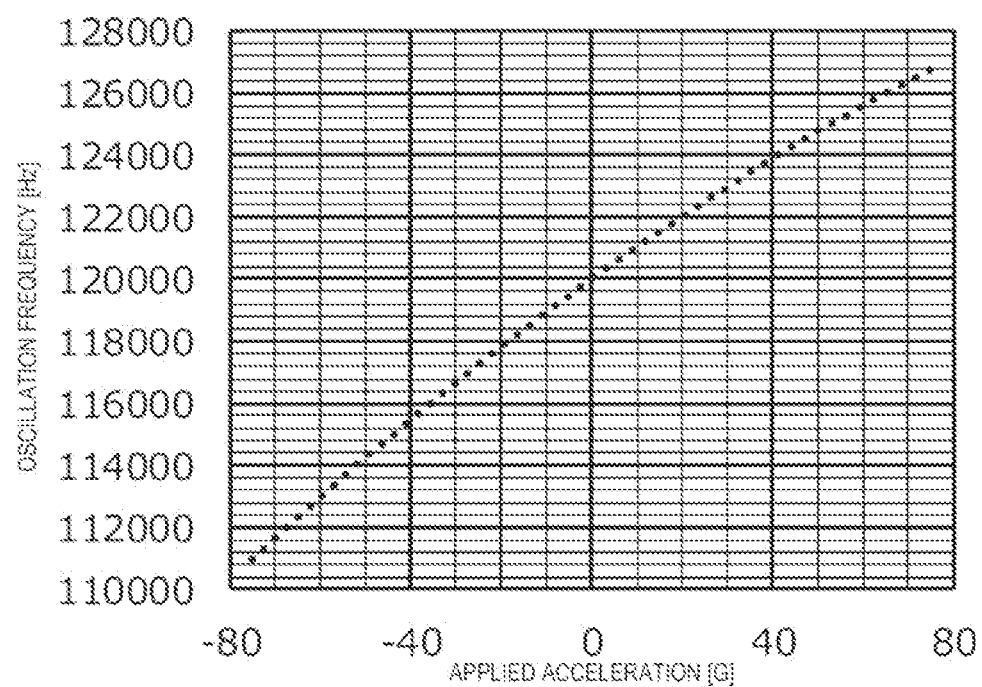
FIG. 11 is a diagram illustrating the non-linearity between applied acceleration and the oscillation frequency of the physical quantity sensor.
Figure 12:
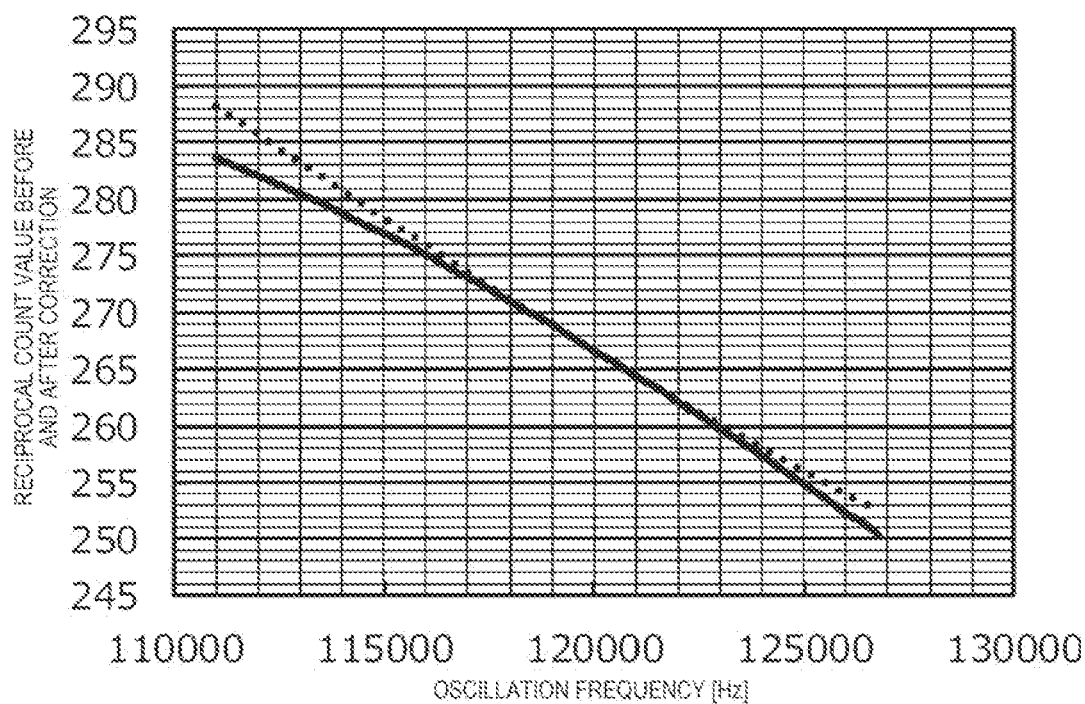
FIG. 12 is a diagram illustrating the non-linearity between the oscillation frequency of the physical quantity sensor and the reciprocal count value.

Here, by correcting the relationship between the oscillation frequency and the reciprocal count value as indicated by the solid line in FIG. 12, the relationship between the acceleration and the reciprocal count value can be made linear as indicated by the solid line in FIG. 10. Specifically, the above-mentioned micro-control unit 210 can correct the count value CNT by using the correction function represented by Equation (1).

$$Y = \{c - d\}^2 \quad (1)$$

In Equation (1), c is the count value before correction corresponding to the broken line in FIG. 10, Y is the count value after correction corresponding to the solid line in FIG. 10, and d is a coefficient that determines the degree of correction illustrated in FIG. 12. For example, the coefficient d is stored in the storage unit 220 or set by the processing device 3.

3. Vibration Rectification Error Caused by Cantilever Resonance

As a principle of detecting acceleration, the physical quantity sensor 200 changes the tension acting on the physical quantity detection element 40 by transmitting the deflection of the cantilever with a weight due to the acceleration to the physical quantity detection element 40 which is a twin tuning fork resonator, thereby changing the oscillation frequency. Therefore, the physical quantity detection element 40 has a resonance frequency due to the structure of the cantilever, and when the cantilever resonance is excited, an inherent vibration rectification error occurs. The cantilever resonance has a frequency higher than the frequency bandwidth corresponding to the range of detectable acceleration, and the vibration component thereof is removed by the low-pass filter inside the vibration rectification error correction device 2, but a vibration rectification error occurs as a bias offset that reflects the asymmetry of vibration. As the amplitude of the cantilever resonance increases, the asymmetry of the output waveform of the physical quantity sensor 200 increases, and therefore the vibration rectification error also increases. Therefore, it is an important issue to reduce the vibration rectification error caused by the cantilever resonance.

In the present embodiment, since the frequency ratio measurement circuit 202 is a reciprocal counting system that counts the number of pulses of the reference signal CLK included in a predetermined period of the measured signal SIN, the timing of acquiring this count value is synchronized with the measured signal SIN. On the other hand, the count value CNT output from the frequency ratio measurement circuit 202 needs to be synchronized with the frequency division signal of the reference signal CLK, and resampling is required because the timing of acquiring the count value of the number of pulses of the reference signal CLK and the frequency division signal of the reference signal CLK are not synchronized. By devising the configuration required for resampling in the frequency ratio measurement circuit 202, it is possible to generate the count value CNT in which the vibration rectification error caused by the cantilever resonance is corrected.

1-5. Configuration of Frequency Ratio Measurement Circuit

Figure 13:
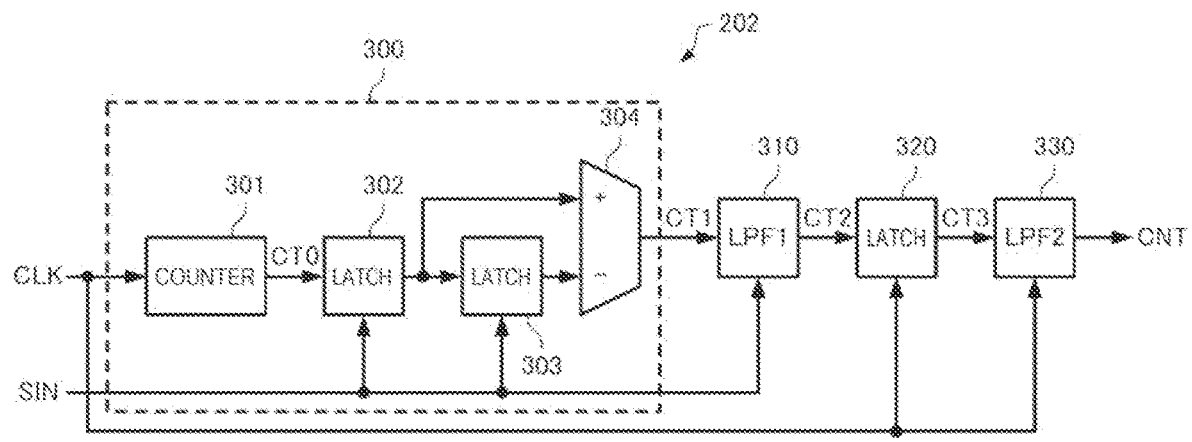
FIG. 13 is a diagram illustrating a configuration example of a frequency ratio measurement circuit.

The frequency ratio measurement circuit 202 measures the frequency ratio of the measured signal SIN and the reference signal CLK by the reciprocal counting system. FIG. 13 is a diagram illustrating a configuration example of the frequency ratio measurement circuit 202. As illustrated in FIG. 13, the frequency ratio measurement circuit 202 includes a frequency delta-sigma modulation circuit 300, a first low-pass filter 310, a latch circuit 320, and a second low-pass filter 330.

The frequency delta-sigma modulation circuit 300 performs frequency delta-sigma modulation on the reference signal CLK by using the measured signal SIN to generate a frequency delta-sigma modulated signal. The frequency delta-sigma modulation circuit 300 includes a counter 301, a latch circuit 302, a latch circuit 303, and a subtractor 304. The counter 301 counts the rising edge of the reference signal CLK and outputs a count value CT0. The latch circuit 302 latches and holds the count value CT0 in synchronization with the rising edge of the measured signal SIN. The latch circuit 303 latches and holds the count value held by the latch circuit 302 in synchronization with the rising edge of the measured signal SIN. The subtractor 304 subtracts the count value held by the latch circuit 303 from the count value held by the latch circuit 302 to generate and output a count value CT1. This count value CT1 is a frequency delta-sigma modulated signal generated by the frequency delta-sigma modulation circuit 300.

This frequency delta-sigma modulation circuit 300 is also called a primary frequency delta-sigma modulator, and latches the count value of the number of pulses of the reference signal CLK twice by the measured signal SIN, and sequentially holds the count value of the number of pulses of the reference signal CLK, triggered by the rising edge of the measured signal SIN. Here, delta-sigma modulation circuit 300 has been described as performing the latch operation at the rising edge of the measured signal SIN, but the latch operation may be performed at the falling edge or both the rising edge and the falling edge. Further, the subtractor 304 calculates the difference between the two count values held in the latch circuits 302 and 303 to output an increment of the count value of the number of pulses of the reference signal CLK observed during one period of the measured signal SIN with the passage of time without a dead period. When the frequency of the measured signal SIN is fx and the frequency of the reference signal CLK is fc, the frequency ratio is fc/fx. The frequency delta-sigma modulation circuit 300 outputs a frequency delta-sigma modulated signal indicating the frequency ratio as a digital signal sequence.

The first low-pass filter 310 operates in synchronization with the measured signal SIN, and outputs a count value CT2 from which the noise component included in the count value CT1 which is the frequency delta-sigma modulated signal output from the frequency delta-sigma modulation circuit 300 is removed or reduced. In FIG. 13, the first low-pass filter 310 is provided immediately after the frequency delta-sigma modulation circuit 300, but may be provided on the signal path from the output of the frequency delta-sigma modulation circuit 300 to the input of the second low-pass filter 330.

The latch circuit 320 latches the count value CT2 output from the first low-pass filter 310 in synchronization with the rising edge of the reference signal CLK, and holds the latched value as a count value CT3.

The second low-pass filter 330 operates in synchronization with the reference signal CLK, and outputs a count value obtained by removing or reducing a noise component included in the count value CT3 held by the latch circuit 320. The count value output from the second low-pass filter 330 is output to the micro-control unit 210 as the count value CNT.

Figure 14:
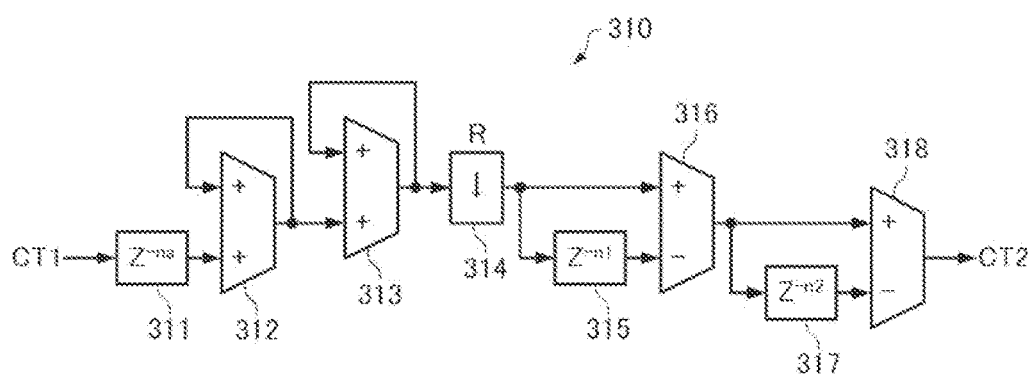
FIG. 14 is a diagram illustrating a configuration example of a first low-pass filter.

FIG. 14 is a diagram illustrating a configuration example of the first low-pass filter 310. In the example of FIG. 14, the first low-pass filter 310 includes a delay element 311, an integrator 312, an integrator 313, a decimator 314, a delay element 315, a differentiator 316, a delay element 317, and a differentiator 318. Each part of the first low-pass filter 310 operates in synchronization with the measured signal SIN.

The delay element 311 outputs a count value obtained by delaying the count value CT1 in synchronization with the measured signal SIN. The number of taps of the delay element 311 is na. For example, the delay element 311 is realized by a shift register in which na registers are serially coupled.

The integrator 312 outputs a count value obtained by integrating the count values output from the delay element 311 in synchronization with the measured signal SIN.

The integrator 313 outputs a count value obtained by integrating the count values output from the integrator 312 in synchronization with the measured signal SIN.

The decimator 314 outputs a count value obtained by decimating the count value output from the integrator 313 to a rate of 1/R in synchronization with the measured signal SIN.

The delay element 315 outputs a count value obtained by delaying the count value output from the decimator 314 in synchronization with the measured signal SIN. The number of taps of the delay element 315 is n1. For example, the delay element 315 is realized by a shift register in which n1 registers are serially coupled.

The differentiator 316 outputs a count value obtained by subtracting the count value output from the delay element 315 from the count value output from the decimator 314.

The delay element 317 outputs a count value obtained by delaying the count value output from the differentiator 316 in synchronization with the measured signal SIN. The number of taps of the delay element 317 is n2. For example, the delay element 317 is realized by a shift register in which n2 registers are serially coupled.

The differentiator 318 outputs the count value CT2 obtained by subtracting the count value output from the delay element 317 from count the value output from the differentiator 316.

The number of taps n1 and n2 and a decimation ratio R are fixed, and the number of taps na is variable. For example, the number of taps na is stored in the storage unit 220 or set by the processing device 3.

The first low-pass filter 310 configured in this way functions as a CIC filter in which the group delay amount is variable depending on the number of taps na. CIC is an abbreviation for cascaded integrator comb.

Figure 15:
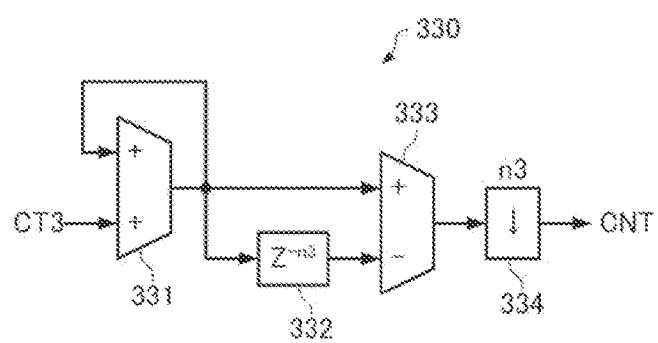
FIG. 15 is a diagram illustrating a configuration example of a second low-pass filter.

FIG. 15 is a diagram illustrating a configuration example of the second low-pass filter 330. In the example of FIG. 15, the second low-pass filter 330 includes an integrator 331, a delay element 332, a differentiator 333, and a decimator 334. Each part of the second low-pass filter 330 operates in synchronization with the reference signal CLK.

The integrator 331 outputs a count value obtained by integrating the count values CT3 in synchronization with the reference signal CLK.

The delay element 332 outputs a count value obtained by delaying the count value output from the integrator 331 in synchronization with the reference signal CLK. The number of taps of the delay element 332 is n3. For example, the delay element 332 is realized by a shift register in which n3 registers are serially coupled.

The differentiator 333 outputs a count value obtained by subtracting the count value output from the delay element 332 from the count value output from the integrator 331.

The decimator 334 outputs the count value CNT obtained by decimating the count value output from the differentiator 333 to a rate of 1/n3 in synchronization with the reference signal CLK.

The number of taps and the decimation ratio n3 are fixed.

Since the second low-pass filter 330 configured in this way integrates the count values CT3 while resampling the count values CT3 with the reference signal CLK, the second low-pass filter 330 functions as a weighted moving average filter for weighting the count values CT3 by the duration thereof.

Since the first low-pass filter 310 operates in synchronization with the measured signal SIN, and the second low-pass filter 330 performs resampling synchronized with the reference signal CLK n this way, non-linearity occurs in the input and the output of the frequency ratio measurement circuit 202. Therefore, the count value CNT output from the frequency ratio measurement circuit 202 includes a vibration rectification error due to this non-linearity. This vibration rectification error can be adjusted by adjusting the number of taps na of the delay element 311 included in the first low-pass filter 310.

FIGS. 16A to 16D are diagrams illustrating that the vibration rectification error due to the non-linearity of the input and the output of the frequency ratio measurement circuit 202 can be adjusted. FIGS. 16A to 16D illustrate examples of the case where the period of the measured signal SIN is longer than the period of the reference signal CLK and the update period of the count value CNT is longer than the period of the measured signal SIN, and the horizontal-axis direction corresponds to the passage of time. In FIGS. 16A to 16D, regarding the reference signal CLK, the timing of the rising edge is indicated by the short vertical line. Further, regarding the count values CT1 and CT2, the timing at which the values change is indicated by the short vertical line. In FIGS. 16A to 16D, for the purpose of describing the adjustment mechanism of the vibration rectification error, simplified numerical values are used for easy understanding. Further, it is described that the count value CT2 is fixed before the count value CT1 is fixed although the count value CT2 is not fixed until after the count value CT1 is fixed. But the actual calculation of the count value CT2 is executed after the count value CT1 is fixed.

Figure 16A:
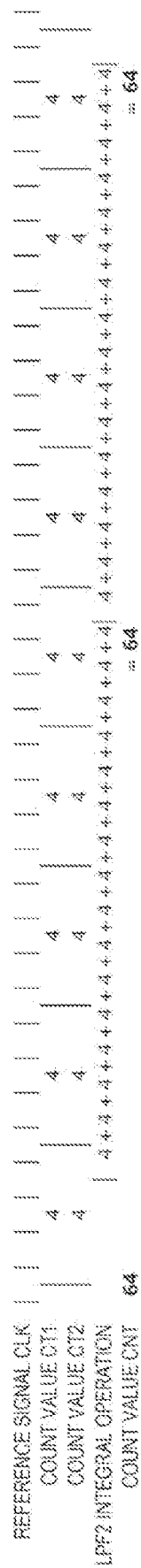
FIGS. 16A to 16D are diagrams illustrating that the vibration rectification error due to the non-linearity of an input and an output of the frequency ratio measurement circuit can be adjusted.
Figure 16B:
Figure 16C:
Figure 16D:
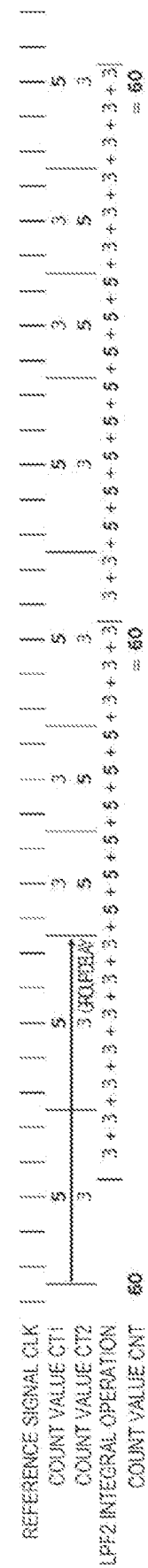

In FIGS. 16A to 16D, FIG. 16A is an example of the case where the period of the measured signal SIN is constant, and FIGS. 16B, 16C, and 16D are examples of the case where the measured signal SIN is frequency-modulated. In FIGS. 16B, 16C, and 16D, the group delay amounts of the first low-pass filters 310 are different from each other. For the sake of simplicity, the period of the reference signal CLK and the period of the measured signal SIN are set to a simple integer ratio, and the count value CT1 input to the first low-pass filter 310 is output as it is with a constant group delay. The second low-pass filter 330 integrates the count values CT3 in which the count value CT2 output from the first low-pass filter 310 is latched in synchronization with the reference signal CLK, and outputs the accumulated value for 16 times as the count value CNT.

In the example of FIG. 16A, the count value CT2 is always 4, and the count value CNT is 4×16=64. In the example of FIG. 16B, since the measured signal SIN is frequency-modulated and the group delay of the first low-pass filter 310 is set to 0, the count value CT2 repeats 5, 5, 3, and 3. Since weighting is performed by time at the time of integration, the count value CNT is 5×10+3×6=68, which is larger than the count value CNT of FIG. 16A. In the example of FIG. 16C, the count value CT2 repeats 5, 5, 3, and 3, as in the example of FIG. 16B, but the case where a group delay occurs in the first low-pass filter 310 is illustrated. As a result of weighting by time at the time of integration, the count value CNT is 5×8+3×8=64, which is the same value as the count value CNT in FIG. 16A. In the example of FIG. 16D, the count value CT2 repeats 5, 5, 3, and 3, as in the examples of FIGS. 16B and 16C, but the case where the group delay occurring in the first low-pass filter 310 is larger than that of the example of FIG. 16C is illustrated. In the example of FIG. 16D, the count value CNT is 5×6+3×10=60, which is smaller than the count value CNT of FIG. 16A.

From the consideration using FIGS. 16A to 16D, it can be qualitatively understood that the vibration rectification error due to the non-linearity of the input and the output of the frequency ratio measurement circuit 202 changes depending on the group delay amount of the first low-pass filter 310. By adjusting the group delay amount of the first low-pass filter 310 so that the vibration rectification error due to the non-linearity of the input and the output of the frequency ratio measurement circuit 202 has the opposite phase to the vibration rectification error caused by the cantilever resonance, it is possible to cancel each other's vibration rectification errors. The group delay amount of the first low-pass filter 310 can be adjusted by setting the number of taps na of the delay element 311.

Figure 17:
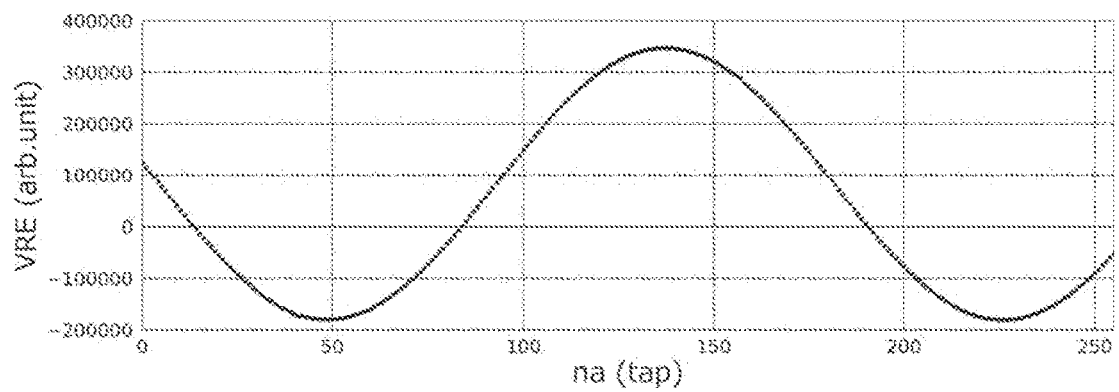
FIG. 17 is a diagram illustrating the dependence of the vibration rectification error included in a measurement value on the number of taps.

FIG. 17 is a diagram illustrating the dependence of the vibration rectification error included in the measurement value by the vibration rectification error correction device 2 on the number of taps na. In FIG. 17, the horizontal axis is the number of taps na, and the vertical axis is the vibration rectification error. VRE on the vertical axis is an abbreviation for vibration rectification error. From FIG. 17, if the number of taps na is set appropriately, it is possible to correct the vibration rectification error and bring the error closer to 0.

Figure 18:
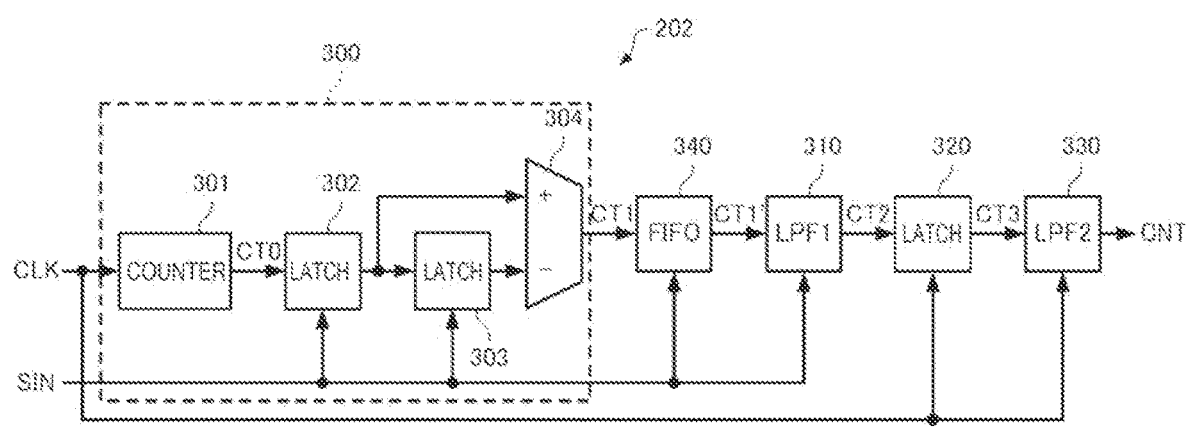
FIG. 18 is a diagram illustrating a configuration example of the frequency ratio measurement circuit.
Figure 19:
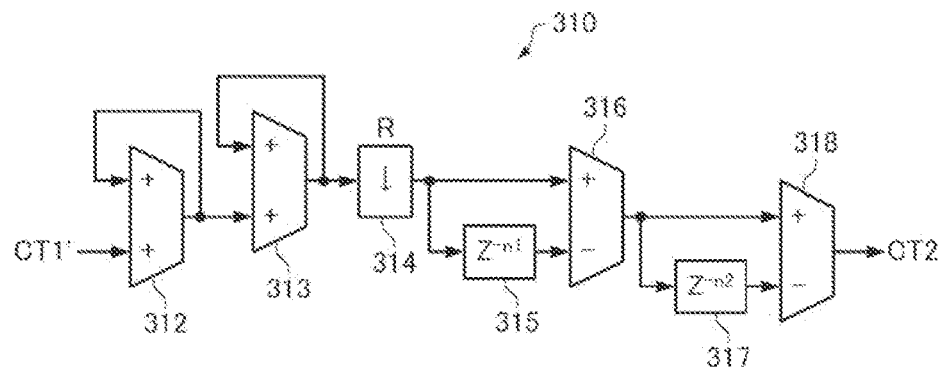
FIG. 19 is a diagram illustrating a configuration example of the first low-pass filter.

In the first low-pass filter 310 having the configuration of FIG. 14, since the delay element 311 is realized by a FIFO register using a shift register, when the FIFO register is taken out of the first low-pass filter 310, the frequency ratio measurement circuit 202 having the configuration illustrated in FIG. 13 has the configuration illustrated in FIG. 18, and the first low-pass filter 310 having the configuration of FIG. 14 has the configuration of FIG. 19. FIFO is an abbreviation for first in first out.

Figure 20:
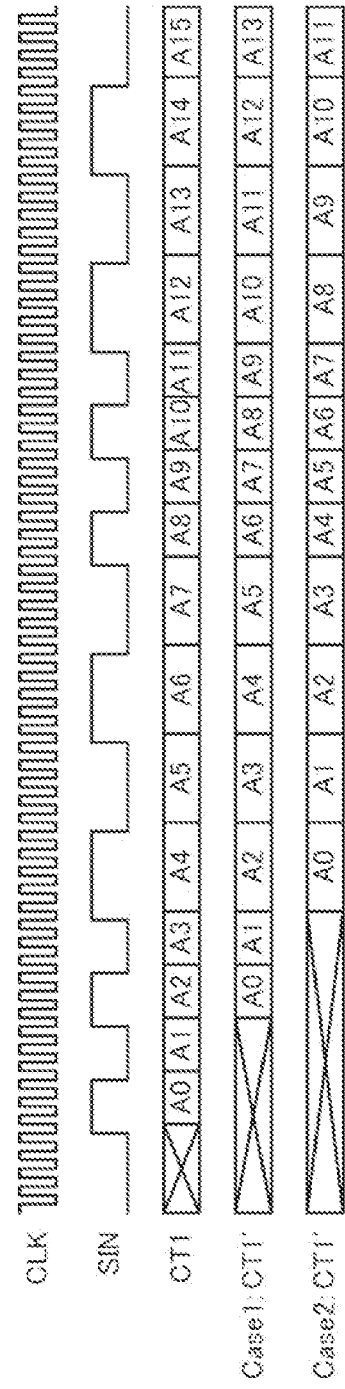
FIG. 20 is a timing chart of count values input and output to and from a FIFO register.

FIG. 20 illustrates an example of a timing chart of the count value CT1 input to the FIFO register 340 and a count value CT1' output from the FIFO register 340. In the example of FIG. 20, the count values CT1 and CT1' change in synchronization with both edges of the measured signal SIN. That is, in the example of FIG. 20, the frequency delta-sigma modulation circuit 300 and the FIFO register 340 operate in synchronization with both edges of the measured signal SIN. Case 1 is a case where the number of stages of the FIFO register 340 is 2, and Case 2 is a case where the number of stages of the FIFO register 340 is 4.

Also in the frequency ratio measurement circuit 202 having the configuration of FIG. 18, if the number of stages of the FIFO register 340, which is equivalent to the number of taps na of the delay element 311 is adjusted, and the group delay amount is appropriately set, it is possible to correct the vibration rectification error and bring the error closer to 0.

However, since the characteristics of the three physical quantity detection elements 40 of the physical quantity sensor 200X, 200Y, and 200Z have individual variations, in the frequency ratio measurement circuits 202X, 202Y, and 202Z, the optimum value of the group delay amount required for correcting the vibration rectification error also varies from one to another. Therefore, when the optimum values of the group delay amounts of the frequency ratio measurement circuits 202X, 202Y, and 202Z are different from each other, the time from when the measured signals SIN_X, SIN_Y, and SIN_Z are input to the frequency ratio measurement circuits 202X, 202Y, and 202Z, respectively, to the time when the count values CNT_X, CNT_Y, and CNT_Z are output respectively is also different from each other. Therefore, for example, there may be a problem when high-precision synchronous measurement is required between the X axis, the Y axis, and the Z axis.

Therefore, in the present embodiment, by controlling the timing at which the count value CT1' is output while fixing the group delay amount, that is, by controlling the timing at which the count value CT2 is output from the first low-pass filter 310, the frequency ratio measurement circuit 202 is improved so as to correct the vibration rectification error.

FIGS. 21A to 21D are diagrams illustrating that the vibration rectification error due to the non-linearity of the input and the output of the frequency ratio measurement circuit 202 can be adjusted by controlling the timing at which the count value CT2 is output. FIGS. 21A to 21D illustrate examples of the case where the period of the measured signal SIN is longer than the period of the reference signal CLK and the update period of the count value CNT is longer than the period of the measured signal SIN, and the horizontal-axis direction corresponds to the passage of time. In FIGS. 21A to 21D, regarding the reference signal CLK, the timing of the rising edge is indicated by the short vertical line. Further, regarding the count values CT1 and CT2, the timing at which the values change is indicated by the short vertical line. In FIGS. 21A to 21D, for the purpose of describing the adjustment mechanism of the vibration rectification error, simplified numerical values are used for easy understanding. Further, it is described that the count value CT2 is fixed before the count value CT1 is fixed although the count value CT2 is not fixed until after the count value CT1 is fixed. But the actual calculation of the count value CT2 is executed after the count value CT1 is fixed.

Figure 21A:
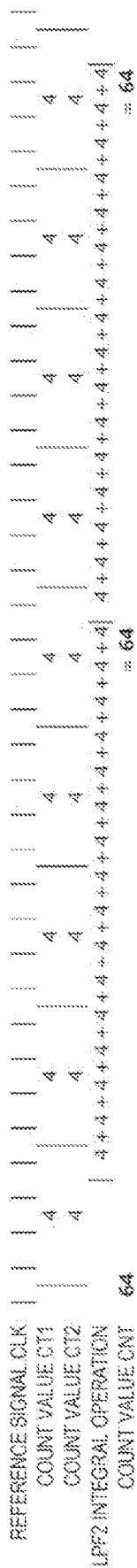
FIGS. 21A to 21D are diagrams illustrating that the vibration rectification error due to the non-linearity of the input and the output of the frequency ratio measurement circuit can be adjusted.
Figure 21B:
Figure 21C:
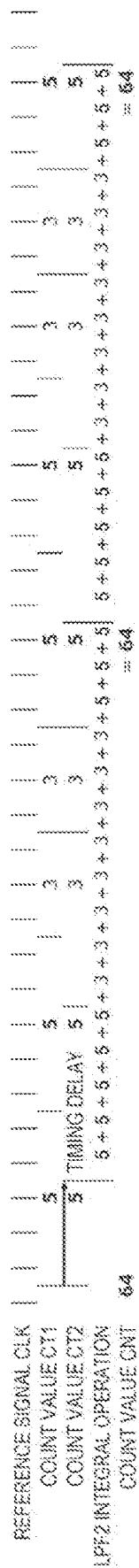
Figure 21D:

In FIGS. 21A to 21D, FIG. 21A is an example of the case where the period of the measured signal SIN is constant, and FIGS. 21B, 21C, and 21D are examples of the case where the measured signal SIN is frequency-modulated. In FIGS. 21B, 21C, and 21D, the output timings of the count values CT2 are different from each other. For the sake of simplicity, the period of the reference signal CLK and the period of the measured signal SIN are set to a simple integer ratio, and the count value CT1 is output as it is from the first low-pass filter 310 at a constant timing. The second low-pass filter 330 integrates the count values CT3 in which the count value CT2 is latched in synchronization with the reference signal CLK, and outputs the accumulated value for 16 times as the count value CNT.

In the example of FIG. 21A in FIGS. 21A to 21D, the count value CT2 is always 4, and the count value CNT is 4×16=64. In the example of FIG. 21B, the measured signal SIN is frequency-modulated, and the output timing of the count value CT2 is the same as the output timing of the count value CT1, and therefore the count value CT2 repeats 5, 5, 3, and 3. Since weighting is performed by time at the time of integration, the count value CNT is 5×10+3×6=68, which is larger than the count value CNT of FIG. 21A. In the example of FIG. 21C, the count value CT2 repeats 5, 5, 3, and 3, as in the example of FIG. 21B, but the case where the output timing of the count value CT2 is delayed from the output timing of the count value CT1 is illustrated. As a result of weighting by time at the time of integration, the count value CNT is 5×8+3×8=64, which is the same value as the count value CNT in FIG. 21A. In the example of FIG. 21D, the count value CT2 repeats 5, 5, 3, and 3, as in the examples of FIGS. 21B and 21C, but the case where the output timing of the count value CT2 is further delayed as compared with the example of FIG. 21C is illustrated. In the example of FIG. 21D, the count value CNT is 5×6+3× 10=60, which is smaller than the count value CNT of FIG. 21A.

From the consideration using FIGS. 21A to 21D, it can be qualitatively understood that the vibration rectification error due to the non-linearity of the input and the output of the frequency ratio measurement circuit 202 changes depending on the output timing of the count value CT2. By controlling the output timing of the count value CT2 so that the vibration rectification error due to the non-linearity of the input and the output of the frequency ratio measurement circuit 202 has the opposite phase to the vibration rectification error caused by the cantilever resonance, that is, by controlling the output timing of the count value CT1', it is possible to cancel each other's vibration rectification errors.

Figure 22:
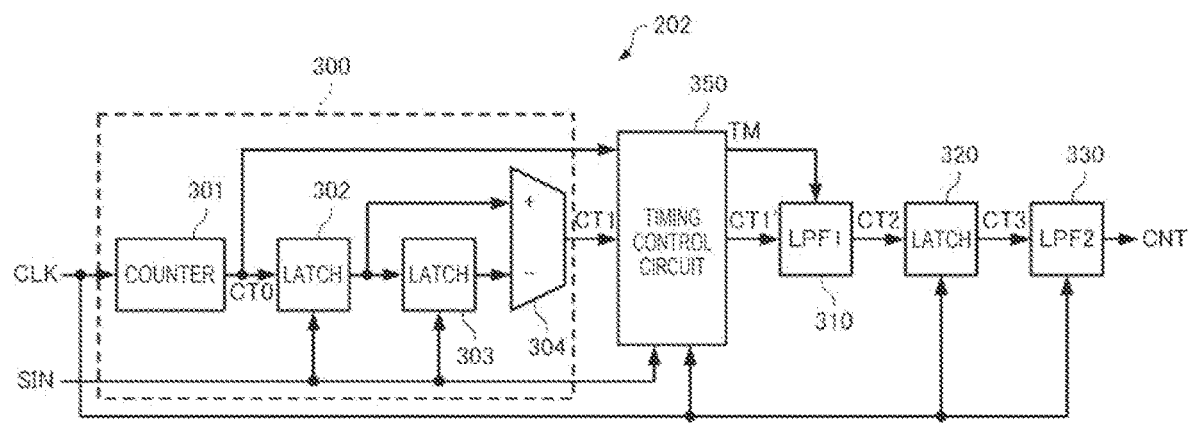
FIG. 22 is a diagram illustrating a configuration example of an improved frequency ratio measurement circuit.

FIG. 22 is a diagram illustrating a configuration example of the frequency ratio measurement circuit 202 improved so as to correct a vibration rectification error by controlling the output timing of the count value CT1'. In FIG. 22, the same components as in FIG. 18 are designated by the same reference numerals.

In the example of FIG. 22, the frequency ratio measurement circuit 202 includes the frequency delta-sigma modulation circuit 300, the first low-pass filter 310, the latch circuit 320, the second low-pass filter 330, and a timing control circuit 350.

Since the operation of the frequency delta-sigma modulation circuit 300 is the same as that in FIG. 13, the description thereof will be omitted.

The count value CT1 which is a delta-sigma modulated signal is input to the timing control circuit 350. The timing control circuit 350 generates a timing signal TM obtained by delaying the measured signal SIN based on the count value CT0 of the number of pulses of the reference signal CLK, and controls the timing of outputting the count value CT1, which is an input signal, as a count value CT1' in synchronization with the timing signal TM.

The first low-pass filter 310 receives the count value CT1' which is an output signal of the timing control circuit 350, and operates in synchronization with the timing signal TM. The first low-pass filter 310 outputs the count value CT2 from which the noise component included in the count value CT1' is removed or reduced.

Since the operations of the latch circuit 320 and the second low-pass filter 330 are the same as those in FIG. 13, the description thereof will be omitted.

Figure 23:
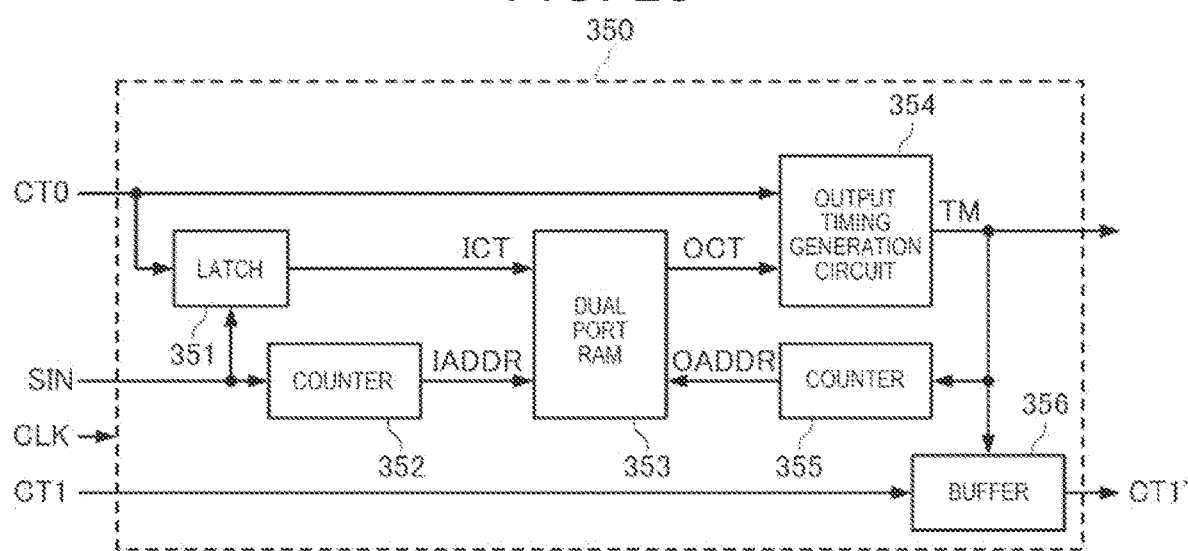
FIG. 23 is a diagram illustrating a configuration example of a timing circuit.

FIG. 23 is a diagram illustrating a configuration example of the timing control circuit 350. In the example of FIG. 23, the timing control circuit 350 includes a latch circuit 351, a counter 352, a dual port RAM 353, an output timing generation circuit 354, a counter 355, and a buffer circuit 356.

The latch circuit 351 latches the lower m-bit value of the count value CT0 of the number of pulses of the reference signal CLK in synchronization with the edge of the measured signal SIN, and holds the latched value as a count value ICT. m is an integer of 1 or more.

The counter 352 counts the edge of the measured signal SIN and outputs a count value IADDR.

The dual port RAM 353 writes the count value ICT to the address specified by the count value IADDR in synchronization with the rising edge of the reference signal CLK. Further, the dual port RAM 353 outputs the count value stored in the address specified by a count value OADDR as a count value OCT.

The output timing generation circuit 354 generates the timing signal TM whose logical level is inverted every time the value of the lower m-bit of the count value CT0 and the count value OCT match. For example, every time the value of the lower 3 bits of the count value CT0 and the count value OCT match, the logical level of the timing signal TM is inverted.

The counter 355 counts the edge of the timing signal TM and outputs the count value OADDR.

The buffer circuit 356 acquires and holds the count value CT1 in synchronization with the edge of the measured signal SIN, and outputs the oldest count value among the M count values held as the count value CT1' in synchronization with the edge of the timing signal TM. M is an integer of 2 or more. For example, the buffer circuit 356 may be an M-stage FIFO register.

The timing control circuit 350 configured in this way generates a timing signal TM obtained by delaying the measured signal SIN based on the count value CT0, and controls the timing of outputting the count value CT1 as the count value CT1' in synchronization with the timing signal TM. When the micro-control unit 210 sets the initial value of the count value OADDR and the initial value of the count value OADDR changes, the output timing of the count value CT1' changes.

Figure 24:
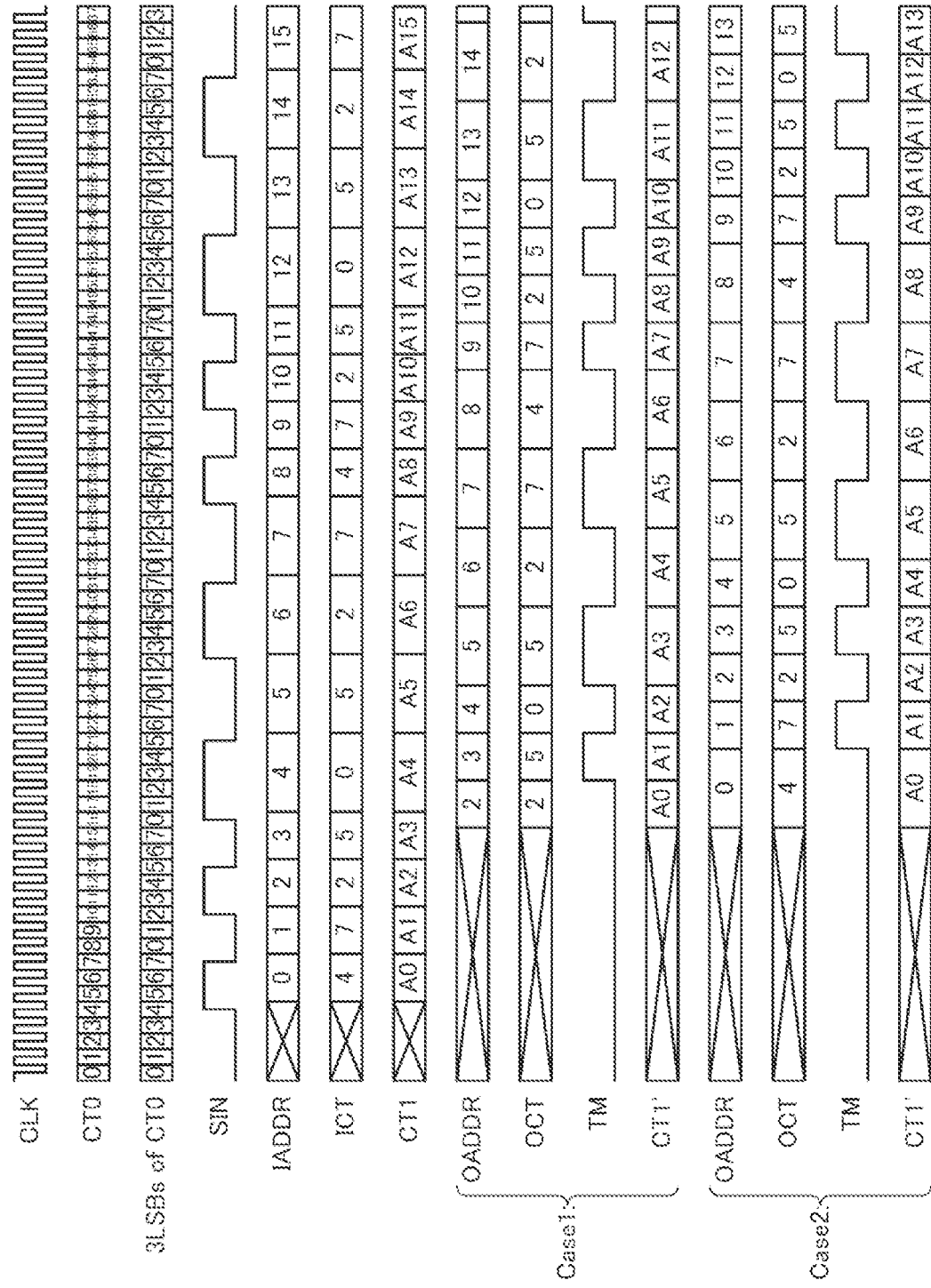
FIG. 24 is a timing chart of various signals during operation of the timing control circuit.

FIG. 24 illustrates an example of timing charts of various signals during operation of the timing control circuit 350. In the example of FIG. 24, the count value CT0 is counted up by 1 from the initial value of 0 in synchronization with the rising edge of the reference signal CLK. As a result, the lower 3 bits of the count value CT0 is repeatedly counted up from 0 to 7 and returns to 0. Further, the count value IADDR is counted up by 1 from the initial value of 0 in synchronization with both edges of the measured signal SIN. Further, the count value ICT changes to the value of the lower 3 bits of the count value CT0 in synchronization with both edges of the measured signal SIN. Further, the count value CT1 changes in synchronization with both edges of the measured signal SIN. Case 1 is the case where the initial value of the count value OADDR is 2, and Case 2 is the case where the initial value of the count value OADDR is 0.

The count value OADDR is initialized after a predetermined time has elapsed from the start of counting up of the count value IADDR. In the example of FIG. 24, the count value OADDR is initialized at the timing when the count value CT0 becomes 16. The count value OCT changes in synchronization with the count value OADDR, and the logical level of the timing signal TM is inverted every time the value of the lower 3 bits of the count value CT0 and the count value OCT match. The buffer circuit 356 is a four-stage FIFO register, which acquires and holds the count value CT1 in synchronization with the edge of the measured signal SIN, and outputs the count value CT1' in synchronization with the edge of the timing signal TM.

Comparing Case 1 and Case 2, since the output timing of the count value CT1' is different due to the difference in the timing at which the logical level of the timing signal TM is inverted, the vibration rectification error due to the non-linearity of the input and the output of the frequency ratio measurement circuit 202 is also different. Therefore, by setting the initial value of the count value OADDR, it is possible to correct so as to reduce the vibration rectification error finally generated by the cantilever resonance.

The initial value of the count value OADDR is information for controlling the delay amount of the timing signal TM obtained by delaying the measured signal SIN, and is stored in the storage unit 220. For example, in the manufacturing step of the sensor module 1, the inspection device acquires the vibration rectification error of the measurement value while sequentially changing the initial value of the count value OADDR via the interface circuit 230 to find the relationship between the initial value of the count value OADDR and the vibration rectification error. The inspection device calculates the initial value of the count value OADDR in which the vibration rectification error of the measurement value is reduced based on the relationship between the initial value of the count value OADDR and the vibration rectification error, and writes the calculated initial value of the count value OADDR to the non-volatile memory of the storage unit 220 via the interface circuit 230. As described above, the initial value of the count value OADDR is stored in the storage unit 220 of the vibration rectification error correction device 2 before the sensor module 1 starts the measurement. The initial value of the count value OADDR stored in the storage unit 220 is read out by the micro-control unit 210 and set in the counter 355 of the timing control circuit 350.

Figure 25:
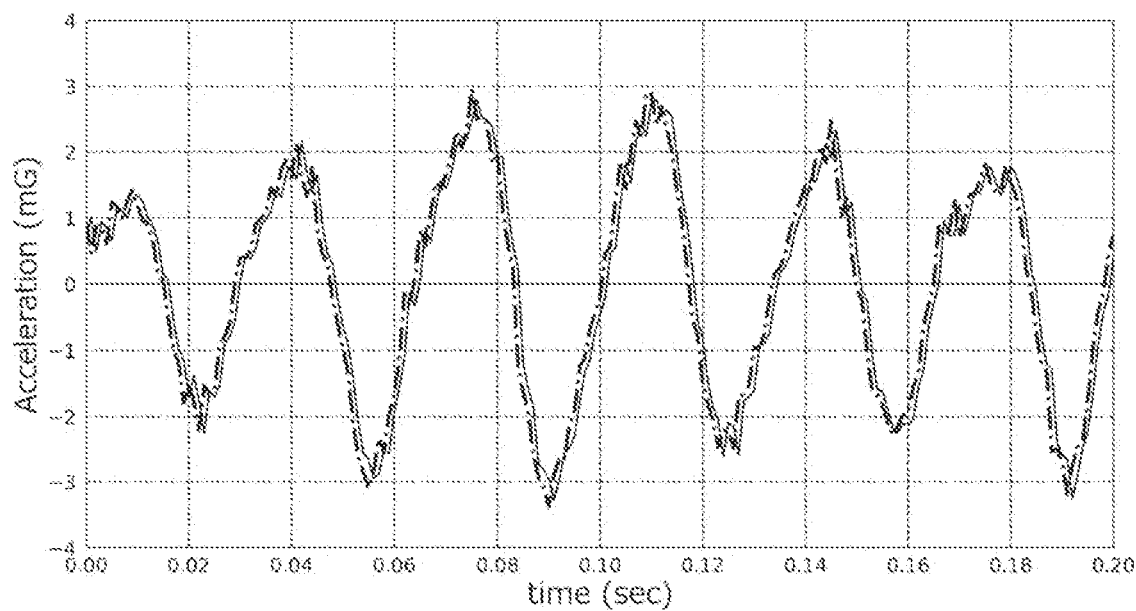
FIG. 25 is a diagram illustrating a measurement result by the frequency ratio measurement circuit having the configuration of FIG. 13.
Figure 26:
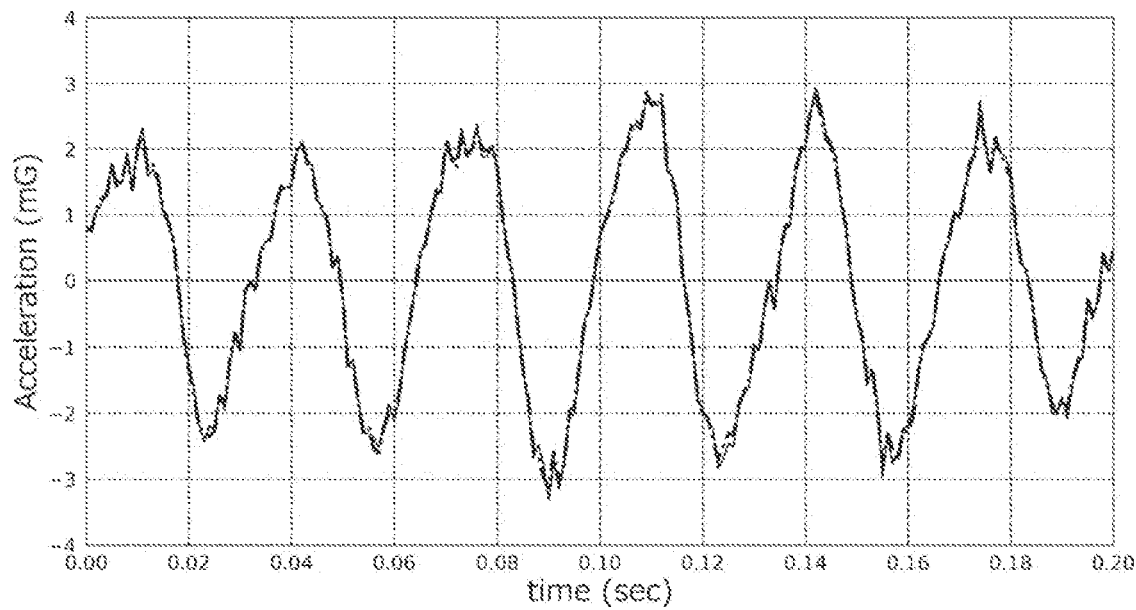
FIG. 26 is a diagram illustrating a measurement result by the frequency ratio measurement circuit having the configuration of FIG. 22.

Further, in the example of FIG. 24, the difference between the output timing of the count value CT1' of Case 1 and the output timing of the count value CT1' of Case 2 is the time less than one period of the measured signal SIN, and it can be seen that the group delay amount is fixed. FIG. 25 is a diagram plotting measurement values in the same environment in two cases in which the number of taps na is different in the frequency ratio measurement circuit 202 configured as illustrated in FIG. 13. On the other hand, FIG. 26 is a diagram plotting the measurement values in the same environment in two cases in which the initial values of the count values OADDR are different in the frequency ratio measurement circuit 202 configured as illustrated in FIG. 22. In FIGS. 25 and 26, the horizontal axis is time, and the vertical axis is acceleration. The solid line indicates the measurement result of one, and the alternate long and short dash line indicates the measurement result of the other. In FIG. 25, it can be confirmed that the group delay difference of about 1 ms occurs between the two measurement results, whereas in FIG. 26, the group delay difference of the two measurement results is less than or equal to the measurement error.

In the frequency ratio measurement circuit 202X having the configuration of FIG. 22, the frequency delta-sigma modulation circuit 300 is an example of the "first frequency delta-sigma modulation circuit", the count value CT1 which is an output signal of the frequency delta-sigma modulation circuit 300 is an example of the "first frequency delta-sigma modulated signal", and the timing control circuit 350 is an example of the "first timing control circuit". Further, in the frequency ratio measurement circuit 202X having the configuration of FIG. 22, the first low-pass filter 310 is an example of the "first filter", and the second low-pass filter 330 is an example of the "second filter". Further, in the frequency ratio measurement circuit 202X having the configuration of FIG. 22, the timing signal TM is an example of the "first timing signal". Further, the measured signal SIN_X is an example of the "first measured signal".

Further, in the frequency ratio measurement circuit 202Y having the configuration of FIG. 22, the frequency delta-sigma modulation circuit 300 is an example of the "second frequency delta-sigma modulation circuit", the count value CT1 which is an output signal of the frequency delta-sigma modulation circuit 300 is an example of the "second frequency delta-sigma modulated signal", and the timing control circuit 350 is an example of the "third timing control circuit". Further, in the frequency ratio measurement circuit 202Y having the configuration of FIG. 22, the first low-pass filter 310 is an example of the "fourth filter", and the second low-pass filter 330 is an example of the "fifth filter". Further, in the frequency ratio measurement circuit 202Y having the configuration of FIG. 22, the timing signal TM is an example of the "third timing signal". Further, the measured signal SIN_Y is an example of the "second measured signal".

In FIG. 22, in the frequency ratio measurement circuit 202, the first low-pass filter 310 is provided immediately after the timing control circuit 350, but the first low-pass filter 310 and the timing control circuit 350 may be provided on the signal path from the output of the frequency delta-sigma modulation circuit 300 to the input of the second low-pass filter 330.

Figure 27:
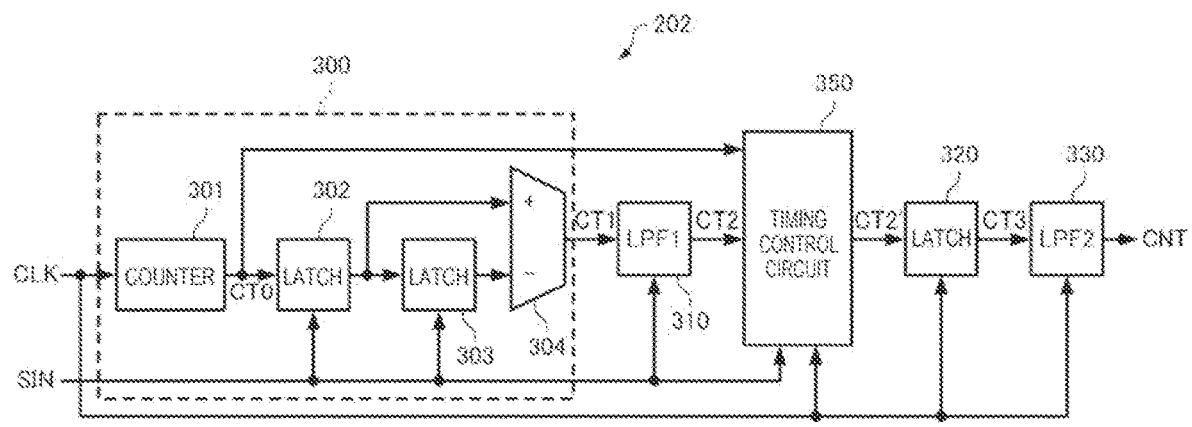
FIG. 27 is a diagram illustrating another configuration example of the improved frequency ratio measurement circuit.
Figure 28:
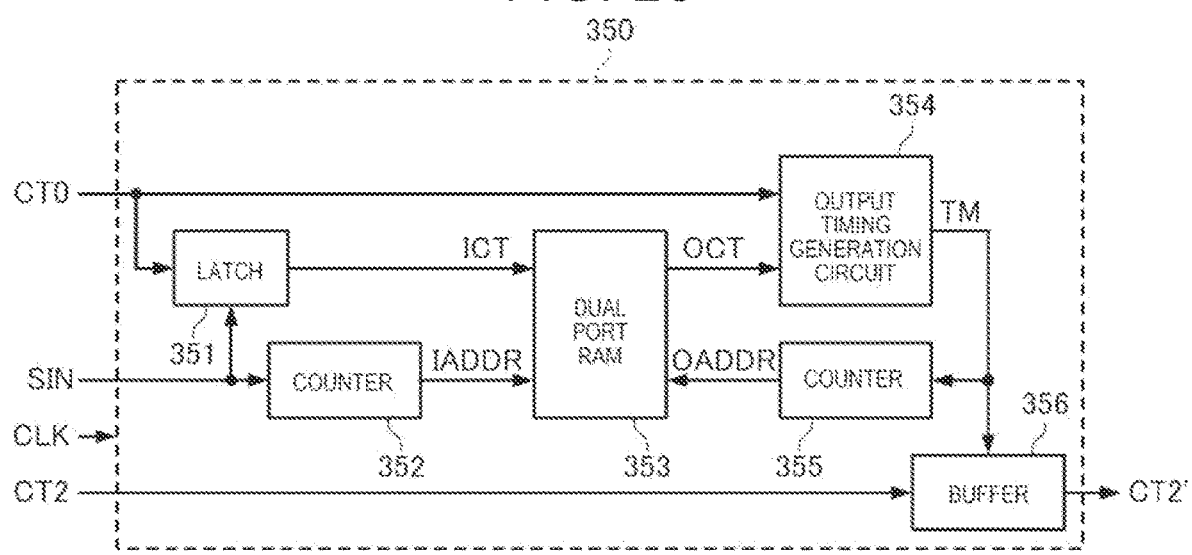
FIG. 28 is a diagram illustrating another configuration example of the timing control circuit.

For example, as illustrated in FIG. 27, in the frequency ratio measurement circuit 202, the timing control circuit 350 may be provided immediately after the first low-pass filter 310. FIG. 28 illustrates a configuration example of the timing control circuit 350 included in the frequency ratio measurement circuit 202 having the configuration of FIG. 27.

In the example of FIG. 27, since the operation of the frequency delta-sigma modulation circuit 300 is the same as that of FIG. 13, the description thereof will be omitted.

The first low-pass filter 310 receives the count value CT1 which is a frequency delta-sigma modulated signal output from the frequency delta-sigma modulation circuit 300, and operates in synchronization with the measured signal SIN. The first low-pass filter 310 outputs the count value CT2 from which the noise component included in the count value CT1 is removed or reduced.

The count value CT2, which is an output signal of the first low-pass filter 310, is input to the timing control circuit 350. The timing control circuit 350 generates a timing signal TM obtained by delaying the measured signal SIN based on the count value CT0 of the number of pulses of the reference signal CLK, and controls the timing of outputting the count value CT2, which is an input signal, as a count value CT2' in synchronization with the timing signal TM.

The latch circuit 320 latches the count value CT2' output from the timing control circuit 350 in synchronization with the rising edge of the reference signal CLK, and holds the latched value as the count value CT3.

Since the operations of the latch circuit 320 and the second low-pass filter 330 are the same as those in FIG. 13, the description thereof will be omitted.

Further, since the timing control circuit 350 illustrated in FIG. 28 is the same as the timing control circuit 350 illustrated in FIG. 23, except that the count value CT2 is input to the buffer circuit 356 and the count value CT2' is output, and the timing signal TM is not input to the first low-pass filter 310, the description thereof will be omitted.

In the frequency ratio measurement circuit 202X having the configuration of FIG. 27, the frequency delta-sigma modulation circuit 300 is an example of the "first frequency delta-sigma modulation circuit", and the timing control circuit 350 is an example of the "first timing control circuit". Further, in the frequency ratio measurement circuit 202X having the configuration of FIG. 27, the first low-pass filter 310 is an example of the "first filter", and the second low-pass filter 330 is an example of the "second filter". Further, in the frequency ratio measurement circuit 202X having the configuration of FIG. 27, the timing signal TM is an example of the "first timing signal".

Further, in the frequency ratio measurement circuit 202Y having the configuration of FIG. 27, the frequency delta-sigma modulation circuit 300 is an example of the "second frequency delta-sigma modulation circuit", and the timing control circuit 350 is an example of the "third timing control circuit". Further, in the frequency ratio measurement circuit 202Y having the configuration of FIG. 27, the first low-pass filter 310 is an example of the "fourth filter", and the second low-pass filter 330 is an example of the "fifth filter". Further, in the frequency ratio measurement circuit 202Y having the configuration of FIG. 27, the timing signal TM is an example of the "third timing signal".

1-6. Vibration Rectification Error Correction Method

Figure 29:
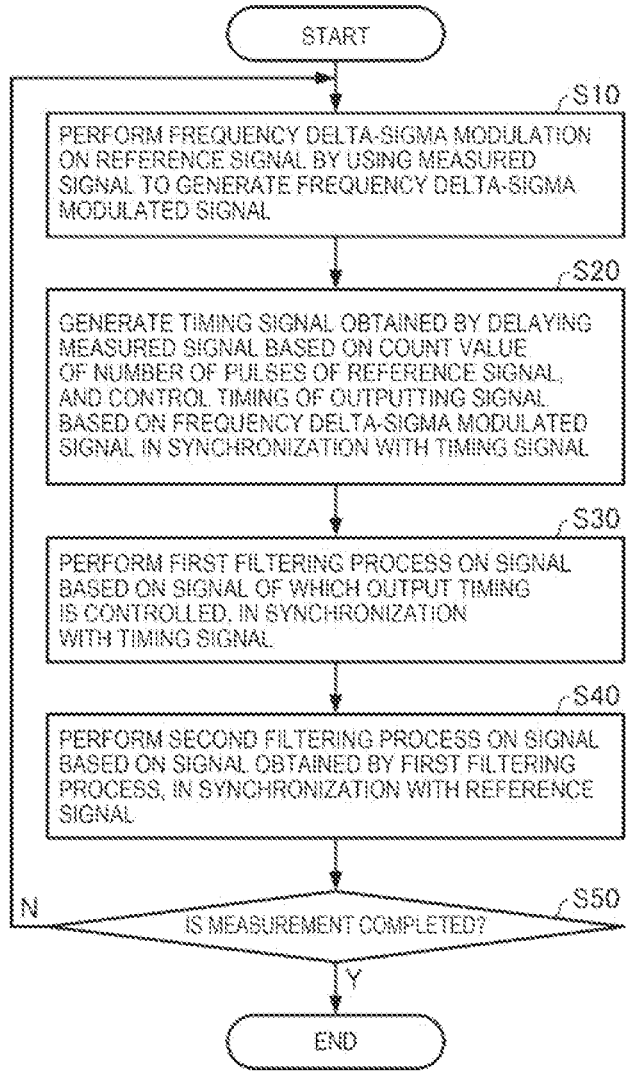
FIG. 29 is a flowchart illustrating an example of a procedure of a vibration rectification error correction method.

FIG. 29 is a flowchart illustrating an example of a procedure of the vibration rectification error correction method by the vibration rectification error correction device 2 including the frequency ratio measurement circuit 202 having the configuration of FIG. 22.

As illustrated in FIG. 29, first, in step S10, the vibration rectification error correction device 2 performs frequency delta-sigma modulation on the reference signal CLK by using the measured signal SIN to generate a frequency delta-sigma modulated signal.

Next, in step S20, the vibration rectification error correction device 2 generates the timing signal TM obtained by delaying the measured signal SIN based on the count value CT0 of the number of pulses of the reference signal CLK, and controls the timing of outputting the count value CT1', which is a signal based on the count value CT1 which is the frequency delta-sigma modulated signal generated in the step S10, in synchronization with the timing signal TM.

Next, in step S30, the vibration rectification error correction device 2 performs a first filtering process on the count value CT1' which is a signal based on the signal of which an output timing is controlled in the step S20, in synchronization with the timing signal TM.

Next, in step S40, the vibration rectification error correction device 2 performs a second filtering process on the count value CT3, which is a signal based on the count value CT2 which is a signal obtained by the first filtering process in step S30, in synchronization with the reference signal CLK.

In step S50, the vibration rectification error correction device 2 repeats steps S10, S20, S30, and S40 until the measurement is completed.

Figure 30:
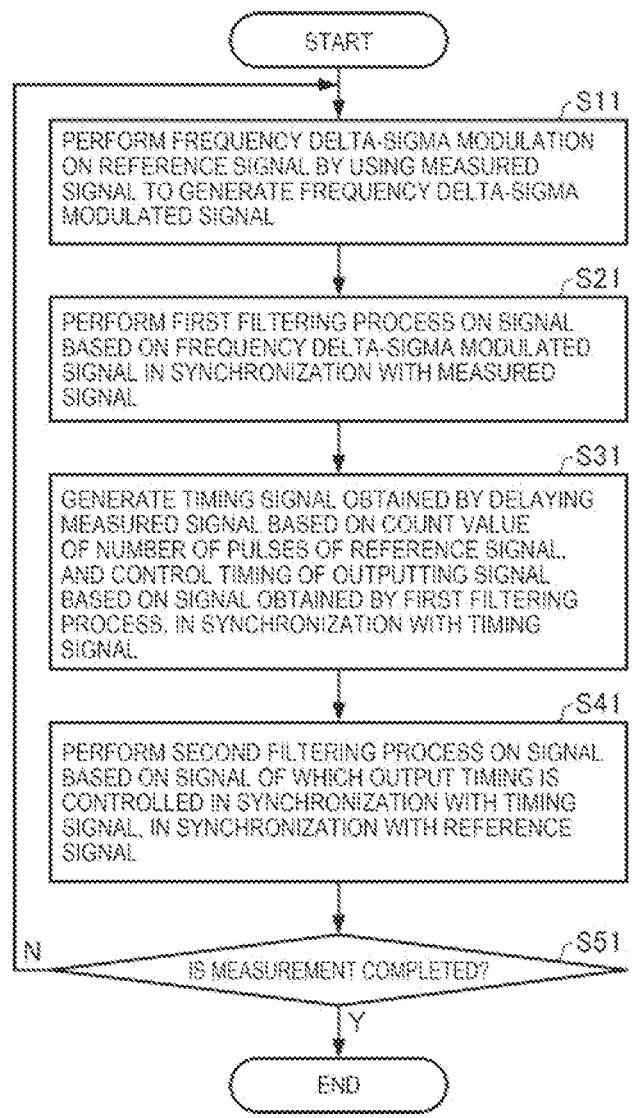
FIG. 30 is a flowchart illustrating another example of the procedure of the vibration rectification error correction method.

FIG. 30 is a flowchart illustrating an example of a procedure of the vibration rectification error correction method by the vibration rectification error correction device 2 including the frequency ratio measurement circuit 202 having the configuration of FIG. 27.

As illustrated in FIG. 30, first, in step S11, the vibration rectification error correction device 2 performs frequency delta-sigma modulation on the reference signal CLK by using the measured signal SIN to generate a frequency delta-sigma modulated signal.

Next, in step S21, the vibration rectification error correction device 2 performs the first filtering process on the count value CT1, which is a signal based on the frequency delta-sigma modulated signal generated in the step S11, in synchronization with the measured signal SIN.

Next, in step S31, the vibration rectification error correction device 2 generates the timing signal TM obtained by delaying the measured signal SIN based on the count value CT0 of the number of pulses of the reference signal CLK, and controls the timing of outputting the count value CT2', which is a signal based on the count value CT2 which is the signal obtained by the first filtering process in step S21, in synchronization with the timing signal TM.

Next, in step S41, the vibration rectification error correction device 2 performs the second filtering process on the count value CT3, which is a signal based on the count value CT2' which is a signal of which an output timing is controlled in synchronization with the timing signal TM in step S31, in synchronization with the reference signal CLK.

In step S51, the vibration rectification error correction device 2 repeats steps S11, S21, S31, and S41 until the measurement is completed.

1-7. Operational Effects

As described above, in the sensor module 1 of the first embodiment, in the vibration rectification error correction device 2, the frequency delta-sigma modulation circuit 300 performs frequency delta-sigma modulation on the reference signal CLK by using the measured signal SIN, the first low-pass filter 310 operates in synchronization with the timing signal TM or the measured signal SIN obtained by delaying the measured signal SIN, and the second low-pass filter 330 operates in synchronization with the reference signal CLK different from the measured signal SIN. Therefore, non-linearity occurs in the relationship between the frequency delta-sigma modulated signal and the output signal of the second low-pass filter 330, and the vibration rectification error caused by this non-linearity changes according to the delay amount of the timing signal TM. Therefore, by setting the delay amount of the timing signal TM to an appropriate value, the vibration rectification error caused by this non-linearity and the vibration rectification error caused by the asymmetry of the measured signal SIN cancel each other out, and the vibration rectification error included in the output signal of the second low-pass filter 330 is reduced. Further, in the vibration rectification error correction device 2, since the timing control circuit 350 does not control the delay amount of the signal based on the frequency delta-sigma modulated signal so as to correct the vibration rectification error, but controls the timing of outputting the signal based on the frequency delta-sigma modulated signal, the group delay amount of the signal path in which the measured signal SIN propagates to the output of the second low-pass filter 330 is constant. Therefore, according to the sensor module 1 of the first embodiment, the vibration rectification error correction device 2 can correct the vibration rectification error while fixing the group delay amount.

Further, according to the sensor module 1 of the first embodiment, in the vibration rectification error correction device 2, by storing the initial value of the count value OADDR, which is the information of the delay amount of the timing signal TM, in the non-volatile memory of the storage unit 220, it is possible to correct the vibration rectification error without receiving the information from the processing device 3.

Further, in the sensor module 1 of the first embodiment, in the vibration rectification error correction device 2, the group delay amount of the signal path in which the measured signal SIN_X propagates to the output of the second low-pass filter 330 of the frequency ratio measurement circuit 202X is constant, the group delay amount of the signal path in which the measured signal SIN_Y propagates to the output of the second low-pass filter 330 of the frequency ratio measurement circuit 202Y is constant, and the group delay amount of the signal path in which the measured signal SIN_Z propagates to the output of the second low-pass filter 330 of the frequency ratio measurement circuit 202Z is constant. Therefore, the time from when the measured signal SIN_X is input to the frequency ratio measurement circuit 202X to the time when the corresponding signal is output, the time from when the measured signal SIN_Y is input to the frequency ratio measurement circuit 202Y to the time when the corresponding signal is output, and the time from when the measured signal SIN_Z is input to the time when the frequency ratio measurement circuit 202Z to the time when the corresponding signal is output are substantially the same. Therefore, according to the sensor module 1 of the first embodiment, in the vibration rectification error correction device 2, since the vibration rectification error can be corrected while matching the timing of measurement of the measured signal SIN_X by the frequency ratio measurement circuit 202X, measurement of the measured signal SIN_Y by the frequency ratio measurement circuit 202Y, and measurement of the measured signal SIN_Z by the frequency ratio measurement circuit 202Z, the measurement accuracy and the accuracy of synchronous measurement are improved.

2. Second Embodiment

Hereinafter, regarding a sensor module of a second embodiment, the same components as those of the first embodiment are designated by the same reference numerals, the description overlapping with the first embodiment will be omitted or simplified, and the contents different from those of the first embodiment will be mainly described.

In the first embodiment, since the operation of the timing control circuit 350 is synchronized with the measured signal SIN, the correction resolution of the vibration rectification error is determined by the period of the measured signal SIN, and as the period of the measured signal SIN becomes longer, the correction resolution becomes lower. Therefore, there is a certain limit to the correction resolution of the vibration rectification error.

Figure 31:
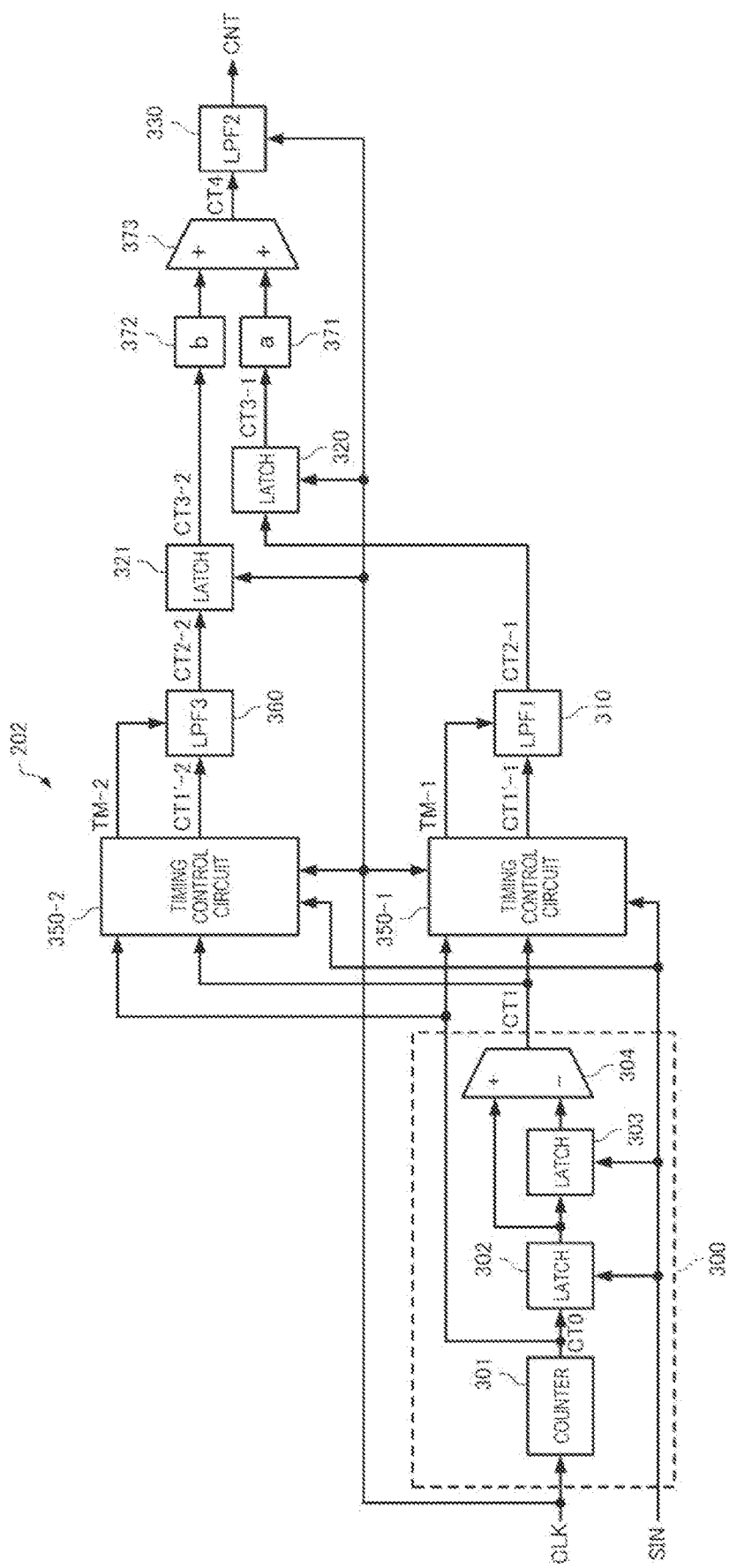
FIG. 31 is a diagram illustrating a configuration example of a frequency ratio measurement circuit in a second embodiment.

Therefore, in the present embodiment, the frequency ratio measurement circuit 202 is improved in order to improve the correction resolution of the vibration rectification error. FIG. 31 is a diagram illustrating a configuration example of the frequency ratio measurement circuit 202 included in the sensor module 1 of the second embodiment. In FIG. 31, the same components as in FIG. 22 are designated by the same reference numerals.

In the example of FIG. 31, the frequency ratio measurement circuit 202 includes the frequency delta-sigma modulation circuit 300, the first low-pass filter 310, the latch circuit 320, a latch circuit 321, the second low-pass filter 330, a first timing control circuit 350-1, a second timing control circuit 350-2, a third low-pass filter 360, a multiplier 371, a multiplier 372, and an adder 373.

Since the operation of the frequency delta-sigma modulation circuit 300 is the same as that in FIG. 22, the description thereof will be omitted.

The count value CT1 which is a delta-sigma modulated signal is input to the first timing control circuit 350-1. The first timing control circuit 350-1 generates a first timing signal TM-1 obtained by delaying the measured signal SIN based on the count value CT0 of the number of pulses of the reference signal CLK, and controls the timing of outputting the count value CT1, which is an input signal, as a count value CT1'-1 in synchronization with the first timing signal TM-1. Since the configuration of the first timing control circuit 350-1 is the same as the configuration of the timing control 350 illustrated in FIG. 23, the illustration and description thereof will be omitted.

The first low-pass filter 310 receives the count value CT1'-1 which is an output signal of the first timing control circuit 350-1, and operates in synchronization with the first timing signal TM-1. The first low-pass filter 310 outputs the count value CT2-1 from which the noise component included in the count value CT1'-1 is removed or reduced.

The latch circuit 320 latches a count value CT2-1 output from the first low-pass filter 310 in synchronization with the rising edge of the reference signal CLK, and holds the latched value as a count value CT3-1.

The count value CT1 which is a delta-sigma modulated signal is input to the second timing control circuit 350-2. The second timing control circuit 350-2 generates the second timing signal TM-2 obtained by delaying the measured signal SIN based on the count value CT0 of the number of pulses of the reference signal CLK, and controls the timing of outputting the count value CT1, which is an input signal, as a count value CT1'-2 in synchronization with the second timing signal TM-2. Since the configuration of the second timing control circuit 350-2 is the same as the configuration of the timing control circuit 350 illustrated in FIG. 23, the illustration and description thereof will be omitted.

The third low-pass filter 360 receives the count value CT1'-2, which is an output signal of the second timing control circuit 350-2, and operates in synchronization with the second timing signal TM-2. The third low-pass filter 360 outputs the count value CT2-2 from which the noise component included in the count value CT1'-2 is removed or reduced. Since the configuration of the third low-pass filter 360 is the same as the configuration of the first low-pass filter 310 illustrated in FIG. 19, the illustration and description thereof will be omitted.

The latch circuit 321 latches a count value CT2-2 output from the third low-pass filter 360 in synchronization with the rising edge of the reference signal CLK, and holds the latched value as a count value CT3-2.

The multiplier 371 outputs a count value obtained by multiplying the count value CT3-1 held by the latch circuit 320 by a. a is a predetermined positive real number. The count value output from the multiplier 371 is a first signal based on the output signal of the first low-pass filter 310.

The multiplier 372 outputs a count value obtained by multiplying the count value CT3-2 held by the latch circuit 321 by b. b is a predetermined positive real number. The count value output from the multiplier 372 is a second signal based on the output signal of the third low-pass filter 360.

The adder 373 outputs a count value CT4 obtained by adding a count value output from the multiplier 371, which is the first signal, and a count value output from the multiplier 372, which is the second signal. The count value CT4 output from the adder 373 is a third signal based on the first signal and the second signal.

The count value CT4 output from the adder 373, which is a third signal, is input to the second low-pass filter 330. The second low-pass filter 330 operates in synchronization with the reference signal CLK, and outputs a count value which is a fourth signal from which the noise component included in the count value CT4 is removed or reduced. The count value output from the second low-pass filter 330 is output to the micro-control unit 210 as the count value CNT.

Here, the timing at which the count value CT1'-1 is output from the first timing control circuit 350-1 and the timing at which the count value CT1'-2 is output from the second timing control circuit 350-2 are controlled at appropriate timings so that the first vibration rectification error included in the fifth signal output from the second low-pass filter 330 when the count value output from the multiplier 371, which is the first signal, is input to the second low-pass filter 330, and the second vibration rectification error included in the sixth signal output from the second low-pass filter 330 when the count value output from the multiplier 372, which is the second signal, is input to the second low-pass filter 330, have different polarities. Therefore, due to the addition of the first signal and the second signal in the adder 373, the first vibration rectification error and the second vibration rectification error cancel each other out, and the vibration rectification error included in the count value CNT which is the fourth signal is reduced. That is, the frequency ratio measurement circuit 202 having the configuration of FIG. 31 improves the correction resolution of the vibration rectification error.

Figure 32:
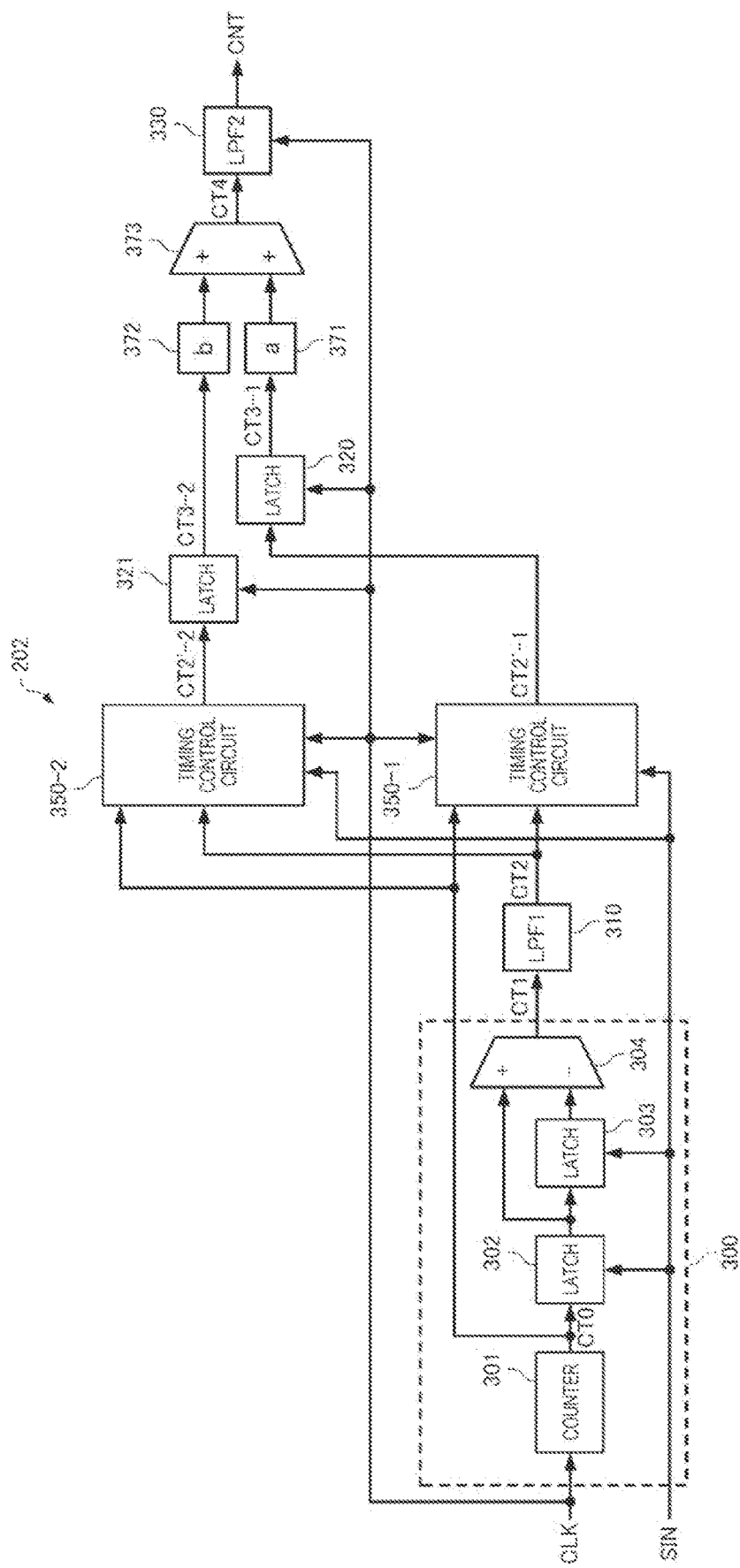
FIG. 32 is a diagram illustrating another configuration example of the frequency ratio measurement circuit in the second embodiment.

FIG. 32 is a diagram illustrating another configuration example of the frequency ratio measurement circuit 202 included in the sensor module 1 of the second embodiment. In FIG. 32, the same components as in FIG. 31 are designated by the same reference numerals.

In the example of FIG. 32, the frequency ratio measurement circuit 202 includes the frequency delta-sigma modulation circuit 300, the first low-pass filter 310, the latch circuit 320, the latch circuit 321, the second low-pass filter 330, the first timing control circuit 350-1, the second timing control circuit 350-2, the multiplier 371, the multiplier 372, and the adder 373.

Since the operations of the frequency delta-sigma modulation circuit 300 and the first low-pass filter 310 are the same as those in FIG. 27, the description thereof will be omitted.

The count value CT2, which is an output signal of the first low-pass filter 310, is input to the first timing control circuit 350-1. The first timing control circuit 350-1 generates the first timing signal TM-1 obtained by delaying the measured signal SIN based on the count value CT0 of the number of pulses of the reference signal CLK, and controls the timing of outputting the count value CT2, which is an input signal, as a count value CT2'-1 in synchronization with the first timing signal TM-1 (not illustrated). Since the configuration of the first timing control circuit 350-1 is the same as the configuration of the timing control circuit 350 illustrated in FIG. 28, the illustration and description thereof will be omitted. The first timing signal TM-1 corresponds to the timing signal TM in FIG. 28.

The latch circuit 320 latches a count value CT2'-1 output from the first low-pass filter 310 in synchronization with the rising edge of the reference signal CLK, and holds the latched value as a count value CT3-1.

The count value CT2, which is an output signal of the first low-pass filter 310, is input to the second timing control circuit 350-2. The second timing control circuit 350-2 generates a second timing signal TM-2 (not illustrated) obtained by delaying the measured signal SIN based on the count value CT0 of the number of pulses of the reference signal CLK, and controls the timing of outputting the count value CT2, which is an input signal, as a count value CT2'-2 in synchronization with the second timing signal TM-2. Since the configuration of the second timing control circuit 350-2 is the same as the configuration of the timing control circuit 350 illustrated in FIG. 28, the illustration and description thereof will be omitted. The second timing signal TM-2 corresponds to the timing signal TM in FIG. 28.

The latch circuit 321 latches the count value CT2'-2 output from the third low-pass filter 360 in synchronization with the rising edge of the reference signal CLK, and holds the latched value as a count value CT3-2.

Since the operations of the multiplier 371, the multiplier 372, the adder 373, and the second low-pass filter 330 are the same as those in FIG. 31, the description thereof will be omitted.

Here, the timing at which the count value CT2'-1 is output from the first timing control circuit 350-1 and the timing at which the count value CT2'-2 is output from the second timing control circuit 350-2 are controlled at appropriate timings so that the first vibration rectification error included in the fifth signal output from the second low-pass filter 330 when the count value output from the multiplier 371, which is the first signal, is input to the second low-pass filter 330, and the second vibration rectification error included in the sixth signal output from the second low-pass filter 330 when the count value output from the multiplier 372, which is the second signal, is input to the second low-pass filter 330, have different polarities. Therefore, due to the addition of the first signal and the second signal in the adder 373, the first vibration rectification error and the second vibration rectification error cancel each other out, and the vibration rectification error included in the count value CNT which is the fourth signal is reduced. That is, the frequency ratio measurement circuit 202 having the configuration of FIG. 32 improves the correction resolution of the vibration rectification error.

In FIGS. 31 and 32, the frequency delta-sigma modulation circuit 300 is an example of the "first frequency delta-sigma modulation circuit", the first timing control circuit 350-1 is an example of the "first timing control circuit", and the second timing control circuit 350-2 is an example of the "second timing control circuit". The first timing signal TM-1 is an example of the "first timing signal", and the second timing signal TM-2 is an example of the "second timing signal". The first low-pass filter 310 is an example of the "first filter", and the second low-pass filter 330 is an example of the "second filter".

For example, in the manufacturing step of the sensor module 1, the inspection device acquires the vibration rectification error of the measurement value while keeping the initial value of the count value OADDR in the first timing control circuit 350-1 and the initial value of the count value OADDR in the second timing control circuit 350-2 at the same value and sequentially changing the initial values via the interface circuit 230 to find the relationship between the initial value of the count value OADDR and the vibration rectification error. The inspection device calculates the initial value of the count value OADDR in the first timing control circuit 350-1 and the initial value of the count value OADDR in the second timing control circuit 350-2 in which the vibration rectification error of the measurement value is reduced, based on the relationship between the initial value of the count value OADDR and the vibration rectification error, and writes the calculated initial values of the count values OADDR to the non-volatile memory of the storage unit 220 via the interface circuit 230. As described above, the initial value of the count value OADDR in the first timing control circuit 350-1 and the initial value of the count value OADDR in the second timing control circuit 350-2 are stored in the storage unit 220 of the vibration rectification error correction device 2 before the sensor module 1 starts measurement. The initial values of these count values OADDR stored in the storage unit 220 are read out by the micro-control unit 210, and are set in the counter 355 of the first timing control circuit 350-1 and the counter 355 of the second timing control circuit 350-2, respectively.

Figure 33:
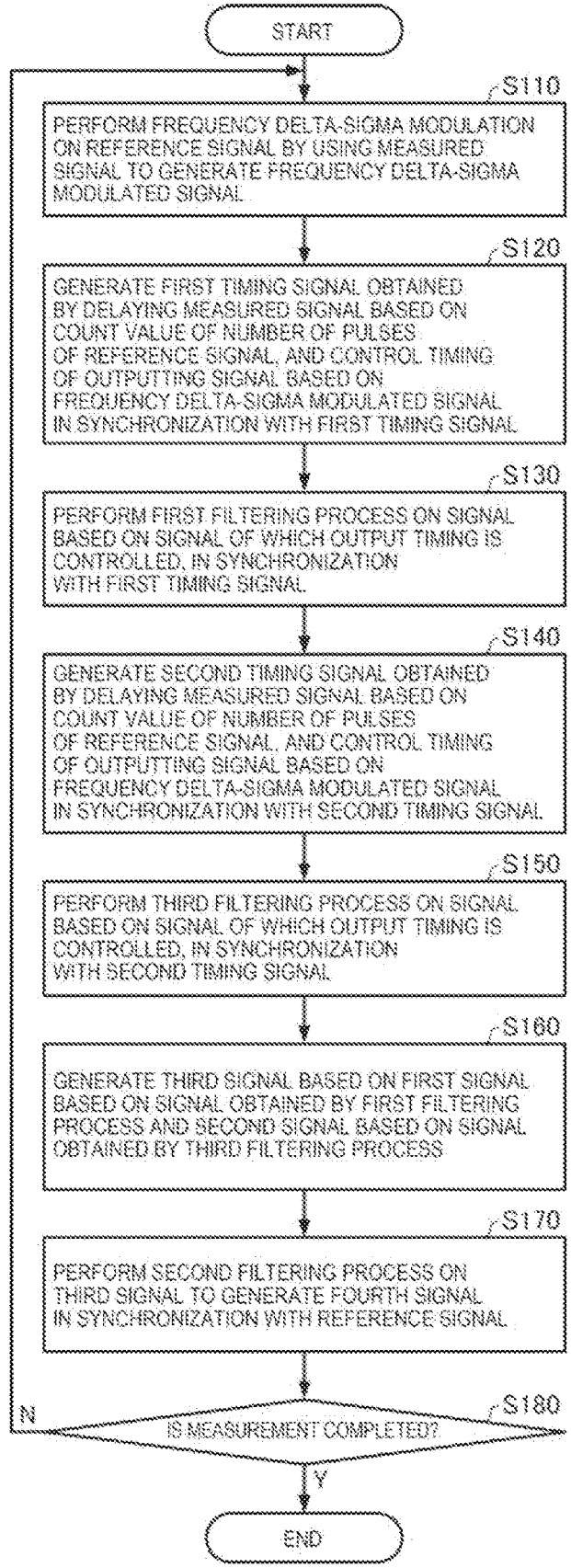
FIG. 33 is a flowchart illustrating an example of a procedure of a vibration rectification error correction method in the second embodiment.

FIG. 33 is a flowchart illustrating an example of a procedure of the vibration rectification error correction method by the vibration rectification error correction device 2 including the frequency ratio measurement circuit 202 having the configuration of FIG. 31.

As illustrated in FIG. 33, first, in step S110, the vibration rectification error correction device 2 performs frequency delta-sigma modulation on the reference signal CLK by using the measured signal SIN to generate a frequency delta-sigma modulated signal.

Next, in step S120, the vibration rectification error correction device 2 generates the first timing signal TM-1 obtained by delaying the measured signal SIN based on the count value CT0 of the number of pulses of the reference signal CLK, and controls the timing of outputting the count value CT1'-1, which is a signal based on the count value CT1 which is the frequency delta-sigma modulated signal generated in the step S110, in synchronization with the first timing signal TM-1.

Next, in step S130, the vibration rectification error correction device 2 performs the first filtering process on the count value CT1'-1 which is a signal based on the signal of which an output timing is controlled in the step S120, in synchronization with the first timing signal TM-1.

Next, in step S140, the vibration rectification error correction device 2 generates the second timing signal TM-2 obtained by delaying the measured signal SIN based on the count value CT0 of the number of pulses of the reference signal CLK, and controls the timing of outputting the count value CT1'-2, which is a signal based on the count value CT1 which is the frequency delta-sigma modulated signal generated in the step S110, in synchronization with the second timing signal TM-2.

Next, in step S150, the vibration rectification error correction device 2 performs a third filtering process on the count value CT1'-2 which is a signal based on the signal of which an output timing is controlled in the step S140, in synchronization with the second timing signal TM-2.

Next, in step S160, the vibration rectification error correction device 2 generates the count value CT4 which is the third signal based on the first signal based on the count value CT2-1, which is the signal obtained by the first filtering process of the step S130 and the second signal based on the count value CT2-2, which is a signal obtained by the third filtering process in step S150.

Next, in step S170, the vibration rectification error correction device 2 performs the second filtering process on the count value CT4, which is the third signal generated in step S160, in synchronization with the reference signal CLK to generate the count value CNT, which is the fourth signal.

In step S180, the vibration rectification error correction device 2 repeats steps S110, S120, S130, S140, S150, S160, and S170 until the measurement is completed.

Figure 34:
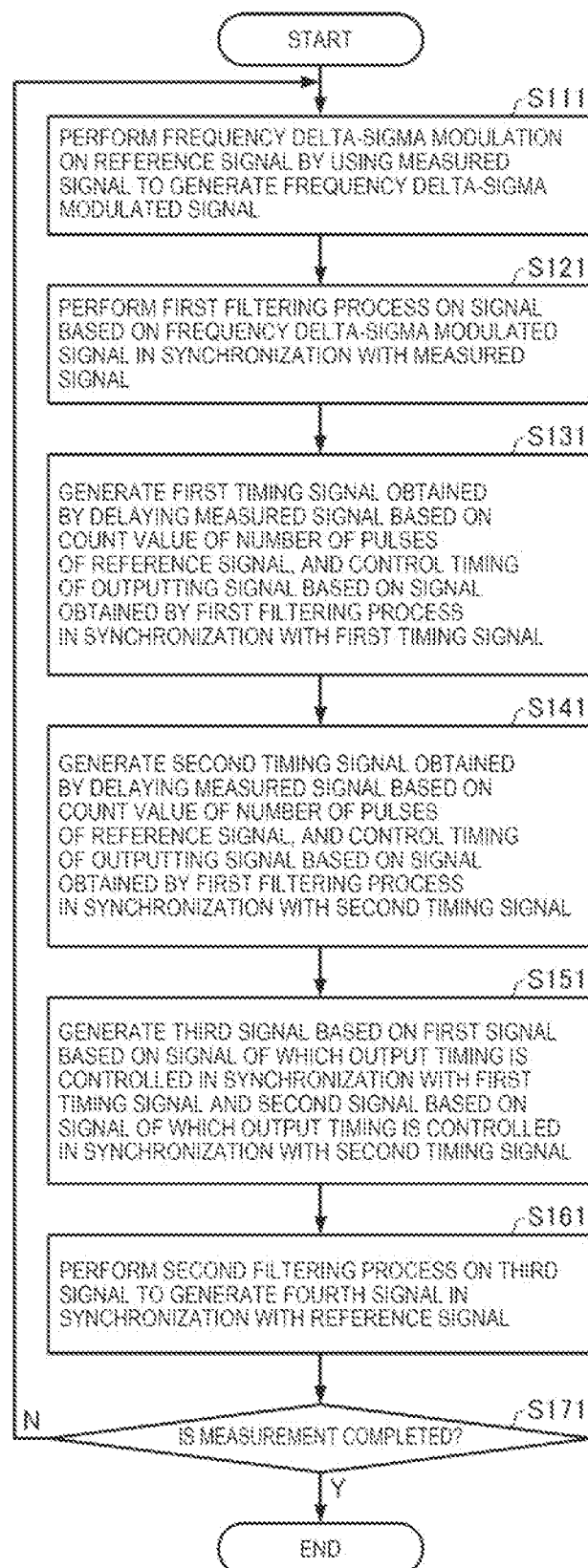
FIG. 34 is a flowchart illustrating another example of the procedure of the vibration rectification error correction method in the second embodiment.

FIG. 34 is a flowchart illustrating an example of a procedure of the vibration rectification error correction method by the vibration rectification error correction device 2 including the frequency ratio measurement circuit 202 having the configuration of FIG. 32.

As illustrated in FIG. 34, first, in step S111, the vibration rectification error correction device 2 performs frequency delta-sigma modulation on the reference signal CLK by using the measured signal SIN to generate a frequency delta-sigma modulated signal.

Next, in step S121, the vibration rectification error correction device 2 performs the first filtering process on the count value CT1, which is a signal based on the frequency delta-sigma modulated signal generated in the step S111, in synchronization with the measured signal SIN.

Next, in step S131, the vibration rectification error correction device 2 generates the first timing signal TM-1 obtained by delaying the measured signal SIN based on the count value CT0 of the number of pulses of the reference signal CLK, and controls the timing of outputting the count value CT2'-1, which is a signal based on the count value CT2 which is the signal obtained by the first filtering process in step S121, in synchronization with the first timing signal TM-1.

Next, in step S141, the vibration rectification error correction device 2 generates the second timing signal TM-2 obtained by delaying the measured signal SIN based on the count value CT0 of the number of pulses of the reference signal CLK, and controls the timing of outputting the count value CT2'-2, which is a signal based on the count value CT2 which is the signal obtained by the first filtering process in step S121, in synchronization with the second timing signal TM-2.

Next, in step S151, the vibration rectification error correction device 2 generates the count value CT4 which is the third signal based on the first signal based on the count value CT2'-1, which is a signal of which an output timing is controlled in synchronization with the first timing signal TM-1 in step S131 and the second signal based on the count value CT2'-2, which is a signal of which an output timing is controlled in synchronization with the second timing signal TM-2 in step S141.

Next, in step S161, the vibration rectification error correction device 2 performs the second filtering process on the count value CT4, which is the third signal generated in step S151, in synchronization with the reference signal CLK to generate the count value CNT, which is the fourth signal.

In step S171, the vibration rectification error correction device 2 repeats steps S111, S121, S131, S141, S151, and S161 until the measurement is completed.

According to the sensor module 1 of the second embodiment described above, the same effect as that of the sensor module 1 of the first embodiment is obtained.

Further, in the sensor module 1 of the second embodiment, in the vibration rectification error correction device 2, non-linearity occurs in the relationship between the frequency delta-sigma modulated signal and the fifth signal and the sixth signal. By making the delay amount of the first timing signal TM-1 different from the delay amount of the second timing signal TM-2, the non-linearity of the relationship between the frequency delta-sigma modulated signal and the fifth signal and the non-linearity of the relationship between the frequency delta-sigma modulated signal and the sixth signal are different to some degree. Therefore, according to the sensor module 1 of the second embodiment, in the vibration rectification error correction device 2, because the correction resolution of vibration rectification error is improved by using the first signal and the second signal in which the delay amount of the first timing signal TM-1 and the delay amount of the second timing signal TM-2 are set to appropriate values so that the first vibration rectification error included in the fifth signal and the second vibration rectification error included in the sixth signal have different polarities, the vibration rectification error included in the fourth signal can be effectively reduced. As a result, the vibration rectification error of the measurement value can be effectively reduced, and the measurement accuracy of the physical quantity is improved.

3. Third Embodiment

Hereinafter, regarding a sensor module of a third embodiment, the same components as those of the first embodiment or the second embodiment are designated by the same reference numerals, the description overlapping with the first embodiment or the second embodiment is omitted or simplified, and the contents different from the first embodiment and the second embodiment will be mainly described.

Figure 35:
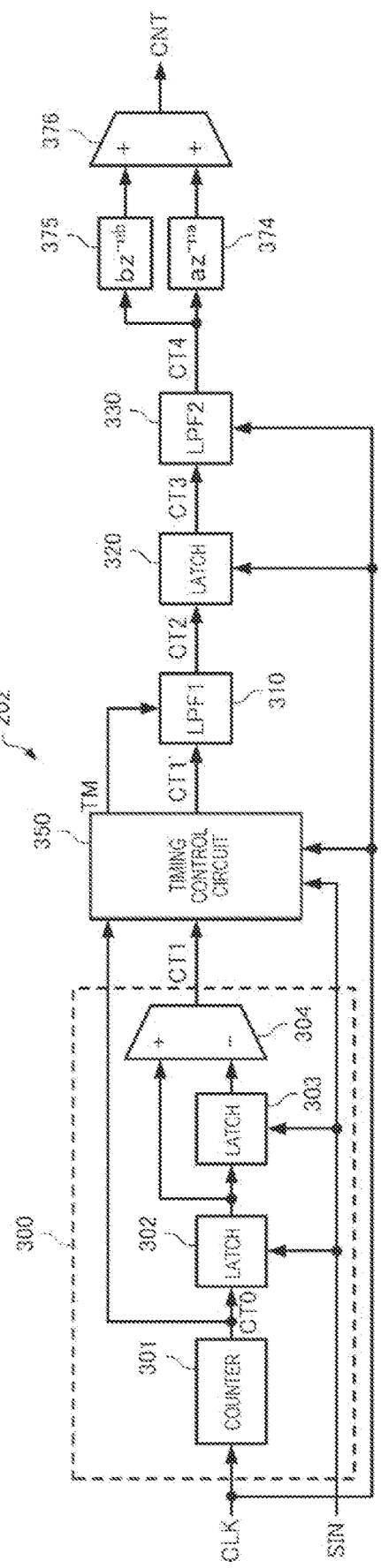
FIG. 35 is a diagram illustrating a configuration example of a frequency ratio measurement circuit in a third embodiment.

FIG. 35 is a diagram illustrating a configuration example of the frequency ratio measurement circuit 202 included in the sensor module 1 of the third embodiment. In FIG. 35, the same components as in FIG. 22 are designated by the same reference numerals.

In the example of FIG. 35, the frequency ratio measurement circuit 202 includes the frequency delta-sigma modulation circuit 300, the first low-pass filter 310, the latch circuit 320, the second low-pass filter 330, the timing control circuit 350, a delay element 374, a delay element 375, and an adder 376.

Since the operations of the frequency delta-sigma modulation circuit 300, the timing control circuit 350, the first low-pass filter 310, the latch circuit 320, and the second low-pass filter 330 are the same as those in FIG. 22, the description thereof will be omitted.

The delay element 374 outputs a count value delayed by multiplying the count value CT4, which is an output signal of the second low-pass filter 330, by a in synchronization with the reference signal CLK. The number of taps of the delay element 374 is na. a is a positive real number. For example, the delay element 374 is realized by a multiplier and a shift register in which na registers are serially coupled. The count value output from the delay element 374 is the first signal having a first group delay amount based on the output signal of the second filter.

The delay element 375 outputs a count value delayed by multiplying the count value CT4, which is an output signal of the second low-pass filter 330, by b in synchronization with the reference signal CLK. b is a positive real number. The number of taps of the delay element 375 is nb. For example, the delay element 375 is realized by a multiplier and a shift register in which nb registers are serially coupled. The count value output from the delay element 375 is the second signal having a second group delay amount different from the first group delay amount based on the output signal of the second filter.

The adder 376 outputs a count value obtained by adding the count value output from the delay element 374, which is the first signal, and the count value output from the delay element 375, which is the second signal. The count value CT4 output from the adder 373 is a third signal based on the first signal and the second signal. The count value output from the adder 373 is output to the micro-control unit 210 as the count value CNT.

Here, the first group delay amount and the second group delay amount are set to appropriate values so that the first vibration rectification error included in the count value output from the delay element 374, which is the first signal and the second vibration rectification error included in the count value output from the delay element 375, which is the second signal have the different polarities. Therefore, due to the addition of the first signal and the second signal in the adder 376, the first vibration rectification error and the second vibration rectification error cancel each other out, and the vibration rectification error included in the count value CNT which is the third signal is reduced. That is, the frequency ratio measurement circuit 202 having the configuration of FIG. 35 improves the correction resolution of the vibration rectification error.

In FIG. 35, in the frequency ratio measurement circuit 202, the first low-pass filter 310 is provided immediately after the timing control circuit 350, but the first low-pass filter 310 and the timing control circuit 350 may be provided on the signal path from the output of the frequency delta-sigma modulation circuit 300 to the input of the second low-pass filter 330.

Figure 36:
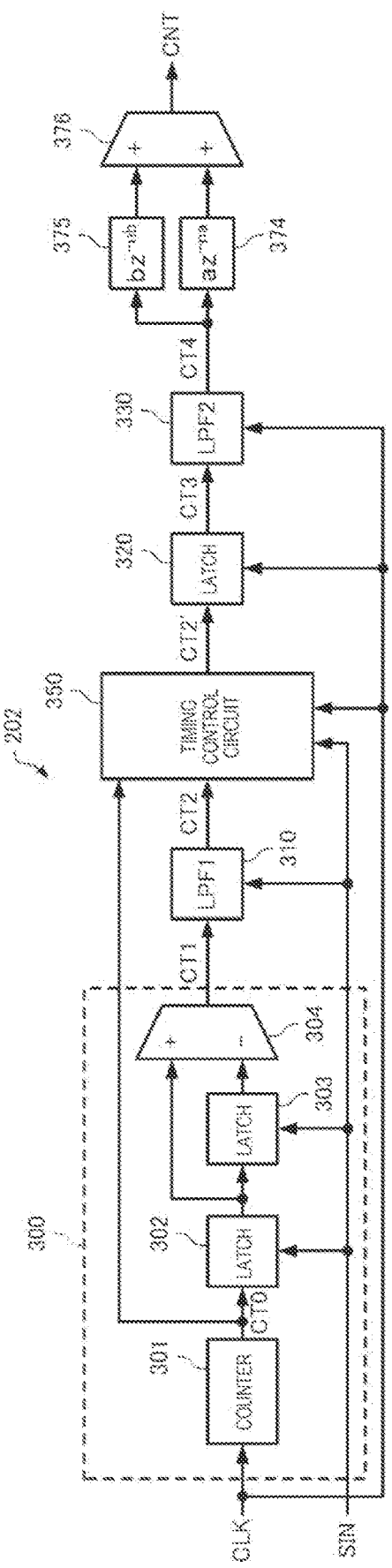
FIG. 36 is a diagram illustrating another configuration example of the frequency ratio measurement circuit in the third embodiment.

For example, as illustrated in FIG. 36, in the frequency ratio measurement circuit 202, the timing control circuit 350 may be provided immediately after the first low-pass filter 310. In the example of FIG. 36, since the operations of the frequency delta-sigma modulation circuit 300, the first low-pass filter 310, the timing control circuit 350, the latch circuit 320, and the second low-pass filter 330 are the same as those in FIG. 27, the description thereof will be omitted.

Further, since the operations of the delay element 374, the delay element 375, and the adder 376 are the same as those in FIG. 35, the description thereof will be omitted.

In FIGS. 35 and 36, the frequency delta-sigma modulation circuit 300 is an example of the "first frequency delta-sigma modulation circuit", and the timing control circuit 350 is an example of the "first timing control circuit". Further, the timing signal TM is an example of the "first timing signal". The first low-pass filter 310 is an example of the "first filter", and the second low-pass filter 330 is an example of the "second filter".

For example, in the manufacturing step of the sensor module 1, the inspection device acquires the vibration rectification error of the measurement value while sequentially changing the initial value of the count value OADDR via the interface circuit 230 to find the relationship between the initial value of the count value OADDR and the vibration rectification error. The inspection device calculates the initial value of the count value OADDR in which the vibration rectification error of the measurement value is reduced based on the relationship between the initial value of the count value OADDR and the vibration rectification error. Further, with the initial value of the count value OADDR set to the calculated value, the inspection device sets the initial value of the count value OADDR to the calculated value via the interface circuit 230, and acquires the vibration rectification error of the measurement value while keeping the numbers of taps na and nb at the same value and sequentially changing na and nb to find the relationship between the number of taps and the vibration rectification error. The inspection device calculates the numbers of taps na and nb and real numbers a and b in which the vibration rectification error of the measurement value is reduced, based on the relationship between the number of taps and the vibration rectification error. The inspection device writes the calculated initial value of the count value OADDR, the numbers of taps na and nb, and the real numbers a and b to the non-volatile memory of the storage unit 220 via the interface circuit 230. As described above, the initial value of the count value OADDR, the numbers of taps na and nb, and the real numbers a and b are stored in the storage unit 220 of the vibration rectification error correction device 2 before the sensor module 1 starts the measurement. The initial value of the count value OADDR stored in the storage unit 220 is read out by the micro-control unit 210 and set in the counter 355 of the timing control circuit 350. Further, the numbers of taps na and nb and the real numbers a and b stored in the storage unit 220 are read out by the micro-control unit 210 and set in the delay elements 374 and 375.

Figure 37:
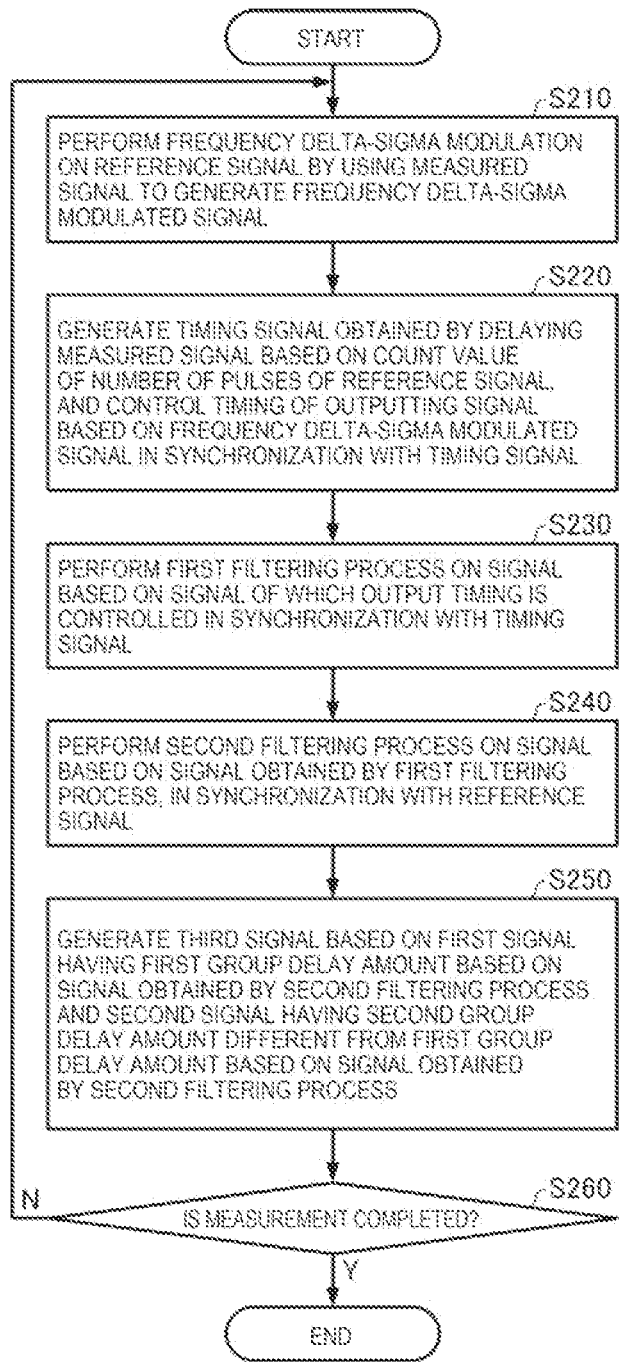
FIG. 37 is a flowchart illustrating an example of a procedure of a vibration rectification error correction method in the third embodiment.

FIG. 37 is a flowchart illustrating an example of a procedure of the vibration rectification error correction method by the vibration rectification error correction device 2 including the frequency ratio measurement circuit 202 having the configuration of FIG. 35.

As illustrated in FIG. 37, first, in step S210, the vibration rectification error correction device 2 performs frequency delta-sigma modulation on the reference signal CLK by using the measured signal SIN to generate a frequency delta-sigma modulated signal.

Next, in step S220, the vibration rectification error correction device 2 generates the timing signal TM obtained by delaying the measured signal SIN based on the count value CT0 of the number of pulses of the reference signal CLK, and controls the timing of outputting the count value CT1', which is a signal based on the count value CT1 which is the frequency delta-sigma modulated signal generated in the step S210, in synchronization with the timing signal TM.

Next, in step S230, the vibration rectification error correction device 2 performs the first filtering process on the count value CT1' which is a signal based on the signal of which an output timing is controlled in the step S220, in synchronization with the timing signal TM.

Next, in step S240, the vibration rectification error correction device 2 performs the second filtering process on the count value CT3, which is a signal based on the count value CT2 which is a signal obtained by the first filtering process in step S230, in synchronization with the reference signal CLK.

Next, in step S250, the vibration rectification error correction device 2 generates the count value CNT which is the third signal based on the first signal having the first group delay amount based on the count value CT4, which is a signal obtained by the second filtering process of step S240 and the second signal having a second group delay amount different from the first group delay amount based on the count value CT4, which is a signal obtained by the second filtering process in step S240.

In step S260, the vibration rectification error correction device 2 repeats steps S210, S220, S230, S240, and S250 until the measurement is completed.

Figure 38:
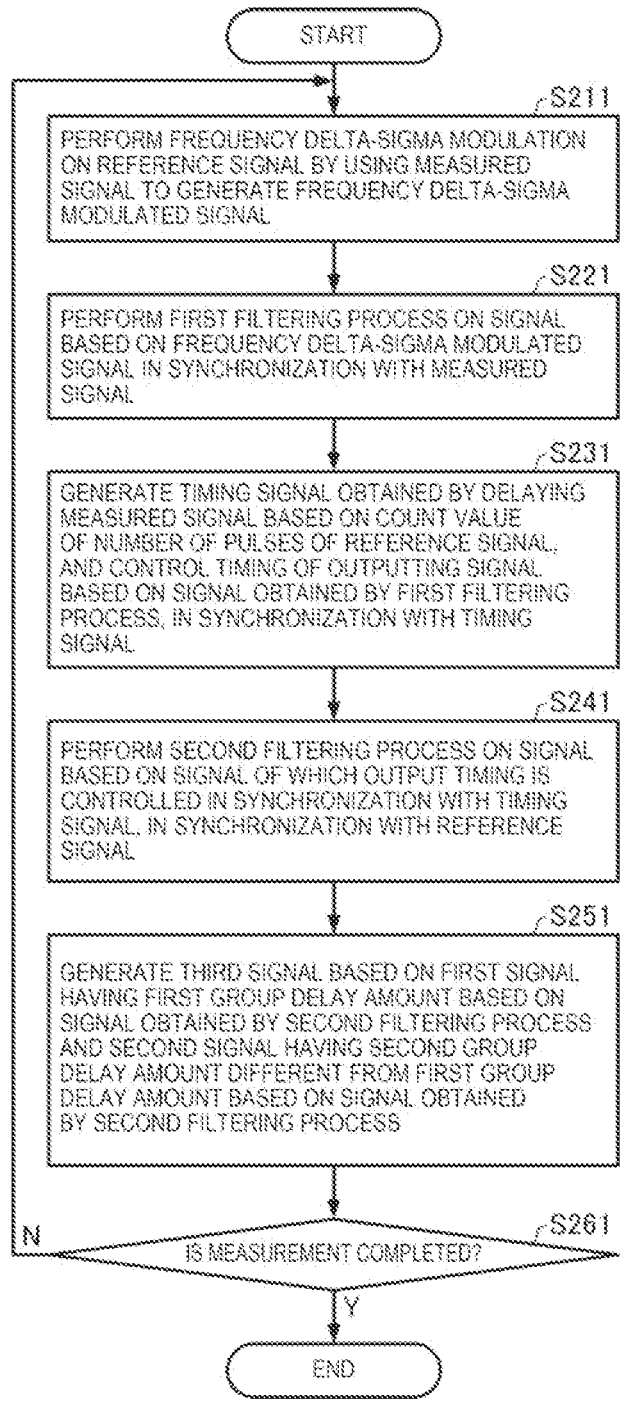
FIG. 38 is a flowchart illustrating another example of the procedure of the vibration rectification error correction method in the third embodiment.

FIG. 38 is a flowchart illustrating an example of a procedure of the vibration rectification error correction method by the vibration rectification error correction device 2 including the frequency ratio measurement circuit 202 having the configuration of FIG. 36.

As illustrated in FIG. 38, first, in step S211, the vibration rectification error correction device 2 performs frequency delta-sigma modulation on the reference signal CLK by using the measured signal SIN to generate a frequency delta-sigma modulated signal.

Next, in step S221, the vibration rectification error correction device 2 performs the first filtering process on the count value CT1, which is a signal based on the frequency delta-sigma modulated signal generated in the step S211, in synchronization with the measured signal SIN.

Next, in step S231, the vibration rectification error correction device 2 generates the timing signal TM obtained by delaying the measured signal SIN based on the count value CT0 of the number of pulses of the reference signal CLK, and controls the timing of outputting the count value CT2', which is a signal based on the count value CT2 which is the signal obtained by the first filtering process in step S221, in synchronization with the timing signal TM.

Next, in step S241, the vibration rectification error correction device 2 performs the second filtering process on the count value CT3, which is a signal based on the count value CT2' which is a signal of which an output timing is controlled in synchronization with the timing signal TM in step S231, in synchronization with the reference signal CLK.

Next, in step S251, the vibration rectification error correction device 2 generates the count value CNT which is the third signal based on the first signal having the first group delay amount based on the count value CT4, which is a signal obtained by the second filtering process of step S241 and the second signal having a second group delay amount different from the first group delay amount based on the count value CT4, which is a signal obtained by the second filtering process in step S241.

In step S261, the vibration rectification error correction device 2 repeats steps S211, S221, S231, S241, and S251 until the measurement is completed.

According to the sensor module 1 of the third embodiment described above, the same effect as that of the sensor module 1 of the first embodiment is obtained.

Further, in the sensor module 1 of the third embodiment, in the vibration rectification error correction device 2, non-linearity occurs in the relationship between the frequency delta-sigma modulated signal and the first signal and the second signal. Due to the difference between the first group delay amount of the first signal and the second group delay amount of the second signal, the non-linearity of the relationship between the frequency delta-sigma modulated signal and the first signal and the non-linearity of the relationship between the frequency delta-sigma modulated signal and the second signal are different to some degree. Therefore, according to the sensor module 1 of the third embodiment, in the vibration rectification error correction device 2, because the correction resolution of the vibration rectification error is improved by using the first signal and the second signal in which the first group delay amount and the second group delay amount are set to appropriate values so that the first vibration rectification error included in the first signal and the second vibration rectification error included in the second signal have different polarities, the vibration rectification error included in the count value CNT which is the third signal can be effectively reduced. As a result, the vibration rectification error of the measurement value can be effectively reduced, and the measurement accuracy of the physical quantity is improved.

4. Fourth Embodiment

Hereinafter, regarding a sensor module of a fourth embodiment, the same components as those of the first embodiment, the second embodiment, or the third embodiment are designated by the same reference numerals, the description overlapping with the first embodiment, the second embodiment, or the third embodiment is omitted or simplified, and the contents different from the first embodiment, the second embodiment and the third embodiment will be mainly described.

Since the sensitivity of the physical quantity sensor 200 is strongly correlated with the cantilever resonance frequency, it is possible to check the abnormal sensitivity of the physical quantity sensor 200 by measuring the cantilever resonance frequency. For example, if the weight fixed to the cantilever is missing for some reason, the mass of the cantilever decreases and the cantilever resonance frequency is shifted to a high frequency. At the same time, the sensitivity of the physical quantity sensor 200 decreases, and the sensitivity of the physical quantity sensor 200 becomes abnormal. Further, when the cantilever is damaged by a strong impact or the like, the sensitivity of the physical quantity sensor 200 becomes abnormal and the cantilever resonance frequency is also shifted. Therefore, identifying the cantilever resonance frequency is one method for determining whether or not the sensitivity of the physical quantity sensor 200 is within the specifications. Generally, FFT can be used to identify the resonance frequency, but since the cantilever resonance frequency is higher than the signal bandwidth to be measured, and the resonance frequency component is attenuated by the first low-pass filter 310 and the second low-pass filter 330, some ingenuity is required n order to identify the resonance frequency with high accuracy. As described with reference to FIGS. 21A to 21D, the vibration rectification error changes at regular periods with respect to changes in the timing at which the count value is output from the timing control circuit 350. This period is determined by the cantilever resonance frequency and the frequency of the physical quantity detection element 40, and when the cantilever resonance frequency or the frequency of the physical quantity detection element 40 changes, the fluctuation period of the vibration rectification error also changes. Therefore, by measuring the period of the change in the vibration rectification error with respect to the change in the output timing of the count value from the timing control circuit 350, it is possible to obtain a determination index as to whether or not the sensitivity of the physical quantity sensor 200 is within the specifications.

Since the structure and functional configuration of the sensor module 1 of the fourth embodiment are the same as those of the first embodiment, the second embodiment, or the third embodiment, the illustration and description thereof will be omitted.

In the sensor module 1 of the fourth embodiment, the vibration rectification error correction device 2 has a normal operation mode for measuring the frequency ratio of the measured signal SIN and the reference signal CLK described above, and an inspection mode for checking the sensitivity of the physical quantity sensor 200. When the micro-control unit 210 receives a predetermined command from the processing device 3 via the interface circuit 230, the vibration rectification error correction device 2 is set to the normal operation mode or the inspection mode. For example, in the manufacturing step of the sensor module 1, the inspection device may set the vibration rectification error correction device 2 to the inspection mode, and the vibration rectification error correction device 2 may check the sensitivity of the physical quantity sensor 200. The inspection device may select non-defective products of the sensor module 1 based on the result of the sensitivity check. Alternatively, after the sensor module 1 is installed and before operation, the processing device 3 sets the vibration rectification error correction device 2 to the inspection mode, and the vibration rectification error correction device 2 checks the sensitivity of the physical quantity sensor 200. If there is no abnormality in the sensitivity of the physical quantity sensor 200 based on the result of the sensitivity check, the processing device 3 sets the vibration rectification error correction device 2 to the normal operation mode and operates the sensor module 1. In the normal operation mode, as in the first embodiment, the second embodiment, or the third embodiment, the measurement value in which the vibration rectification error is corrected can be obtained. Further, the processing device 3 may periodically set the vibration rectification error correction device 2 to the inspection mode, and the vibration rectification error correction device 2 may perform a sensitivity check. The normal operation mode is an example of a "first operation mode", and the inspection mode is an example of a "second operation mode".

In the inspection mode, the physical quantity sensor 200 is operated in a stable vibration environment, the micro-control unit 210 functions as a control circuit, and while changing the output timing of the count value from the timing control circuit 350, the output timing dependence of the vibration rectification error is acquired based on the output signal of the physical quantity sensor 200. Therefore, first, the micro-control unit 210 sets the cutoff frequency of the second low-pass filter 330 to be lower than that in the normal operation mode. Specifically, the micro-control unit 210 sets the cutoff frequency of the second low-pass filter 330 to, for example, several Hz so that the vibration rectification error included in the output value of the second low-pass filter 330 is emphasized. For example, the micro-control unit 210 may set the cutoff frequency to be lower than that in the normal operation mode by increasing the number of taps of the second low-pass filter 330.

Further, the micro-control unit 210 acquires the vibration rectification error of the measurement value while sequentially changing the initial value of the count value OADDR with respect to the timing control circuit 350 having the configuration illustrated in FIG. 23 or FIG. 28, and stores the initial value of the count value OADDR and the vibration rectification error in the storage unit 220 in association with each other.

The processing device 3 reads out the correspondence information between the initial value of the count value OADDR and the vibration rectification error from the storage unit 220 via the interface circuit 230, and calculates the period in which the vibration rectification error changes from a graph plotting the relationship between the initial value of the count value OADDR and the vibration rectification error, similar to the graph plotting the relationship between the number of taps and the vibration rectification error as illustrated in FIG. 17. Since this period is determined by the cantilever resonance frequency and the frequency of the physical quantity detection element 40, the processing device 3 can back-calculate the cantilever resonance frequency. The processing device 3 can determine whether or not the sensitivity of the physical quantity sensor 200 is within the specifications based on the calculated cantilever resonance frequency.

Alternatively, the micro-control unit 210 may read out the correspondence information between the initial value of the count value OADDR and the vibration rectification error from the storage unit 220, and calculate the cantilever resonance frequency based on the graph plotting the relationship between the initial value of the count value OADDR and the vibration rectification error to determine whether or not the sensitivity of the physical quantity sensor 200 is within the specifications.

Figure 39:
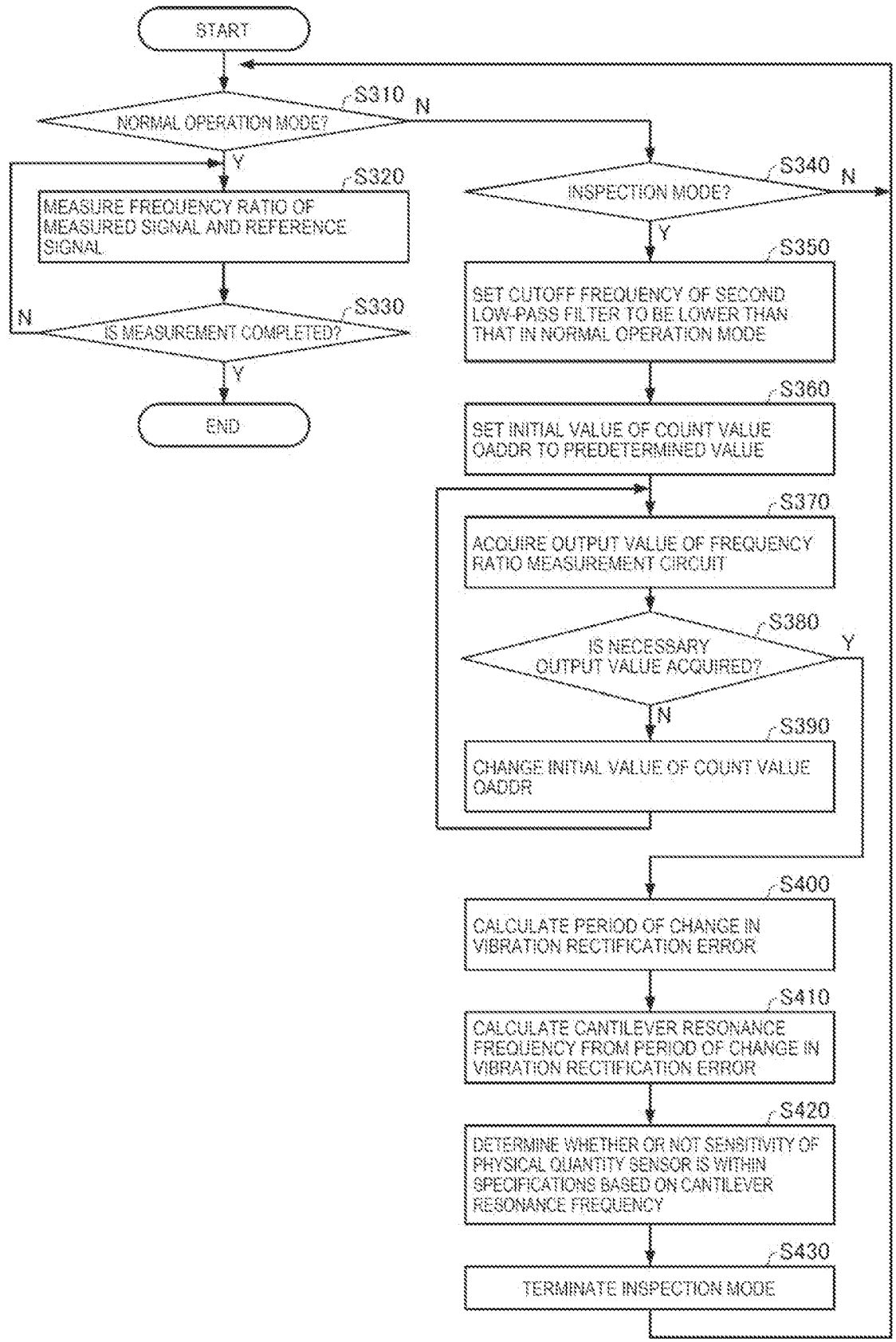
FIG. 39 is a flowchart illustrating an example of a procedure of a vibration rectification error correction method in a fourth embodiment.

FIG. 39 is a flowchart illustrating an example of a procedure of the vibration rectification error correction method by the vibration rectification error correction device 2 of the fourth embodiment.

As illustrated in FIG. 39, first, when the normal operation mode is set in step S310, in step S320, the vibration rectification error correction device 2 measures the frequency ratio of the measured signal SIN and the reference signal CLK. Specifically, the vibration rectification error correction device 2 including the frequency ratio measurement circuit 202 having the configuration of FIG. 22 performs steps S10, S20, S30, and S40 of FIG. 29. Further, the vibration rectification error correction device 2 including the frequency ratio measurement circuit 202 having the configuration of FIG. 27 performs steps S11, S21, S31, and S41 of FIG. 30. Further, the vibration rectification error correction device 2 including the frequency ratio measurement circuit 202 having the configuration of FIG. 31 performs steps S110, S120, S130, S140, S150, S160, and S170 of FIG. 33. Further, the vibration rectification error correction device 2 including the frequency ratio measurement circuit 202 having the configuration of FIG. 32 performs steps S111, S121, S131, S141, S151, and S161 of FIG. 34. Further, the vibration rectification error correction device 2 including the frequency ratio measurement circuit 202 having the configuration of FIG. 35 performs steps S210, S220, S230, S240, and S250 of FIG. 37. Further, the vibration rectification error correction device 2 including the frequency ratio measurement circuit 202 having the configuration of FIG. 36 performs steps S211, S221, S231, S241, and S251 of FIG. 38.

In step S330, the vibration rectification error correction device 2 repeats step S320 until the measurement is completed.

When the normal operation mode is not set in step S310 and the inspection mode is set in step S340, in step S350, the vibration rectification error correction device 2 sets the cutoff frequency of the second low-pass filter 330 to be lower than that in the normal operation mode.

Next, in step S360, the vibration rectification error correction device 2 sets the initial value of the count value OADDR to a predetermined value.

Next, in step S370, the vibration rectification error correction device 2 acquires the count value CNT which is an output value of the frequency ratio measurement circuit 202.

Next, in step S380, the vibration rectification error correction device 2 determines whether or not all the output values of the frequency ratio measurement circuit 202 necessary for the sensitivity determination have been acquired.

When the acquisition of the required output value is not completed, in step S390, the vibration rectification error correction device 2 changes the initial value of the count value OADDR.

When the acquisition of the required output value is completed, in the step S400, the processing device 3 or the vibration rectification error correction device 2 calculates the period of change in the vibration rectification error by using the output value of the frequency ratio measurement circuit 202 acquired in step S370.

Next, in step S410, the processing device 3 or the vibration rectification error correction device 2 calculates the cantilever resonance frequency from the period of change in the vibration rectification error.

Next, in step S420, the processing device 3 or the vibration rectification error correction device 2 determines whether or not the sensitivity of the physical quantity sensor 200 is within the specifications based on the cantilever resonance frequency.

In step S430, the inspection mode of the vibration rectification error correction device 2 is terminated, and steps S310 and subsequent steps are repeated.

According to the sensor module 1 of the fourth embodiment described above, similar to the sensor module 1 of the first embodiment, the second embodiment or the third embodiment, in the vibration rectification error correction device 2, the measurement value in which the vibration rectification error is reduced can be obtained in the normal operation mode.

On the other hand, in the inspection mode, by setting the cutoff frequency of the second low-pass filter 330 to be lower than that in the normal operation mode, the vibration rectification error included in the signal output from the second low-pass filter 330 is emphasized. Therefore, according to the sensor module 1 of the third embodiment, in the inspection mode, the vibration rectification error correction 2 obtains information indicating the relationship between the delay amount of the timing signal TM and the vibration rectification error or information indicating the relationship between the delay amount of the first timing signal TM-1 and the delay amount of the second timing signal TM-2 and the vibration rectification error. The vibration rectification error correction device 2, the inspection device or the processing device 3 calculates the cantilever resonance frequency of the physical quantity sensor 200 by using this information, and can determine whether or not the sensitivity of the physical quantity sensor 200 is within the specifications based on the cantilever resonance frequency.

5. Modification Example

The present disclosure is not limited to the present embodiment, and various modifications can be made within the scope of the gist of the present disclosure.

For example, in each of the above embodiments, the sensor module 1 includes three physical quantity sensors 200, but the number of the physical quantity sensors 200 included in the sensor module 1 may be one, two, or four or more.

In addition, in each of the above embodiments, as the physical quantity sensor 200, the sensor module 1 provided with an acceleration sensor is described as an example, but the sensor module 1 may include sensors such as an angular velocity sensor, a pressure sensor, and an optical sensor as the physical quantity sensor 200. In addition, the sensor module 1 may be provided with two or more types of physical quantity sensors among various physical quantity sensors such as an acceleration sensor, an angular velocity sensor, a pressure sensor, and an optical sensor.

In addition, in each of the above embodiments, an element configured by using quartz crystal as the physical quantity detection element 40 included in the physical quantity sensor 200 is given as an example, but the physical quantity detection element 40 may be configured by using a piezoelectric element other than quartz crystal, or may be a capacitance type MEMS element. MEMS is an abbreviation for micro electro mechanical systems.

Further, in each of the above embodiments, the first low-pass filter 310 is described as an example as the first filter, the second low-pass filter 330 is described as an example as the second filter, and the third low-pass filter 360 is described as an example as the third filter, but the first filter, the second filter and the third filter may be a high-pass filter, a band-pass filter or a smoothing filter. Similarly, the first filtering process, the second filtering process, and the third filtering process may be a high-pass filtering process, a band-pass filtering process, or a smoothing filtering process, in addition to the low-pass filtering process.

The present disclosure is not limited to the present embodiment, and various modifications can be made within the scope of the gist of the present disclosure.

The above embodiments and modification examples are merely examples, and the present disclosure is not limited thereto. For example, it is possible to appropriately combine each embodiment and each modification example.

The present disclosure includes substantially the e configuration as the configuration described in the same embodiments (for example, a configuration having the same function, method, and result, or a configuration having the same object and effect). In addition, the present disclosure includes a configuration in which a non-essential part of the configuration described in the embodiment is replaced. In addition, the present disclosure includes a configuration that exhibits the same operational effects as the configuration described in the embodiment or a configuration that can achieve the same object. In addition, the present disclosure includes a configuration in which a known technique is added to the configuration described in the embodiment.

The following contents are derived from the above-described embodiments and modification examples.

The vibration rectification error correction device according to one aspect includes a reference signal generation circuit that outputs a reference signal, a first frequency delta-sigma modulation circuit that performs frequency delta-sigma modulation on the reference signal by using a first measured signal to generate a first frequency delta-sigma modulated signal, a first filter, a second filter that operates in synchronization with the reference signal, and a first timing control circuit that generates a first timing signal obtained by delaying the first measured signal based on a count value of the number of pulses of the reference signal and controls a timing of outputting an input signal in synchronization with the first timing signal, in which the first filter and the first timing control circuit are provided on a signal path from an output of the first frequency delta-sigma modulation circuit to an input of the second filter.

In this vibration rectification error correction device, since the frequency delta-sigma modulation circuit performs frequency delta-sigma modulation on the reference signal by using the first measured signal and the second filter operates in synchronization with the reference signal different from the first measured signal, non-linearity occurs in the relationship between the frequency delta-sigma modulated signal and the output signal of the second filter. The vibration rectification error caused by this non-linearity changes according to the delay amount of the first timing signal. Therefore, by setting the delay amount of the first timing signal to an appropriate value, the vibration rectification error caused by this non-linearity and the vibration rectification error caused by the asymmetry of the first measured signal cancel each other out, and the vibration rectification error included in the output signal of the second filter is reduced. Further, by controlling the timing of outputting the signal based on the frequency delta-sigma modulated signal, instead of controlling the delay amount of the signal based on the frequency delta-sigma modulated signal so that the vibration rectification error is corrected, the group delay amount of the signal path in which the first measured signal propagates to the output of the second filter is constant. Therefore, according to this vibration rectification error correction device, the vibration rectification error can be corrected while fixing the group delay amount.

The vibration rectification error correction device according to one aspect may include a storage unit that stores information for controlling a delay amount of the first timing signal.

According to this vibration rectification error correction device, the vibration rectification error can be corrected without receiving the information of the delay amount of the first timing signal from an external device.

In the vibration rectification error correction device according to one aspect, the first frequency delta-sigma modulated signal may input to the first timing control circuit, and the first filter may receive the output signal of the first timing control circuit and operate in synchronization with the first timing signal.

The vibration rectification error correction device according to one aspect may include a second timing control circuit that receives the first frequency delta-sigma modulated signal, generates a second timing signal obtained by delaying the first measured signal based on the count value of the number of pulses of the reference signal, and controls a timing of outputting the input signal in synchronization with the second timing signal, and a third filter to which the output signal of the second timing control circuit is input and operates in synchronization with the first timing signal, the second filter may receive a third signal that is based on a first signal based on an output signal of the first filter and a second signal based on an output signal of the third filter, and output a fourth signal, and a first vibration rectification error included in a fifth signal output from the second filter when the first signal is input to the second filter and a second vibration rectification error included in a sixth signal output from the second filter when the second signal is input to the second filter may have different polarities.

In this vibration rectification error correction device, non-linearity occurs in the relationship between the frequency delta-sigma modulated signal and the fifth signal and the sixth signal. By making the delay amount of the first timing signal different from the delay amount of the second timing signal, the non-linearity of the relationship between the frequency delta-sigma modulated signal, the fifth signal, and the non-linearity the of relationship between the frequency delta-sigma modulated signal and the sixth signal are different to some degree. Therefore, according to this vibration rectification error correction device, because the correction resolution of the vibration rectification error is improved by using the first signal and the second signal in which the delay amount of the first timing signal and the delay amount of the second timing signal are set to appropriate values so that the first vibration rectification error included in the fifth signal and the second vibration rectification error included in the sixth signal have different polarities, the vibration rectification error included in the fourth signal can be effectively reduced.

In the vibration rectification error correction device according to one aspect, the first filter may receive the first frequency delta-sigma modulated signal and operate in synchronization with the first measured signal, and the output signal of the first filter may be input to the first timing control circuit.

The vibration rectification error correction device according to one aspect may include a second timing control circuit that generates a second timing signal obtained by delaying the first measured signal based on the count value of the number of pulses of the reference signal, and controls a timing of outputting an input signal in synchronization with the second timing signal, in which the second timing control circuit may receive an output signal of the first filter, the second filter may receive a third signal that is based on a first signal based on an output signal of the first timing control circuit and a second signal based on an output signal of the second timing control circuit, and output a fourth signal, and a first vibration rectification error included in a fifth signal output from the second filter when the first signal is input to the second filter and a second vibration rectification error included in a sixth signal output from the second filter when the second signal is input to the second filter may have different polarities.

In this vibration rectification error correction device, non-linearity occurs in a relationship between a frequency delta-sigma modulated signal, a fifth signal, and a sixth signal. By making the delay amount of the first timing signal different from the delay amount of the second timing signal, the non-linearity of the relationship between the frequency delta-sigma modulated signal, the fifth signal, and the non-linearity of the relationship between the frequency delta-sigma modulated signal and the sixth signal are different to some degree. Therefore, according to this vibration rectification error correction device, because the correction resolution of the vibration rectification error is improved by using the first signal and the second signal in which the delay amount of the first timing signal and the delay amount of the second timing signal are set to appropriate values so that the first vibration rectification error included in the fifth signal and the second vibration rectification error included in the sixth signal have different polarities, the vibration rectification error included in the fourth signal can be effectively reduced.

In the vibration rectification error correction device according to one aspect, a third signal may be generated based on a first signal having a first group delay amount based on an output signal of the second filter and a second signal having a second group delay amount different from the first group delay amount based on the second filter, and the first vibration rectification error included in the first signal and the second vibration rectification error included in the second signal may have different polarities.

In this vibration rectification error correction device, non-linearity occurs in the relationship between the frequency delta-sigma modulated signal and the first signal based on the output signal of the second filter and the second signal based on the output signal of the second filter. Due to the difference between the first group delay amount of the first signal and the second group delay amount of the second signal, the non-linearity of the relationship between the frequency delta-sigma modulated signal and the first signal and the non-linearity of the relationship between the frequency delta-sigma modulated signal and the second signal are different to some degree. Therefore, according to this vibration rectification error correction device, because the correction resolution of the vibration rectification error is improved by using the first signal and the second signal in which the first group delay amount and the second group delay amount are set to appropriate values so that the first vibration rectification error included in the first signal and the second vibration rectification error included in the second signal have different polarities, the vibration rectification error included in the third signal can be effectively reduced.

The vibration rectification error correction device according to one aspect may include a first operation mode for measuring a frequency ratio of the first measured signal and the reference signal, and a second operation mode in which a cutoff frequency of the second filter is lower than that in the first operation mode.

In this vibration rectification error correction device, in the first operation mode, the effect of reducing the vibration rectification error included in the output signal of the second filter can be obtained. On the other hand, in the second operation mode, since the cutoff frequency of the second filter is lower than that in the first operation mode, the vibration rectification error included in the output signal of the second filter is emphasized. Therefore, according to this vibration rectification error correction device, in the second operation mode, by acquiring the output signal of the second filter while changing the delay amount of the first timing signal, information indicating the relationship between the delay amount of the first timing signal and the vibration rectification error can be obtained. The vibration rectification error correction device or an external device calculates the frequency of the structural resonance of the sensor that outputs a measured signal by using this information, for example, and can determine whether or not the sensitivity of the sensor is within the specifications based on the frequency of the structural resonance.

The vibration rectification error correction device according to one aspect may include a second frequency delta-sigma modulation circuit that performs frequency delta-sigma modulation on the reference signal by using the second measured signal to generate a second frequency delta-sigma modulated signal, a fourth filter that operates in synchronization with the second measured signal, a fifth filter that operates in synchronization with the reference signal, and a third timing control circuit that generates a third timing signal obtained by delaying the second measured signal based on the count value of the number of pulses of the reference signal and controls a timing of outputting an input signal in synchronization with the third timing signal, in which the fourth filter and the third timing control circuit may be provided on the signal path from the output of the second frequency delta-sigma modulation circuit to the input of the fifth filter.

In this vibration rectification error correction device, the group delay amount of the signal path in which the first measured signal propagates to the output of the second filter is constant, and the group delay amount of the signal path in which the second measured signal propagates to the output of the fifth filter is also constant. Therefore, the time from when the first measured signal is input to the time when the corresponding signal is output from the second filter, and the time from when the second measured signal is input to the time when the corresponding signal is output from the fifth filter are substantially the same. Therefore, according to this vibration rectification error correction device, the vibration rectification error can be corrected while matching the timing of the measurement with respect to the first measured signal and the timing of the measurement with respect to the second measured signal.

A sensor module according to one aspect includes the vibration rectification error correction device according to one aspect, a physical quantity sensor, in which the first measured signal is a signal based on an output signal of the physical quantity sensor.

According to this sensor module, since it is possible to correct the vibration rectification error of the measurement value based on the output signal of the physical quantity sensor while fixing the group delay amount by providing a vibration rectification error correction device, measurement accuracy is improved.

The sensor module according to another aspect includes the vibration rectification error correction device according to one aspect, a first physical quantity sensor, and a second physical quantity sensor, in which the first measured signal is a signal based on an output signal of the first physical quantity sensor, and a second measured signal is a signal based on an output signal of the second physical quantity sensor.

According to this sensor module, since it is possible to correct the vibration rectification error of the measurement value based on the output signal of the first physical quantity sensor and the vibration rectification error of the measurement value based on the output signal of the second physical quantity sensor while fixing the group delay amount by providing a vibration rectification error correction device, the measurement accuracy and synchronous measurement is improved.

A vibration rectification error correction method according to one aspect includes performing frequency delta-sigma modulation on a reference signal by using a measured signal to generate a frequency delta-sigma modulated signal, generating a timing signal obtained by delaying the measured signal based on a count value of the number of pulses of the reference signal and controlling a timing of outputting a signal based on the frequency delta-sigma modulated signal in synchronization with the timing signal, performing first filter processing on a signal based on the signal whose timing is controlled in synchronization with the timing signal, and performing a second filtering process on a signal based on the signal obtained by the first filtering process in synchronization with the reference signal.

In this vibration rectification error correction method, since the first filtering process is performed in synchronization with the timing signal obtained by delaying the measured signal and the second filter is performed in synchronization with the reference signal different from the measured signal, non-linearity occurs in the relationship between the frequency delta-sigma modulated signal and the output signal of the second filter. The vibration rectification error caused by this non-linearity changes according to the delay amount of the timing signal. Therefore, by setting the delay amount of the timing signal to an appropriate value, the vibration rectification error caused by this non-linearity and the vibration rectification error caused by the asymmetry of the measured signal cancel each other out, and the vibration rectification error included in the output signal of the second filter is reduced. Further, by controlling the timing of outputting the signal based on the frequency delta-sigma modulated signal, instead of controlling the delay amount of the signal based on the frequency delta-sigma modulated signal so that the vibration rectification error is corrected, the group delay amount of the signal path in which the measured signal propagates to the output of the second filter is constant. Therefore, according to this vibration rectification error correction method, the vibration rectification error can be corrected while fixing the group delay amount.

The vibration rectification error correction method according to another aspect includes performing frequency delta-sigma modulation on a reference signal by using a measured signal to generate a frequency delta-sigma modulated signal, performing a first filtering process on a signal based on the frequency delta-sigma modulated signal in synchronization with the measured signal, generating a timing signal obtained by delaying the measured signal based on a count value of the number of pulses of the reference signal and controlling a timing of outputting a signal based on the signal obtained by the first filtering process in synchronization with the timing signal, and performing a second filtering process on a signal based on the signal of which an output timing is controlled in synchronization with the reference signal.

In this vibration rectification error correction method, since the first filtering process is performed in synchronization with the measured signal and the second filtering process is performed in synchronization with the reference signal different from the measured signal, non-linearity occurs in the relationship between the frequency delta-sigma modulated signal and the output signal of the second filter. The vibration rectification error caused by this non-linearity changes according to the delay amount of the timing signal. Therefore, by setting the delay amount of the timing signal to an appropriate value, the vibration rectification error caused by this non-linearity and the vibration rectification error caused by the asymmetry of the measured signal cancel each other out, and the vibration rectification error included in the output signal of the second filter is reduced. Further, by controlling the timing of outputting the signal based on the frequency delta-sigma modulated signal, instead of controlling the delay amount of the signal based on the frequency delta-sigma modulated signal so that the vibration rectification error is corrected, the group delay amount of the signal path in which the measured signal propagates to the output of the second filter is constant. Therefore, according to this vibration rectification error correction method, the vibration rectification error can be corrected while fixing the group delay amount.

What is claimed is:

1. A vibration rectification error correction device comprising:
   a reference signal generation circuit configured to output a reference signal;
   a first frequency delta-sigma modulation circuit configured to perform frequency delta-sigma modulation on the reference signal by using a first measured signal to generate a first frequency delta-sigma modulated signal;
   a first filter configured to:
      receive the first count value as the output signal of the first frequency delta-sigma modulation circuit; and
      filter the first count value in synchronization with the first measured signal to generate a second count value as an output signal of the first filter;
   a first timing control circuit configured to:
      receive the second count value, the reference signal, and the first measured signal;
      generate a first timing signal based on a reference count value of the number of pulses of the reference signal; and
      control a timing of outputting a second count value as an output signal in synchronization with the first timing signal;
   a first latch circuit configured to:
      latch the second count value as the output signal from the first timing control circuit; and
      hold the latched second count value as a third count value; and
   a second filter configured to:
      receive the third count value as an output signal of the first latch circuit; and
      filter the third count value in synchronization with the reference signal to generate a fourth count value as an output signal of the second filter.

2. The vibration rectification error correction device according to claim 1, further comprising:
   a memory configured to store information for controlling a delay amount of the first timing signal.

3. The vibration rectification error correction device according to claim 1, further comprising:
   a second timing control circuit configured to:
      receive the second count value as the output signal of the first filter;
      generate a second timing signal obtained by delaying the first measured signal based on the count value of the number of pulses of the reference signal; and
      control a timing of outputting another second count value as an output signal in synchronization with the second timing signal; and
   a second latch circuit configured to:
      receive the another second count value as the output signal of the second timing control circuit; and
      hold the latched another second count value as another third count value, wherein
   the second filter is further configured to:
      receive the another third count value as the output signal of the second latch circuit; and
      filter the third count value and the another third count value in synchronization with the reference signal to generate the fourth count value as the output signal of the second filter,
   a first vibration rectification error and a second vibration rectification error have different polarities,
   wherein the first vibration rectification error is included in the output signal from the second filter when the third count value is input to the second filter, and
   the second vibration rectification error is included in the output signal from the second filter when the another third count value is input to the second filter.

4. The vibration rectification error correction device according to claim 1, wherein
   a third signal is generated based on a first signal having a first group delay amount based on the output signal of the second filter and a second signal having a second group delay amount different from the first group delay amount based on the output signal of the second filter, and
   a first vibration rectification error included in the first signal and a second vibration rectification error included in the second signal have different polarities.

5. The vibration rectification error correction device according to claim 1, wherein
   the vibration rectification error correction device has a first operation mode for measuring a frequency ratio of the first measured signal and the reference signal, and a second operation mode in which a cutoff frequency of the second filter is lower than that in the first operation mode.

6. The vibration rectification error correction device according to claim 1, further comprising:
   a second frequency delta-sigma modulation circuit configured to perform the frequency delta-sigma modulation on the reference signal by using a second measured signal to generate a second frequency delta-sigma modulated signal;
   a fourth filter configured to operate in synchronization with the second measured signal;
   a fifth filter configured to operate in synchronization with the reference signal; and
   a third timing control circuit configured to generate a third timing signal obtained by delaying the second measured signal based on the count value of the number of pulses of the reference signal and control a timing of outputting an input signal in synchronization with the third timing signal, wherein
   the fourth filter and the third timing control circuit are provided on a signal path from an output of the second frequency delta-sigma modulation circuit to an input of the fifth filter.

7. A sensor module comprising:
   the vibration rectification error correction device according to claim 1; and
   a first physical quantity sensor, wherein
   the first measured signal is a signal based on an output signal of the first physical quantity sensor.

8. A sensor module comprising:
   the vibration rectification error correction device according to claim 6;
   a first physical quantity sensor; and
   a second physical quantity sensor, wherein
   the first measured signal is a signal based on an output signal of the first physical quantity sensor, and
   the second measured signal is a signal based on an output signal of the second physical quantity sensor.

9. A vibration rectification error correction method comprising:
   performing frequency delta-sigma modulation on a reference signal by using a measured signal to generate a frequency delta-sigma modulated signal;

receiving a first count value as the frequency delta-sigma modulated signal, and filtering the first count value in synchronization with the measured signal to generate a second count value as a first output signal;
receiving the second count value, the reference signal, and the measured signal to generate a timing signal based on a count value of the number of pulses of the reference signal;
controlling a timing of outputting a second count value as a second output signal in synchronization with the timing signal;
latching the second count value as the second output signal, and holding the latched second count value as a third count value; and
receiving the third count value as a third output signal, and filtering the third count value in synchronization with the reference signal to generate a fourth count value as a fourth output signal.

* * * * *